(12) United States Patent
Hadani et al.

(10) Patent No.: US 12,068,846 B2
(45) Date of Patent: Aug. 20, 2024

(54) MULTIPLE ACCESS USING ORTHOGONAL TIME FREQUENCY SPACE MODULATION

(71) Applicant: Cohere Technologies, Inc., Santa Clara, CA (US)

(72) Inventors: Ronny Hadani, Santa Clara, CA (US); Anton Monk, Santa Clara, CA (US); Shlomo Selim Rakib, Santa Clara, CA (US); Michail Tsatsanis, Santa Clara, CA (US)

(73) Assignee: Cohere Technologies, Inc., San Jose, CA (US)

( * ) Notice: Subject to any disclaimer, the term of this patent is extended or adjusted under 35 U.S.C. 154(b) by 118 days.

(21) Appl. No.: 17/443,004

(22) Filed: Jul. 19, 2021

(65) Prior Publication Data

US 2021/0351880 A1 Nov. 11, 2021

Related U.S. Application Data

(63) Continuation of application No. 15/758,322, filed as application No. PCT/US2016/050579 on Sep. 7, 2016, now Pat. No. 11,070,329.

(Continued)

(51) Int. Cl.
*H04L 5/00* (2006.01)
*H04L 1/00* (2006.01)
(Continued)

(52) U.S. Cl.
CPC .......... *H04L 1/0023* (2013.01); *H04L 5/0007* (2013.01); *H04L 5/0023* (2013.01);
(Continued)

(58) Field of Classification Search
CPC . H04L 5/0007; H04L 5/0023; H04L 27/2639; H04L 27/2697
(Continued)

(56) References Cited

U.S. PATENT DOCUMENTS 4,754,493 A 6/1988 Coates
5,083,135 A 1/1992 Nagy et al.
(Continued)

FOREIGN PATENT DOCUMENTS

CN 1496036 A 5/2004
CN 1855908 A 11/2006
(Continued)

OTHER PUBLICATIONS

Banelli, P. et al., "Modulation Formats and Waveforms for 5G Networks: Who Will Be the Heir of OFDM?," IEEE Signal Processing Magazine, vol. 81, pp. 80-93, Nov. 2014.
(Continued)

*Primary Examiner* — Christopher M Crutchfield
*Assistant Examiner* — Jean F Voltaire
(74) *Attorney, Agent, or Firm* — Perkins Coie LLP

(57) ABSTRACT

An Orthogonal Time Frequency Space Modulation (OTFS) modulation scheme achieving multiple access by multiplexing multiple signals at the transmitter-side performs allocation of transmission resources to a first signal and a second signal, combining and converting to a transmission format via OTFS modulation and transmitting the signal over a communication channel. At the receiver, multiplexed signals are recovered using orthogonality property of the basis functions used for the multiplexing at the transmitter.

20 Claims, 27 Drawing Sheets

Related U.S. Application Data

(60) Provisional application No. 62/215,219, filed on Sep. 8, 2015, provisional application No. 62/215,127, filed on Sep. 7, 2015.

(51) Int. Cl.
  *H04L 27/26* (2006.01)
  *H04B 7/06* (2006.01)
  *H04L 25/03* (2006.01)

(52) U.S. Cl.
  CPC ...... *H04L 27/2639* (2013.01); *H04L 27/2697* (2013.01); *H04B 7/06* (2013.01); *H04L 1/0071* (2013.01); *H04L 25/03834* (2013.01)

(58) Field of Classification Search
  USPC ......................................................... 370/329
  See application file for complete search history.

(56) References Cited

U.S. PATENT DOCUMENTS

| | | | |
|---|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,327,812 B2 | 2/2008 | Auer |
| 7,392,018 B1 | 6/2008 | Ebert et al. |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,667,307 B1 | 5/2017 | Hadani et al. |
| 9,668,148 B2 | 5/2017 | Hadani et al. |
| 9,712,354 B2 | 7/2017 | Hadani et al. |
| 9,722,741 B1 | 8/2017 | Rakib et al. |
| 9,729,281 B2 | 8/2017 | Hadani et al. |
| 10,651,912 B2 | 5/2020 | Wang et al. |
| 10,667,148 B1 | 5/2020 | Hadani et al. |
| 10,681,568 B1 | 6/2020 | Hadani et al. |
| 10,693,581 B2 | 6/2020 | Rakib et al. |
| 10,693,692 B2 | 6/2020 | Hadani et al. |
| 10,716,095 B2 | 7/2020 | Rakib et al. |
| 10,749,651 B2 | 8/2020 | Hebron et al. |
| 10,826,728 B2 | 11/2020 | Tsatsanis et al. |
| 10,855,425 B2 | 12/2020 | Kons et al. |
| 10,873,418 B2 | 12/2020 | Kons et al. |
| 10,886,991 B2 | 1/2021 | Akoum et al. |
| 11,050,530 B2 | 6/2021 | Wang et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2006/0256887 A1* | 11/2006 | Kwon ................ H04L 5/023 375/260 |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0023462 A1* | 1/2009 | Dent ................ G01S 1/42 455/456.5 |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0069914 A1 | 3/2012 | Shental et al. |
| 2012/0140716 A1 | 6/2012 | Baldemair et al. |

(56) References Cited

U.S. PATENT DOCUMENTS

| | | |
|---|---|---|
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0092861 A1* | 4/2014 | Gao .................... H04L 27/2655 370/330 |
| 2014/0143639 A1 | 5/2014 | Loghin et al. |
| 2014/0161154 A1* | 6/2014 | Hadani ............... H04L 27/2636 375/138 |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0288913 A1 | 10/2017 | Rakib et al. |
| 2017/0289961 A1 | 10/2017 | Rakib et al. |
| 2018/0109284 A1 | 4/2018 | Hadani et al. |
| 2018/0167165 A1 | 6/2018 | Kons et al. |
| 2018/0205481 A1 | 7/2018 | Rakib et al. |
| 2018/0227159 A1 | 8/2018 | Rakib et al. |
| 2018/0242170 A1 | 8/2018 | Hadani et al. |
| 2018/0262306 A1 | 9/2018 | Hadani et al. |
| 2018/0288809 A1 | 10/2018 | Delfeld et al. |
| 2018/0302802 A1 | 10/2018 | Fanfelle |
| 2019/0036577 A1 | 1/2019 | Delfeld et al. |
| 2019/0036741 A1 | 1/2019 | Hadani et al. |
| 2019/0044682 A1 | 2/2019 | Hebron et al. |
| 2019/0075551 A1 | 3/2019 | Hadani et al. |
| 2019/0081836 A1 | 3/2019 | Hadani et al. |
| 2019/0159177 A1 | 5/2019 | Rakib et al. |
| 2019/0173617 A1 | 6/2019 | Kons et al. |
| 2019/0173630 A1 | 6/2019 | Kons et al. |
| 2019/0215109 A1 | 7/2019 | Hadani et al. |
| 2019/0238189 A1 | 8/2019 | Delfeld et al. |
| 2019/0327054 A1 | 10/2019 | Kons et al. |
| 2019/0342126 A1 | 11/2019 | Hadani et al. |
| 2019/0342136 A1 | 11/2019 | Hadani et al. |
| 2019/0379422 A1 | 12/2019 | Hadani et al. |
| 2020/0045562 A1 | 2/2020 | Hadani et al. |
| 2020/0119868 A1 | 4/2020 | Rakib et al. |
| 2020/0137774 A1 | 4/2020 | Molisch et al. |
| 2020/0145273 A1 | 5/2020 | Rakib et al. |
| 2020/0153107 A1 | 5/2020 | Rakib |
| 2020/0186397 A1 | 6/2020 | Tsatsanis et al. |
| 2020/0204309 A1 | 6/2020 | Namboodiri |
| 2020/0204410 A1 | 6/2020 | Hadani |
| 2020/0228170 A1 | 7/2020 | Delfeld et al. |
| 2020/0259604 A1 | 8/2020 | Hadani et al. |
| 2020/0259692 A1 | 8/2020 | Hadani et al. |
| 2020/0259697 A1 | 8/2020 | Delfeld |
| 2020/0280138 A1 | 9/2020 | Fanfelle et al. |
| 2020/0287672 A1 | 9/2020 | Namboodiri et al. |
| 2020/0288333 A1 | 9/2020 | Rakib et al. |
| 2020/0305010 A1 | 9/2020 | Hadani et al. |
| 2020/0313695 A1 | 10/2020 | Namboodiri et al. |
| 2020/0313949 A1 | 10/2020 | Hadani |
| 2020/0322185 A1 | 10/2020 | Kons et al. |
| 2020/0322202 A1 | 10/2020 | Hadani et al. |
| 2020/0351836 A1 | 11/2020 | Rakib et al. |
| 2020/0367252 A1 | 11/2020 | Hebron et al. |
| 2020/0389268 A1 | 12/2020 | Sathyanarayan et al. |
| 2020/0403829 A1 | 12/2020 | Namboodiri et al. |
| 2021/0028877 A1 | 1/2021 | Rakib et al. |
| 2021/0036823 A1 | 2/2021 | Hebron et al. |
| 2021/0058114 A1 | 2/2021 | Molisch et al. |
| 2021/0077625 A1 | 3/2021 | Kons et al. |
| 2021/0105155 A1 | 4/2021 | Kons et al. |
| 2021/0126750 A1 | 4/2021 | Kons et al. |
| 2021/0135905 A1 | 5/2021 | Kons et al. |
| 2021/0194732 A1 | 6/2021 | Kons et al. |

FOREIGN PATENT DOCUMENTS

| | | |
|---|---|---|
| CN | 1902870 A | 1/2007 |
| CN | 101444055 A | 5/2009 |
| CN | 101741782 A | 6/2010 |
| CN | 101911758 A | 12/2010 |
| CN | 104662855 | 5/2015 |
| EP | 2045952 A2 | 4/2009 |
| KR | 20090034263 A | 4/2009 |
| KR | 20150026949 A | 3/2015 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011455 | 1/2017 |
| WO | 2017011478 | 1/2017 |
| WO | 2017044501 | 3/2017 |
| WO | 2017087706 | 5/2017 |
| WO | 2017100666 | 6/2017 |
| WO | 2017147439 | 8/2017 |
| WO | 2017165697 | 9/2017 |
| WO | 2017173160 | 10/2017 |
| WO | 2017173389 | 10/2017 |
| WO | 2017201467 | 11/2017 |
| WO | 2018031938 | 2/2018 |
| WO | 2018031952 | 2/2018 |
| WO | 2018032016 | 2/2018 |
| WO | 2018064587 | 4/2018 |
| WO | 2018064605 | 4/2018 |
| WO | 2018106731 | 6/2018 |
| WO | 2018129554 | 7/2018 |
| WO | 2018140837 | 8/2018 |

(56) References Cited

FOREIGN PATENT DOCUMENTS

| | | |
|---|---|---|
| WO | 2018191309 | 10/2018 |
| WO | 2018195548 | 10/2018 |
| WO | 2018200567 | 11/2018 |
| WO | 2018200577 | 11/2018 |
| WO | 2019014332 | 1/2019 |
| WO | 2019032142 | 2/2019 |
| WO | 2019032605 | 2/2019 |
| WO | 2019036492 | 2/2019 |
| WO | 2019051093 | 3/2019 |
| WO | 2019051427 | 3/2019 |
| WO | 2019055861 | 3/2019 |
| WO | 2019068053 | 4/2019 |
| WO | 2019060596 | 5/2019 |
| WO | 2019089986 | 5/2019 |
| WO | 2019113046 | 6/2019 |
| WO | 2019157230 | 8/2019 |
| WO | 2019173775 | 9/2019 |
| WO | 2019241436 | 12/2019 |
| WO | 2019241589 | 12/2019 |
| WO | 2020142520 | 7/2020 |
| WO | 2020206304 | 10/2020 |
| WO | 2020227619 | 11/2020 |
| WO | 2020247768 | 12/2020 |
| WO | 2021026212 | 2/2021 |
| WO | 2021062354 | 4/2021 |

OTHER PUBLICATIONS

El Hattachi, R. et al., "Ngmn 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Co-Pending EP Application No. 22186876.3, Extended European Search Report dated Dec. 23, 2022, 10 pages.
Wunder, et al "Sparse Signal Processing Concepts for Efficient 5G System Design" accepted Jan. 25, 2015, date of publication Feb. 24, 2015, 14 pages.
Co-Pending KR Application No. 10-2018-7009925, Office Action dated Apr. 7, 2023, 20 pages with machine translation.
Co-Pending Chinese Application No. 202111596766.7, Office Action dated Dec. 26, 2023, 28 pages with unofficial English translation.
Huang, et al. "Bit-Interleaved Time-Frequency Coded Modulation for OFDM Systems Over Time-Varying Channels" IEEE Transactions On Communications, vol. 53, No. 7, Jul. 2005, 9 pages.
Yi, et al. "Maximizing the rate of statistical channel information in MIMO OFDM systems" Issue 4 Journal of Huazhong University of Science and Technology (Natural Science Edition), vol. 36, No. 4, Apr. 2008, 10 pages with machine translation.
Jun, et al. "Positioning method based on China's terrestrial digital television broadcasting network" Journal of Tsinghua University (Natural Science Edition), vol. 51, Issue 6, 2011, JTsinghuaUniv (Sci & Tech), 2011, vol. 51, No. 6, 10 pages with machine translation.
Co-Pending KR Application No. 10-2018-7009925, Office Action dated Jan. 22, 2024, 8 pages with machine translation.

* cited by examiner

MULTIPLE ACCESS USING ORTHOGONAL TIME FREQUENCY SPACE MODULATION

CROSS-REFERENCE TO RELATED APPLICATION(S)

This patent document is continuation of U.S. patent application Ser. No. 15/758,322, filed on Mar. 7, 2018, which is a 35 U.S.C. § 371 National Stage application of International Application No. PCT/US2016/050579 entitled "MULTIPLE ACCESS USING ORTHOGONAL TIME FREQUENCY SPACE MODULATION", filed on Sep. 7, 2016, which claims the benefit of priority from U.S. Provisional Patent Application 62/215,127, entitled "ORTHOGONAL TIME FREQUENCY SPACE A Novel Modulation Technique Addressing the Challenges of 5G Networks," filed on Sep. 7, 2015. This application also claims the benefit of priority from U.S. Provisional Patent Application 62/215,219, entitled "OTFS Compatibility with LTE," filed on Sep. 8, 2015. All of the aforementioned patent applications are incorporated by reference herein in their entirety.

TECHNICAL FIELD

This document relates to the field of telecommunications, in particular, estimation and compensation of impairments in telecommunications data channels.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

Techniques for transmission and reception of signals using OTFS modulation techniques are disclosed. Signal multiplexing may be achieved by assigning non-overlapping time-frequency and/or delay-Doppler resources.

In one example aspect, a signal transmission technique is disclosed. The technique includes performing a logical mapping of transmission resources of the digital communication channel along a first two-dimensional resource plane represented by a first and a second orthogonal axes corresponding to a first transmission dimension and a second transmission dimension respectively, allocating, to a first signal, a first group of transmission resources from the logical mapping for transmission, allocating, to a second signal, a second group of resources from the logical mapping for transmission, transforming, using a first two-dimensional transform, a combination of the first signal having the first group of transmission resources and the second signal having the second group of transmission resources to a corresponding transformed signal in a second two-dimensional resource plane represented by a third and a fourth orthogonal axes corresponding to a third transmission dimension and a fourth transmission dimension respectively, converting the transformed signal to a formatted signal according to a transmission format of the communications channel, and transmitting the formatted signal over the communications channel.

In another example aspect, a signal reception method is disclosed. The method includes receiving a signal transmission comprising at least two component signals multiplexed together, transforming, using an orthogonal transform, the signal transmission into a post-processing format, wherein the post-processing format represents the at least two component signals in a two-dimensional time-frequency plane, recovering, by performing an orthogonal time frequency space transformation, a multiplexed signal in a two-dimensional delay-Doppler plane, from the post-processing format, and demultiplexing the multiplexed signal to recover one of the at least two component signals.

In yet another example aspect, a signal transmission method is disclosed. The signal transmission method includes performing a logical mapping of transmission resources of the digital communication channel along a first two-dimensional resource plane represented by a first and a second orthogonal axes corresponding to a first transmission dimension and a second transmission dimension respectively, allocating, to a first signal, a first group of transmission resources from the logical mapping for transmission, transforming, using a first two-dimensional transform, the first signal having the first group of transmission resources to a corresponding transformed signal in a second two-dimensional resource plane represented by a third and a fourth orthogonal axes corresponding to a third transmission dimension and a fourth transmission dimension respectively, converting the transformed signal to a formatted signal according to a transmission format of the communications channel, and transmitting the formatted signal over the communications channel.

These, and other aspects are described in the present document.

DETAILED DESCRIPTION

Figure 1:
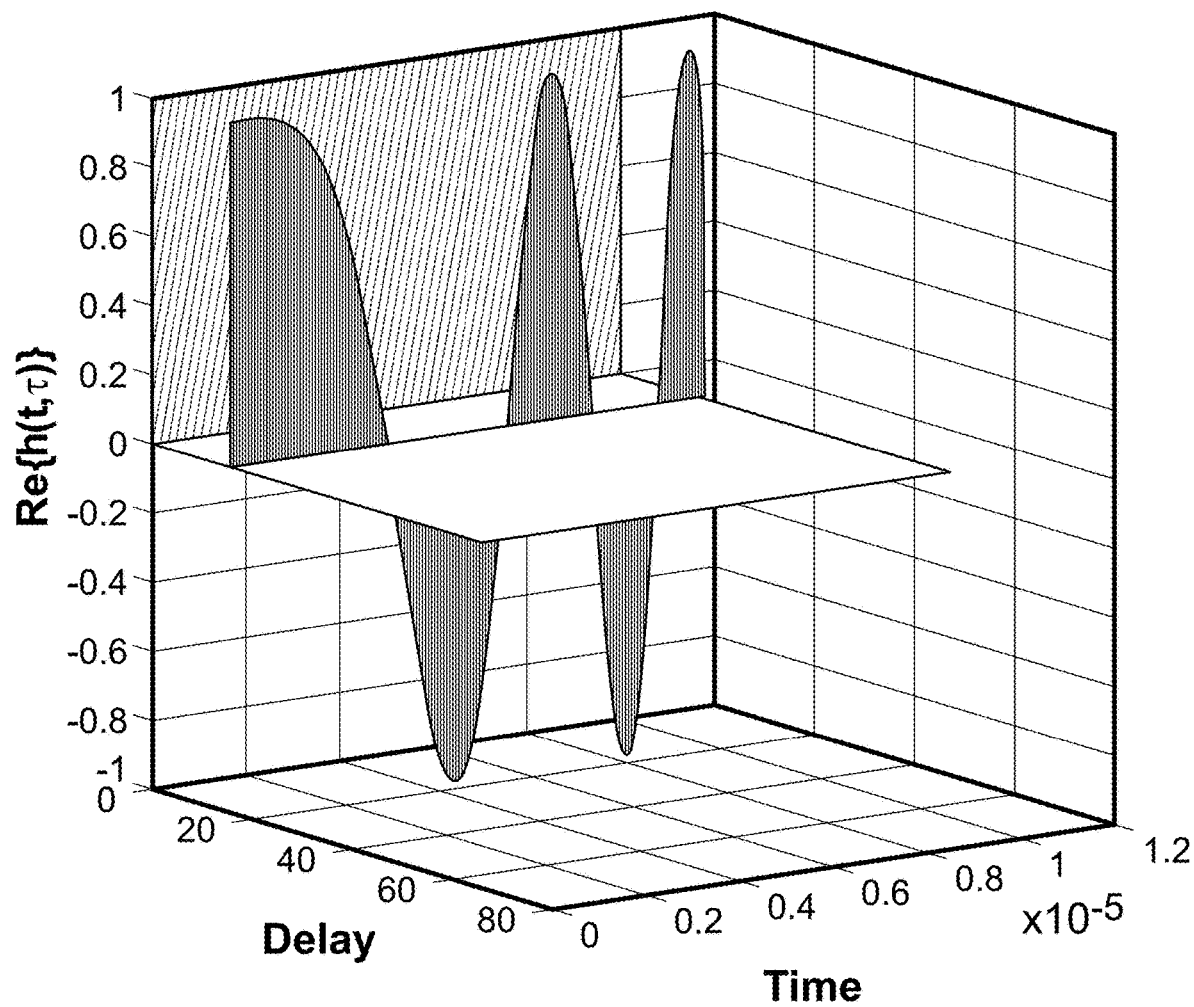
FIG. 1 shows an example trajectory of Time Varying Impulse Response for Accelerating Reflector.

Section headings are used in this document to help improve readability and do not limit scope of the technology discussed in each section only to that section. Furthermore, for ease of explanation, a number of simplifying assumptions have been made. Although these simplifying assumptions are intended to help convey ideas, they are not intended to be limiting.

4G wireless networks have served the public well, providing ubiquitous access to the internet and enabling the explosion of mobile apps, smartphones and sophisticated data intensive applications like mobile video. This continues an honorable tradition in the evolution of cellular technologies, where each new generation brings enormous benefits to the public, enabling astonishing gains in productivity, convenience, and quality of life.

Looking ahead to the demands that the ever increasing and diverse data usage is putting on the network, it is becoming clear to the industry that current 4G networks will not be able to support the foreseen needs in the near term future. The data traffic volume has been and continues to increase exponentially. AT&T reports that its network has seen an increase in data traffic of 100,000% in the period 2007-2015. Looking into the future, new applications like immersive reality, and remote robotic operation (tactile internet) as well as the expansion of mobile video are expected to overwhelm the carrying capacity of current systems. One of the goals of 5G system design is to be able to economically scale the network to 750 Gbps per sq. Km in dense urban settings, something that is not possible with today's technology.

Beyond the sheer volume of data, the quality of data delivery will need to improve in next generation systems. The public has become accustomed to the ubiquity of wireless networks and is demanding a wireline experience when untethered. This translates to a requirement of 50+ Mbps everywhere (at the cell edge), which will require advanced interference mitigation technologies to be achieved.

Another aspect of the quality of user experience is mobility. Current systems' throughput is dramatically reduced with increased mobile speeds due to Doppler effects which evaporate MIMO capacity gains. Future 5G systems aim to not only increase supported speeds up to 500 Km/h for high speed trains and aviation, but also support a host of new automotive applications for vehicle-to-vehicle and vehicle-to-infrastructure communications.

While the support of increased and higher quality data traffic is necessary for the network to continue supporting the user needs, carriers are also exploring new applications that will enable new revenues and innovative use cases. The example of automotive and smart infrastructure applications discussed above is one of several. Others include the deployment of public safety ultra-reliable networks, the use of cellular networks to support the sunset of the PSTN, etc. The biggest revenue opportunity however, is arguably the deployment of large number of internet connected devices, also known as the internet of things (IOT). Current networks however are not designed to support a very large number of connected devices with very low traffic per device.

In summary, current LTE networks cannot achieve the cost/performance targets required to support the above objectives, necessitating a new generation of networks involving advanced PHY technologies. There are numerous technical challenges that will have to be overcome in 5G networks as discussed next.

4G Technical Challenges

In order to enable machine-to-machine communications and the realization of the internet of things, the spectral efficiency for short bursts will have to be improved, as well as the energy consumption of these devices (allowing for 10 years operation on the equivalent of 2 AA batteries). In current LTE systems, the network synchronization requirements place a burden on the devices to be almost continuously on. In addition, the efficiency goes down as the utilization per UE (user equipment, or mobile device) goes down. The PHY requirements for strict synchronization between UE and eNB (Evolved Node B, or LTE base station) will have to be relaxed, enabling a re-designing of the MAC for IoT connections that will simplify transitions from idle state to connected state.

Another important use case for cellular IoT (CIoT) is deep building penetration to sensors and other devices, requiring an additional 20 dB or more of dynamic range. 5G CIoT solutions should be able to coexist with the traditional high-throughput applications by dynamically adjusting parameters based on application context.

The path to higher spectral efficiency points towards a larger number of antennas. A lot of research work has gone into full dimension and massive MIMO architectures with promising results. However, the benefits of larger MIMO systems may be hindered by the increased overhead for training, channel estimation and channel tracking for each antenna. A PHY that is robust to channel variations will be needed as well as innovative ways to reduce the channel estimation overhead.

Robustness to time variations is usually connected to the challenges present in high Doppler use cases such as in vehicle-to-infrastructure and vehicle-to-vehicle automotive applications. With the expected use of spectrum up to 60 GHz for 5G applications, this Doppler impact will be an order of magnitude greater than with current solutions. The ability to handle mobility at these higher frequencies would be extremely valuable.

The OTFS Solution

OTFS is a modulation technique that modulates each information (e.g., QAM) symbol onto one of a set of two dimensional (2D) orthogonal basis functions that span the bandwidth and time duration of the transmission burst or packet. The modulation basis function set is specifically derived to best represent the dynamics of the time varying multipath channel.

OTFS transforms the time-varying multipath channel into a time invariant delay-Doppler two dimensional convolution channel. In this way, it eliminates the difficulties in tracking time-varying fading, for example in high speed vehicle communications.

OTFS increases the coherence time of the channel by orders of magnitude. It simplifies signaling over the channel using well studied AWGN codes over the average channel SNR. More importantly, it enables linear scaling of throughput with the number of antennas in moving vehicle applications due to the inherently accurate and efficient estimation of channel state information (CSI). In addition, since the delay-doppler channel representation is very compact, OTFS enables massive MIMO and beamforming with CSI at the transmitter for four, eight, and more antennas in moving vehicle applications.

In deep building penetration use cases, one QAM symbol may be spread over multiple time and/or frequency points. This is a key technique to increase processing gain and in building penetration capabilities for CIoT deployment and PSTN replacement applications. Spreading in the OTFS domain allows spreading over wider bandwidth and time durations while maintaining a stationary channel that does not need to be tracked over time.

These benefits of OTFS will become apparent once the basic concepts behind OTFS are understood. There is a rich mathematical foundation of OTFS that leads to several variations; for example it can be combined with OFDM or with multicarrier filter banks. In this paper we navigate the challenges of balancing generality with ease of understanding as follows:

This patent document describes the wireless Doppler multipath channel and its effects on multicarrier modulation.

This patent document also describes OTFS as a modulation that matches the characteristics of the time varying channel. We show OTFS can be implemented as two processing steps:

A step that allows transmission over the time frequency plane, via orthogonal waveforms generated by translations in time and/or frequency. In this way, the (time-varying) channel response is sampled over points of the time-frequency plane.

A pre-processing step using carefully crafted orthogonal functions employed over the time-frequency plane, which translate the time-varying channel in the time-frequency plane, to a time-invariant one in the new information domain defined by these orthogonal functions.

This patent document describes the new modulation scheme by exploring the behavior of the channel in the new modulation domain in terms of coherence, time and frequency resolution etc.

This patent document describes aspects of channel estimation in the new information domain and multiplexing multiple users respectively, including complexity and implementation issues.

This patent document provides some performance results and we put the OTFS modulation in the context of cellular systems, discuss its attributes and its benefits for 5G systems.

OTFS Modulation Over the Doppler Multipath Channel

The time variation of the channel introduces significant difficulties in wireless communications related to channel acquisition, tracking, equalization and transmission of channel state information (CSI) to the transmit side for beamforming and MIMO processing. In this paper, we develop a modulation domain based on a set of orthonormal basis functions over which we can transmit the information symbols, and over which the information symbols experience a static, time invariant, two dimensional channel for the duration of the packet or burst transmission. In that modulation domain, the channel coherence time is increased by orders of magnitude and the issues associated with channel fading in the time or frequency domain in SISO or MIMO systems are significantly reduced.

The present document also discloses examples of a new modulation scheme by exploring the behavior of the channel in the new modulation domain in terms of coherence, time and frequency resolution etc.

The document also discloses techniques for channel estimation in the new information domain and multiplexing multiple users respectively, including associated complexity and implementation issues for implementing the disclosed techniques.

The present document also provides some performance results and examples of benefits offered by the OTFS modulation in the context of cellular systems, including 5G systems.

Example Models for a Wireless Channel

The multipath fading channel is commonly modeled in the baseband as a convolution channel with a time varying impulse response:

$$r(t)=\int \hbar(\tau,t)s(t-\tau)d\tau \qquad (1)$$

where s(t) and r(t) represent the complex baseband channel input and output respectively and where $\hbar(\tau, t)$ is the complex baseband time varying channel response.

This representation, while general, may not explicitly give an insight into the behavior and variations of the time varying impulse response. A more useful and insightful model, which is also commonly used for Doppler multipath doubly fading channels is $$r(t)=\iint h(\tau,\nu)e^{j2\pi\nu(t-\tau)}s(t-\tau)d\nu d\tau \qquad (2)$$

In this representation, the received signal is a superposition of reflected copies of the transmitted signal, where each copy is delayed by the path delay $\tau$, frequency shifted by the Doppler shift $\nu$ and weighted by the time-invariant delay-Doppler impulse response $h(\tau, \nu)$ for that $\tau$ and $\nu$. In addition to the intuitive nature of this representation, Eq. (2) maintains the generality of Eq. (1). In other words it can represent complex Doppler trajectories, like accelerating vehicles, reflectors etc. This can be seen by expressing the time varying impulse response as a Fourier expansion with respect to the time variable t $$\dot{h}(\tau,t) = \int h(\tau,v) e^{j2\pi vt} dt \quad (3)$$

Figure 2:
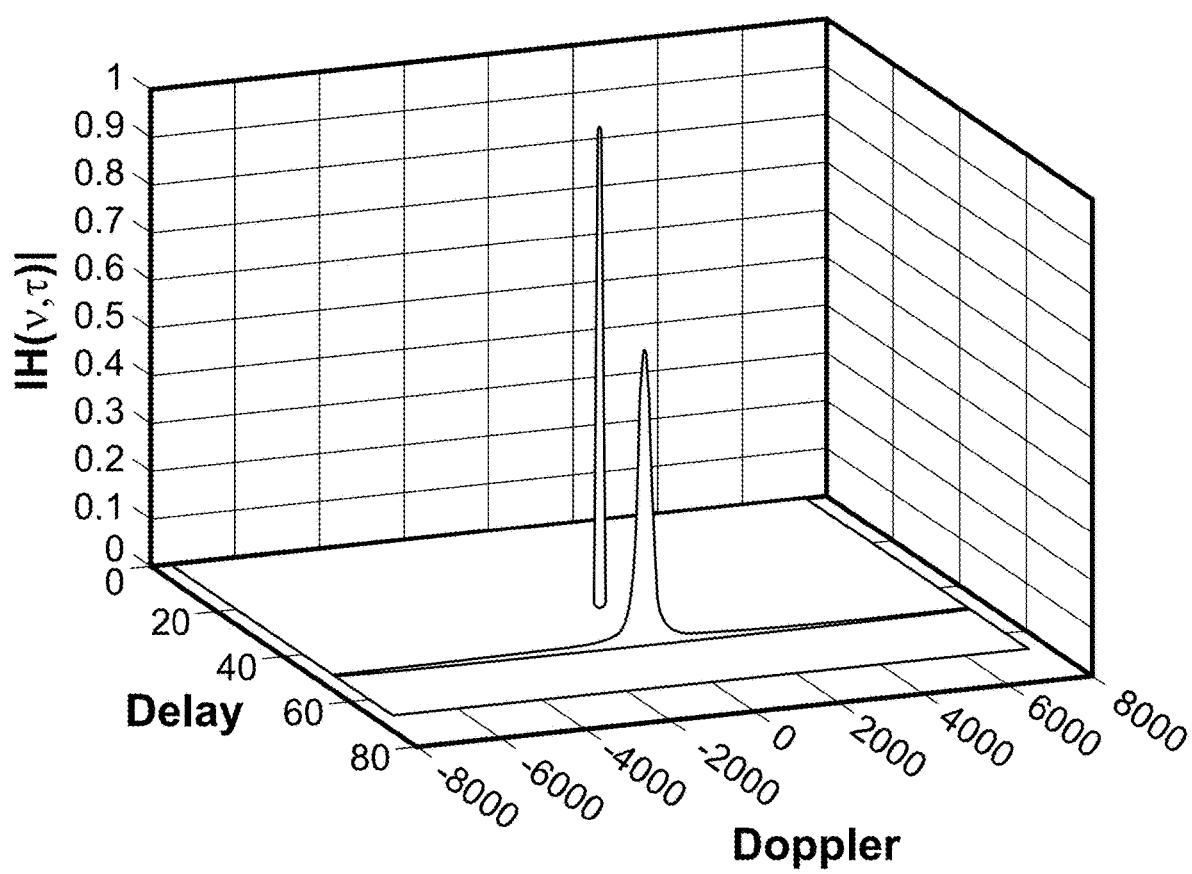
FIG. 2 shows an example Delay-Doppler Representation for Accelerating Reflector Channel.

Substituting (3) in (1) gives Eq. (2) after some manipulation. More specifically we obtain $y(t) = \iint [e^{j2\pi v\tau} h(\tau,v) e^{j2\pi v(t-\tau)} \times (t-\tau) dv d\tau]$ which differs from (2) by an exponential factor. The exponential factor can be added to the definition of the impulse response $h(\tau,v)$ making the two representations equivalent. As an example, FIG. 1 shows the time-varying impulse response for an accelerating reflector in the $(\tau, t)$ coordinate system, while FIG. 2 shows the same channel represented as a time invariant impulse response in the $(\tau, v)$ coordinate system.

An interesting feature revealed by these two figures is how compact the $(\tau, v)$ representation is compared to the $(\tau, t)$ representation. This has implications for channel estimation, equalization and tracking as will be discussed later.

While $h(\tau, v)$ is, in fact, time-invariant, the operation on $s(t)$ is still time varying, as can be seen by the effect of the explicit complex exponential function of time in Eq. (2). In one advantageous aspect, some embodiments of the modulation scheme based on appropriate choice of orthogonal basis functions, disclosed herein, render the effects of this channel truly time-invariant in the domain defined by those basis functions.

The equation below represents a set of orthonormal basis functions $\phi_{\tau,v}(t)$ indexed by $\tau, v$ which are orthogonal to translation and modulation, i.e., $$\phi_{\tau,v}(t-\tau_0) = \phi_{\tau+\tau_0,v}(t)$$

$$e^{j2\pi v_0 t}\phi_{\tau,v}(t) = \phi_{\tau,v-v_0}(t) \quad (4)$$

and a transmitted signal can be considered as a superposition of these basis functions:

$$s(t) = \iint x(\tau,v)\phi_{\tau,v}(t) d\tau dv \quad (5)$$

where the weights $x(\tau, v)$ represent the information bearing signal to be transmitted. After the transmitted signal of (5) goes through the time varying channel of Eq. (2) a superposition of delayed and modulated versions of the basis functions is obtained, which due to (4) results in:

$$r(t) = \iint h(\tau,v) e^{j2\pi v(t-\tau)} s(t-\tau) dv d\tau = \phi_{\tau,v}(t) \{h(\tau,v) * x(\tau,v)\} d\tau dv \quad (6)$$

where * denotes two dimensional convolution. Eq. (6) can be thought of as a generalization of the derivation of the convolution relationship for linear time invariant systems, using one dimensional exponentials as basis functions. The term in brackets can be recovered at the receiver by matched filtering against each basis function $\phi_{\tau,v}(t)$. In this way, a two dimensional channel relationship is established in the $(\tau, v)$ domain $y(\tau, v) = h(\tau, v) * x(\tau, v)$, where $y(\tau, v)$ is the receiver two dimensional matched filter output. In this domain, the channel is described by a time invariant two-dimensional convolution.

A different interpretation of the wireless channel will also be useful in what follows. Consider $s(t)$ and $r(t)$ as elements of the Hilbert space of square integrable functions $\mathcal{H}$. Then Eq. (2) can be interpreted as a linear operator on $\mathcal{H}$ acting on the input $s(t)$, parametrized by the impulse response $h(\tau, v)$, and producing the output $r(t)$ $$r = \prod_h(s): s(t) \in \mathcal{H} \xrightarrow{\Pi_h(\cdot)} r(t) \in \mathcal{H} \quad (7)$$

Although the operator is linear, it is not time-invariant. In the no-Doppler case, e.g., if $h(v, \tau) = h(0, \tau)\delta(v)$, then Eq. (2) reduces to a time invariant convolution. Also notice that while for time invariant systems the impulse response is parameterized by one dimension, in the time varying case we have a two dimensional impulse response. While in the time invariant case the convolution operator produces a superposition of delays of the input $s(t)$, (hence the parameterization is along the one dimensional delay axis) in the time varying case there is a superposition of delay-and-modulate operations as seen in Eq. (2) (hence the parameterization is along the two dimensional delay and Doppler axes). This is a major difference which makes the time varying representation non-commutative (in contrast to the convolution operation which is commutative), and complicates the treatment of time varying systems.

The important point of Eq. (7) is that the operator $\Pi_h(\cdot)$ can be compactly parametrized in a two dimensional space $h(\tau, v)$, providing an efficient, time invariant description of the channel. Typical channel delay spreads and Doppler spreads are a very small fraction of the symbol duration and subcarrier spacing of multicarrier systems.

In the mathematics literature, the representation of time varying systems of (2) and (7) is sometimes called the Heisenberg representation. It can be shown that every linear operator (7) can be parameterized by some impulse response as in (2).

OTFS Modulation Over the Doppler Multipath Channel

The time variation of the channel introduces significant difficulties in wireless communications related to channel acquisition, tracking, equalization and transmission of channel state information (CSI) to the transmit side for beamforming and MIMO processing. This document discloses a modulation domain based on a set of orthonormal basis functions over which systems can transmit the information symbols, and over which the information symbols experience a static, time invariant, two dimensional channel for the duration of the packet or burst transmission. In this modulation domain, the channel coherence time is increased by orders of magnitude and the issues associated with channel fading in the time or frequency domain in SISO or MIMO systems are significantly reduced.

Orthogonal Time Frequency Space (OTFS) modulation could be implemented as a cascade of two transformations. The first transformation maps the two dimensional plane where the information symbols reside (and which we call the delay-Doppler plane) to the time frequency plane. The second one transforms the time frequency domain to the waveform time domain where actual transmitted signal is constructed. This transform can be thought of as a generalization of multicarrier modulation schemes.

Figure 3:
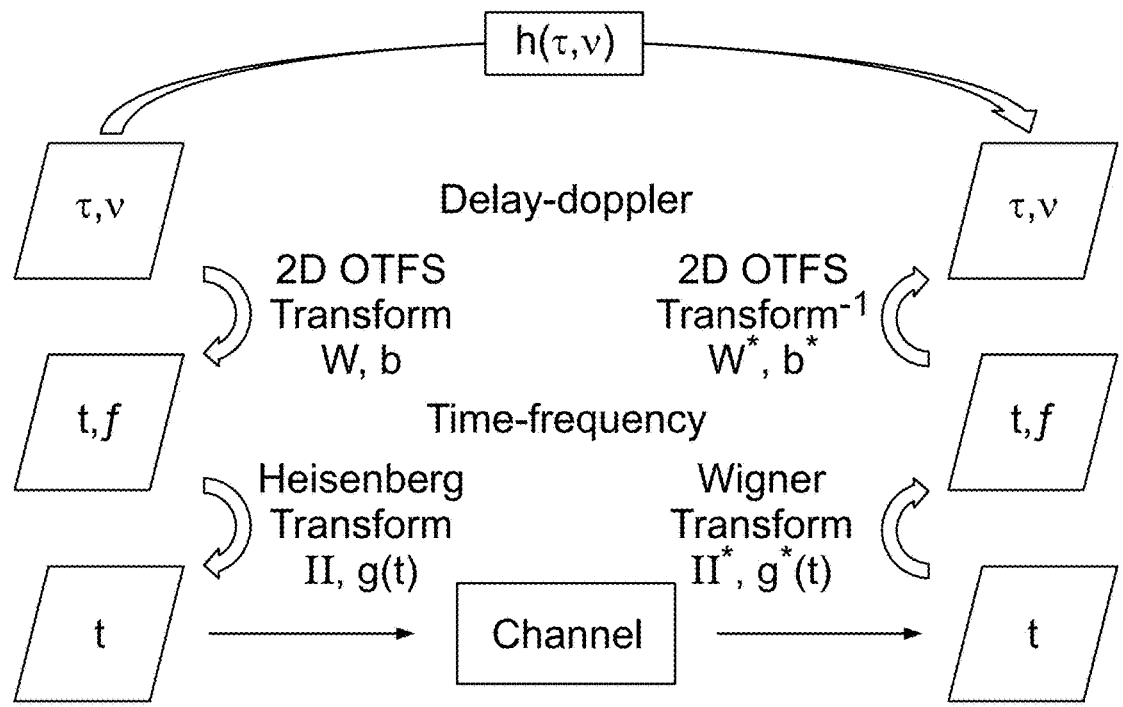
FIG. 3 depicts example levels of Abstraction: Signaling over the (i) actual channel with a signaling waveform (ii) the time-frequency Domain (iii) the delay-Doppler Domain.
Figure 4:
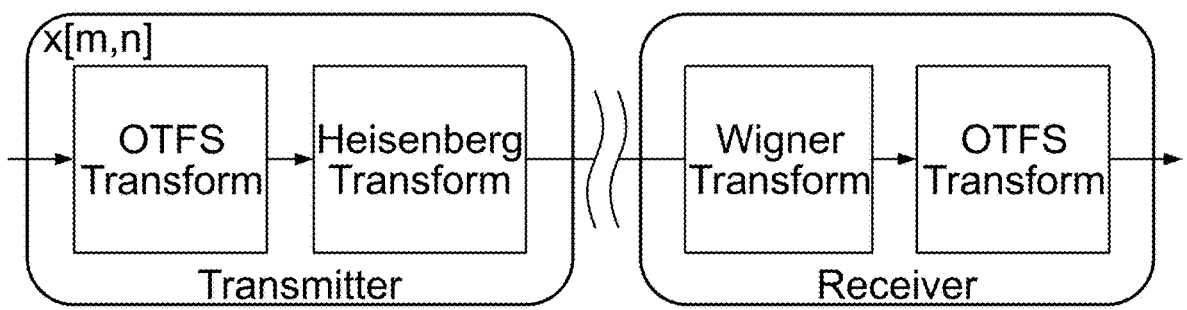
FIG. 4 illustrates notation used to Denote Signals at Various Stages of Transmitter and Receiver.

FIG. 3 provides a pictorial view of the two transformations that could be considered to constitute the OTFS modulation. It shows at a high level the signal processing steps that are required at the transmitter and receiver. It also includes the parameters that define each step, which will become apparent as we further expose each step. Further, FIG. 4 shows a block diagram of the different processing stages at the transmitter and receiver and establishes the notation that will be used for the various signals.

The Heisenberg Transform

One important aspect of transmission to construct an appropriate transmit waveform which carries information provided by symbols on a grid in the time-frequency plane. In some embodiments, it is advantageous to have a modulation scheme that transforms the channel operation to an equivalent operation on the time-frequency domain with two properties:

The channel is orthogonalized on the time-frequency grid.

The channel time variation is simplified on the time-frequency grid and can be addressed with an additional (or a single additional) transform.

Fortunately, these goals can be accomplished with a scheme that is very close to well-known multicarrier modulation techniques, as explained next. This is applicable to the general framework for multicarrier modulation and specifically examples of OFDM and multicarrier filter bank implementations.

Consider the following components of a time frequency modulation:

[1] A lattice or grid on the time frequency plane, that is a sampling of the time axis with sampling period T and the frequency axis with sampling period $\Delta f$.

$$\Lambda = \{(nT, m\Delta f), n, m \in \mathbb{Z}\} \tag{8}$$

[2] A packet burst with total duration NT secs and total bandwidth $M\Delta f$ Hz

[3] A set of modulation symbols X[n, m], n=0, ..., N−1, m=0, ..., M−1 we wish to transmit over this burst

[4] A transmit pulse $g_{tr}(t)$ with the property of being orthogonal to translations by T and modulations by $\Delta f$. This orthogonality property is useful if the receiver uses the same pulse as the transmitter. In some implementations, bi-orthogonality property may be used instead.

$$< g_{tr}(t), \tag{9}$$
$$g_{tr}(t-nT)e^{j2\pi m\Delta f(t-nT)} >= \int g_{tr}^*(t)g_r(t-nT)e^{j2\pi m\Delta f(t-nT)} dt = \delta(m)\delta(n)$$

Given the above components, the time-frequency modulator is a Heisenberg operator on the lattice $\Lambda$, that is, it maps the two dimensional symbols X [n·m] to a transmitted waveform, via a superposition of delay-and-modulate operations on the pulse waveform $g_{tr}(t)$ $$s(t) = \sum_{m=-M/2}^{M/2-1} \sum_{n=0}^{N-1} X[n, m]g_{tr}(t - nT)e^{j2\pi m\Delta f(t-nT)} \tag{10}$$

More formally $$x = \prod_x (g_{tr}) : \quad g_{tr}(t) \in \mathcal{H} \xrightarrow{\Pi_X(\cdot)} y(t) \in \mathcal{H} \tag{11}$$

where $\Pi_X(\cdot)$ denotes the "discrete" Heisenberg operator, parameterized by discrete values X[n, m].

Notice the similarity of (11) with the channel equation (7). This is not by coincidence, but rather because of application of a modulation effect that mimics the channel effect, so that the end effect of the cascade of modulation and channel is more tractable at the receiver. For example, linear modulation (aimed at time invariant channels) is in its simplest form a convolution of the transmit pulse g(t) with a delta train of QAM information symbols sampled at the Baud rate T.

$$s(t) = \sum_{n=0}^{N-1} X[n]g(t - nT) \tag{12}$$

In the case of a time varying channel, systems convolve-and-modulate the transmit pulse (c.f. the channel Eq. (2)) with a two dimensional delta train which samples the time frequency domain at a certain Baud rate and subcarrier spacing.

The sampling rate in the time-frequency domain is related to the bandwidth and time duration of the pulse $g_{tr}(t)$ namely its time-frequency localization. In order for the orthogonality condition of (9) to hold for a frequency spacing $\Delta f$, the time spacing must be $T \geq 1/\Delta f$. The critical sampling case of $T=1/\Delta f$ is generally not practical and refers to limiting cases, for example to OFDM systems with cyclic prefix length equal to zero or to filter banks with $g_{tr}(t)$ equal to the ideal Nyquist pulse.

Some examples are now in order:

Example 1: OFDM Modulation: Consider an OFDM system with M subcarriers, symbol length $T_{OFDM}$, cyclic prefix length $T_{CP}$ and subcarrier spacing $1/T_{OFDM}$. Substitute in Equation (10) symbol duration $T=T_{OFDM}+T_{CP}$, number of symbols N=1, subcarrier spacing $\Delta f=1/T_{OFDM}$ and $g_{tr}(t)$ a square window that limits the duration of the subcarriers to the symbol length T $$g_{tr}(t) = \begin{cases} 1/\sqrt{T - T_{CP}}, & -T_{CP} < t < T - T_{CP} \\ 0, & \text{else} \end{cases} \tag{13}$$

Results in the OFDM formula below. Strictly speaking, the pulse of Eq. (10) is not orthonormal but is orthogonal to the receive filter (where the CP samples are discarded) as will be shown in this document.

$$x(t) = \sum_{m=-M/2}^{M/2-1} X[n, m]g_{tr}(t)e^{j2\pi m\Delta ft} \tag{14}$$

Example 2: Single Carrier Modulation: Equation (10) reduces to single carrier modulation with M=1 subcarrier, T equal to the Baud period and $g_{tr}(t)$ equal to a square root raised cosine Nyquist pulse.

Example 3: Multicarrier Filter Banks (MCFB): Equation (10) describes a MCFB if $g_{tr}(t)$ is a square root raised cosine Nyquist pulse with excess bandwidth $\alpha$, T is equal to the Baud period and $\Delta f=(1+\alpha)/T$.

Expressing the modulation operation as a Heisenberg transform as in Eq. (11) may be counterintuitive. Modulation is usually considered to be a transformation of the modulation symbols X[m, n] to a transmit waveform s(t). The Heisenberg transform instead, uses X[m, n] as weights/parameters of an operator that produces s(t) when applied to the prototype transmit filter response $g_{tr}(t)$—c.f. Eq. (11). While possibly counterintuitive, this formulation is useful in pursuing an abstraction of the modulation-channel-demodulation cascade effects in a two dimensional domain where the channel can be described as time invariant.

On the receiver side, processing is performed to go back from the waveform domain to the time-frequency domain. Since the received signal has undergone the cascade of two Heisenberg transforms (one by the modulation effect and one by the channel effect), it is natural to inquire what the end-to-end effect of this cascade is. The answer to this question is given by the following result:

Proposition 1: Let two Heisenberg transforms as defined by Eqs. (7), (2) be parametrized by impulse responses $h_1(\tau, \nu)$, $h_2(\tau,\nu)$ and be applied in cascade to a waveform $g(t) \in \mathcal{H}$. Then $$\Pi_{h_2}(\Pi_{h_1}(g(t))) = \Pi_h(g(t)) \quad (15)$$

where $h(\tau, \nu) = h_2(\tau, \nu) \odot h_1(\tau, \nu)$ is the "twisted" convolution of $h_1(\tau, \nu)$, $h_2(\tau, \nu)$ defined by the following convolve-and-modulate operation $$h(\tau,\nu) = \iint h_2(\tau',\nu') h_1(\tau-\tau',\nu-\nu') e^{j2\pi\nu'(\tau-\tau')} d\tau' d\nu' \quad (16)$$

Proof: Provided elsewhere in the document.

Applying the above result to the cascade of the modulation and channel Heisenberg transforms of (11) and (7), it can be shown that the received signal is given by the Heisenberg transform $$r(t) = \Pi_f(g_{tr}(t)) + v(t) = \iint f(\tau,\nu) e^{j2\pi\nu(t-\tau)} g_{tr}(t-\tau) d\nu d\tau + v(t) \quad (17)$$

where $v(t)$ is additive noise and $f(\tau, \nu)$, the impulse response of the combined transform, is given by the twisted convolution of $X[n, m]$ and $h(\tau, \nu)$ $$f(\tau, \nu) = h(\tau, \nu) \odot X[n, m] = \sum_{m=-M/w}^{M/2-1} \sum_{n=0}^{N-1} X[n, m] h(\tau - nT, \nu - m\Delta f) e^{j2\pi(\nu - m\Delta f)nT} \quad (18)$$

This result can be considered an extension of the single carrier modulation case, where the received signal through a time invariant channel is given by the convolution of the QAM symbols with a composite pulse, that pulse being the convolution of the transmitter pulse and the channel impulse response.

Receiver Processing and the Wigner Transform

Figure 5:
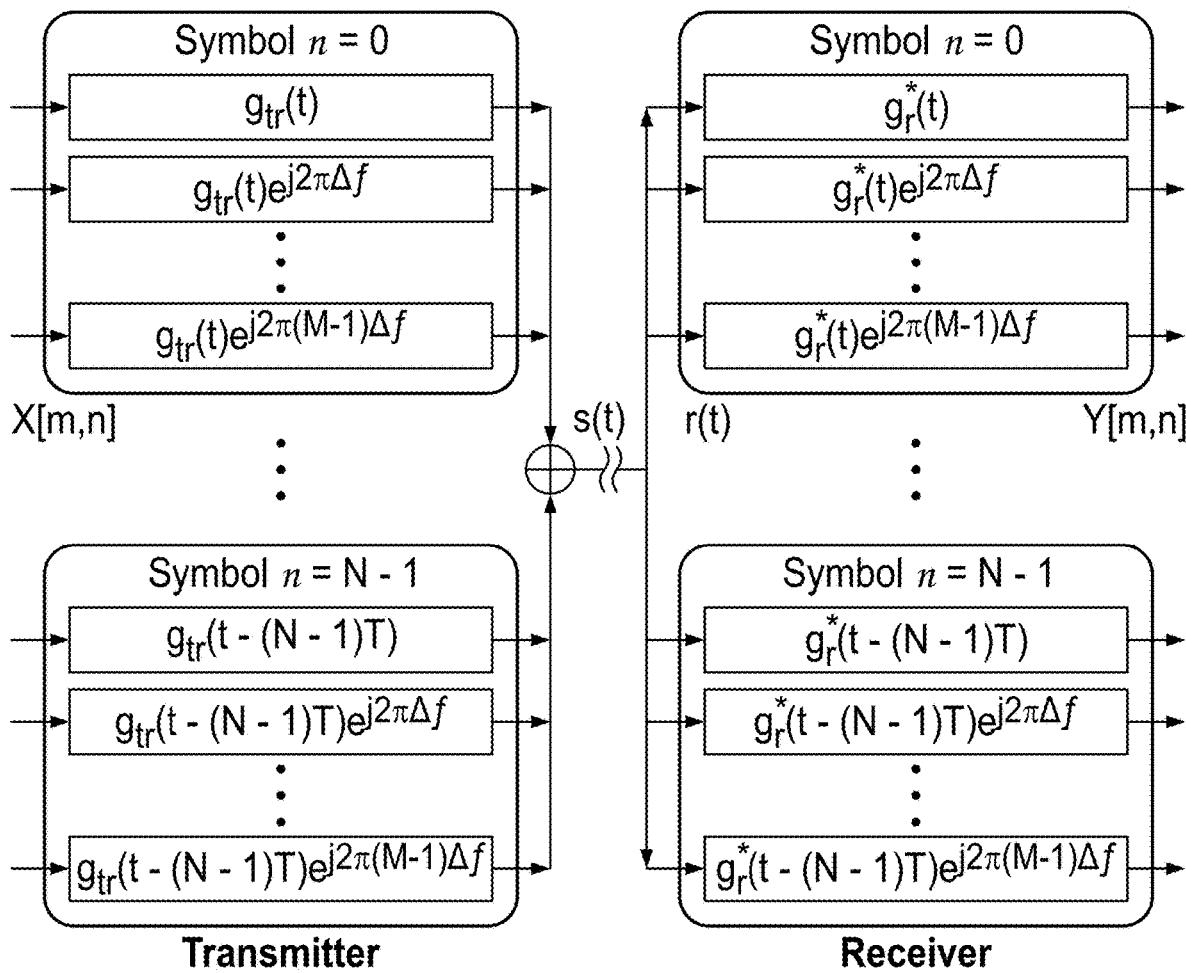
FIG. 5 illustrates a conceptual Implementation of the Heisenberg Transform in the Transmitter and the Wigner Transform in the Receiver.

Typical communication system design dictates that the receiver performs a matched filtering operation, taking the inner product of the received waveform with the transmitter pulse, appropriately delayed or otherwise distorted by the channel. Typical OTFS systems include a collection of delayed and modulated transmit pulses, and a receiver may perform a matched filter on each one of them. FIG. 5 provides a conceptual view of this processing. On the transmitter, a set of M subcarriers is modulated for each symbol transmitted, while on the receiver matched filtering is performed on each of those subcarrier pulses. Define a receiver pulse $g_r(t)$ and take the inner product with a collection of delayed and modulated versions of it. The receiver pulse $g_r(t)$ is in many cases identical to the transmitter pulse, but we keep the separate notation to cover some cases where it is not (most notably in OFDM where the CP samples have to be discarded).

While this approach will yield the sufficient statistics for data detection in the case of an ideal channel, a concern can be raised here for the case of non-ideal channel effects. In this case, the sufficient statistics for symbol detection are obtained by matched filtering with the channel-distorted, information-carrying pulses (assuming that the additive noise is white and Gaussian). In many well designed multicarrier systems however (e.g., OFDM and MCFB), the channel distorted version of each subcarrier signal is only a scalar version of the transmitted signal, allowing for a matched filter design that is independent of the channel and uses the original transmitted subcarrier pulse. The present document makes these statements more precise and examines the conditions for this to be true.

FIG. 5 is only a conceptual illustration and does not point to the actual implementation of the receiver. Typically this matched filtering is implemented in the digital domain using an FFT or a polyphase transform for OFDM and MCFB (multi-channel filter bank) respectively. In this paper we are rather more interested in the theoretical understanding of this modulation. To this end, consider a generalization of this matched filtering by taking the inner product $<g_r(t-\tau)e^{j2\pi\nu(t-\tau)}, r(t)>$ of the received waveform with the delayed and modulated versions of the receiver pulse for arbitrary time and frequency offset $(\tau, \nu)$. While this may not be a specific implementation, it allows to view the operations of FIG. 5 as a two dimensional sampling of this more general inner product.

Define the Inner Product:

$$A_{g_r,r}(\tau,\nu) = <g_r(t-\tau)e^{j2\pi\nu(t-\tau)}, r(t)> = \int g_r^*(t-\tau) e^{-j2\pi\nu(t-\tau)} r(t) dt \quad (19)$$

The function $A_{g_r,r}(\tau, \nu)$ is known as the cross-ambiguity function in the radar and math communities and yields the matched filter output if sampled at $\tau=nT$, $\nu=m\Delta f$ (on the lattice $\Lambda$), i.e., $$Y[n,m] = A_{g_r,r}(\tau,\nu)|_{\tau=nT,\nu=m\Delta f} \quad (20)$$

In the math community, the ambiguity function is related to the inverse of the Heisenberg transform, namely the Wigner transform. FIG. 5 provides an intuitive feel for that, as the receiver appears to invert the operations of the transmitter. More formally, if a systems takes the cross-ambiguity or the transmit and receive pulses $A_{(g_r,g_{tr})}(\tau,\nu)$, and uses it as the impulse response of the Heisenberg operator, then it can obtain the orthogonal cross-projection operator $$\Pi_{A_{gr,gtr}}(y(t)) = g_{tr}(t) < g_r(t), y(t) >$$

In words, the coefficients that come out of the matched filter, if used in a Heisenberg representation, will provide the best approximation to the original $y(t)$ in the sense of minimum square error.

The key question here is what the relationship is between the matched filter output $Y[n, m]$ (or more generally $Y(\tau, \nu)$) and the transmitter input $X[n, m]$. We have already established in (17) that the input to the matched filter $r(t)$ can be expressed as a Heisenberg representation with impulse response $f(\tau, \nu)$ (plus noise). The output of the matched filter then has two contributions $$Y(\tau,\nu) = A_{g_r,r}(\tau,\nu) = A_{g_r,[\Pi_f(g_{tr})+v]}(\tau,\nu) = A_{g_r,\Pi_f(g_{tr})}(\tau,\nu) + A_{g_r,v}(\tau,\nu) \quad (21)$$

The last term is the contribution of noise, which we can be denotes as $V(\tau, \nu) = A_{g_r,v}(\tau, \nu)$. The first term on the right hand side is the matched filter output to the (noiseless) input comprising of a superposition of delayed and modulated versions of the transmit pulse. One can next establish that this term can be expressed as the twisted convolution of the two dimensional impulse response $f(\tau, \nu)$ with the cross-ambiguity function (or two dimensional cross correlation) of the transmit and receive pulses.

The following theorem summarizes the result.

Theorem 1: (Fundamental time-frequency domain channel equation). If the received signal can be expressed as $$\Pi_f(g_{tr}(t)) = \iint f(\tau,\nu) e^{j2\pi\nu(t-\tau)} g_{tr}(t-\tau) d\nu d\tau \quad (22)$$

Then the cross-ambiguity of that signal with the receive pulse $g_{tr}(t)$ can be expressed as $$A_{g_r, \Pi_f(g_{tr})}(\tau,\nu) = f(\tau,\nu) \odot A_{g_r, g_{tr}}(\tau,\nu) \quad (23)$$

Proof: is provided elsewhere in the present document.

Recall from (18) that $f(\tau,\nu) = h(\tau,\nu) \odot X[n,m]$, that is, the composite impulse response is itself a twisted convolution of the channel response and the modulation symbols.

Substituting $f(\tau,\nu)$ from (18) into (21) one can obtain the end-to-end channel description in the time frequency domain:

$$Y(\tau,\nu) = A_{g_r, \Pi_f(g_{tr})}(\tau,\nu) + V(\tau,\nu) = \quad (24)$$
$$h(\tau,\nu) \odot X[n,m] \odot A_{g_r, g_{tr}}(\tau,\nu) + V(\tau,\nu)$$

where $V(\tau,\nu)$ is the additive noise term. Eq. (24) provides an abstraction of the time varying channel on the time-frequency plane. It states that the matched filter output at any time and frequency point $(\tau,\nu)$ is given by the delay-Doppler impulse response of the channel twist-convolved with the impulse response of the modulation operator twist-convolved with the cross-ambiguity (or two dimensional cross correlation) function of the transmit and receive pulses.

Evaluating Eq. (24) on the lattice $\Lambda$ one can obtain the matched filter output modulation symbol estimates $$\hat{X}[m,n] = Y[n,m] = Y(\tau,\nu)|_{\tau=nT, \nu=m\Delta f} \quad (25)$$

In order to get more intuition on Equations (24), (25) first consider the case of an ideal channel, i.e., $h(\tau,\nu) = \delta(\tau)\delta(\nu)$. In this case by direct substitution one can get the convolution relationship:

$$Y[n,m] = \quad (26)$$
$$\sum_{m'=-M/2}^{M/2-1} \sum_{n'=0}^{N-1} X[n',m'] A_{g_r, g_{tr}}((n-n')T, (m-m')\Delta f) + V[m,n]$$

In order to simplify Eq. (26) one can use the orthogonality properties of the ambiguity function. Since implementations may in general use different transmit and receive pulses one can modify the orthogonality condition on the design of the transmit pulse we stated in (9) to a bi-orthogonality condition:

$$< g_{tr}(t), g_r(t-nT)e^{j2\pi m\Delta f(t-nT)} > \quad (27)$$
$$= \int g_{tr}^*(t) g_r(t-nT) e^{j2\pi m\Delta f(t-nT)} dt = \delta(m)\delta(n)$$

Under this condition, only one term survives in (26) and resulting in:

$$Y[n,m] = X[n,m] + V[n,m] \quad (28)$$

where $V[n,m]$ is the additive white noise. Eq. (28) shows that the matched filter output does recover the transmitted symbols (plus noise) under ideal channel conditions. Of more interest of course is the case of non-ideal time varying channel effects. This document shows that, even in this case, the channel orthogonalization is maintained (no intersymbol or intercarrier interference), while the channel complex gain distortion has a closed form expression.

The following theorem summarizes the result as a generalization of (28).

Theorem 2: (End-to-end time-frequency domain channel equation):

If $h(\tau,\nu)$ has finite support bounded by $(\tau_{max}, \nu_{max})$ and if $A_{g_r, g_{tr}}(\tau,\nu) = 0$ for $\tau \in (nT-\tau_{max}, nT+\tau_{max}), \nu \in (m\Delta f-\nu_{max}, m\Delta f+\nu_{max})$, that is, the ambiguity function bi-orthogonality property of (27) is true in a neighborhood of each grid point $(m\Delta f, nT)$ of the lattice $\Lambda$ at least as large as the support of the channel response $h(\tau,\nu)$, then the following equation holds $$Y[n,m] = H[n,m] X[n,m]$$

$$H[n,m] = \iint h(\tau,\nu) e^{j2\pi\nu nT} e^{-j2\pi(\nu+m\Delta f)\tau} d\nu d\tau \quad (29)$$

If the ambiguity function is only approximately bi-orthogonal in the neighborhood of $\Lambda$ (by continuity), then (29) is only approximately true Proof: provided elsewhere in the present document.

Eq. (29) is a fundamental equation that describes the channel behavior in the time-frequency domain. It is the basis for understanding the nature of the channel and its variations along the time and frequency dimensions.

Some observations are now in order on Eq. (29). As mentioned before, there is no interference across $X[n,m]$ in either time n or frequency m.

The end-to-end channel distortion in the modulation domain is a (complex) scalar that should be equalized.

If there is no Doppler, i.e. $h(\tau,\nu) = h(\tau, 0)\delta(\nu)$, then Eq. (29) becomes $$Y[n,m] = X[n,m] \int h(\tau,0) e^{-j2\pi m\Delta f \tau} d\tau = X[n,m] H(0, m\Delta f) \quad (30)$$

which is the well-known multicarrier result, that each subcarrier symbol is multiplied by the frequency response of the time invariant channel evaluated at the frequency of that subcarrier.

If there is no multipath, i.e. $h(\tau,\nu) = h(0,\nu)\delta(\tau)$, then Eq. (29) becomes $$Y[n,m] = X[n,m] \int h(\nu,0) e^{j2\pi\nu nT} d\tau \quad (31)$$

Notice that the fading each subcarrier experiences as a function of time nT has a complicated expression as a weighted superposition of exponentials. This is a major complication in the design of wireless systems with mobility like LTE; it necessitates the transmission of pilots and the continuous tracking of the channel, which becomes more difficult the higher the vehicle speed or Doppler bandwidth is.

Some examples of this general framework include the following.

Figure 6:
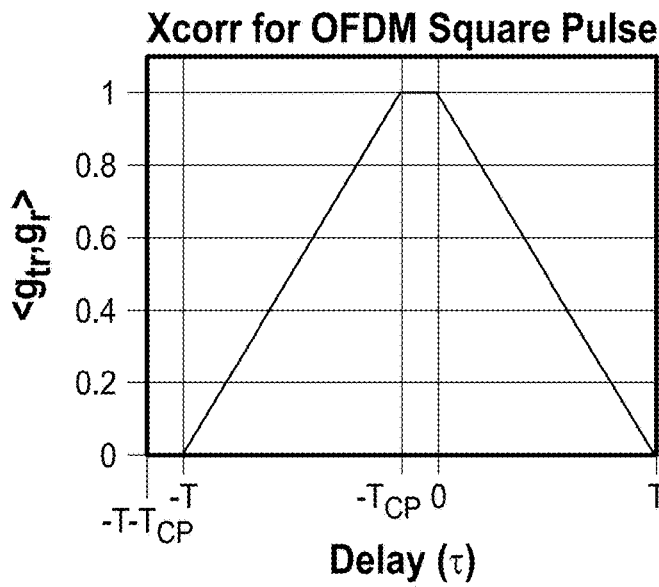
FIG. 6 illustrates cross-correlation between $g_{tr}(t)$ and $g_r(t)$ for OFDM Systems.

Example 3: (OFDM modulation). In this case the fundamental transmit pulse is given by (13) and the fundamental receive pulse is $$g_r(t) = \begin{cases} 0 & -T_{CP} < t < 0 \\ \dfrac{1}{\sqrt{T-T_{CP}}} & 0 < t < T - T_{CP} \\ 0 & \text{else} \end{cases} \quad (32)$$

i.e., the receiver zeroes out the CP samples and applies a square window to the symbols comprising the OFDM symbol. It is worth noting that in this case, the bi-orthogonality property holds exactly along the time dimension. FIG. 6 shows the cross correlation between the transmit and receive pulses of (13) and (32). The cross correlation is exactly equal to one and zero in the vicinity of zero and $\pm T$ respectively, while holding those values for the duration of $T_{CP}$. Hence, as long as the support of the channel on the time dimension is less than $T_{CP}$ the bi-orthogonality condition is satisfied along the time dimension. Across the frequency dimension the condition is only approximate, as the ambiguity takes the form of a sinc function as a function of frequency and the nulls are not identically zero for the whole support of the Doppler spread.

Example 4: (MCFB modulation). In the case of multicarrier filter banks $g_{tr}(t)=g_r(t)=g(t)$. There are several designs for the fundamental pulse g(t). A square root raised cosine pulse provides good localization along the frequency dimension at the expense of less localization along the time dimension. If T is much larger than the support of the channel in the time dimension, then each subchannel sees a flat channel and the bi-orthogonality property holds approximately.

In summary, it will be appreciated that the one of the two transforms that define OTFS have been described. How the transmitter and receiver apply appropriate operators on the fundamental transmit and receive pulses and orthogonalize the channel according to Eq. (29) has also been disclosed. One can see by examples how the choice of the fundamental pulse affect the time and frequency localization of the transmitted modulation symbols and the quality of the channel orthogonalization that is achieved. However, Eq. (29) shows that the channel in this domain, while free of intersymbol interference, suffers from fading across both the time and the frequency dimensions via a complicated superposition of linear phase factors.

The next section starts from Eq. (29) and describes the second transform that defines OTFS. This section shows how that transform defines an information domain where the channel does not fade in either dimension.

The 2D OTFS Transform

The time-frequency response H[n, m] in (29) is related to the channel delay-Doppler response h(τ, ν) by an expression that resembles a Fourier transform. However, there are two important differences: (i) the transform is two dimensional (along delay and Doppler) and (ii) the exponentials defining the transforms for the two dimensions have opposing signs. Despite these difficulties, Eq. (29) points in the direction of using complex exponentials as basis functions on which to modulate the information symbols; and only transmit on the time-frequency domain the superposition of those modulated complex exponential bases. This is the approach generally used herein.

This is similar to the SC-FDMA modulation scheme, where in the frequency domain we transmit a superposition of modulated exponentials (the output of the DFT preprocessing block). The reason to pursue this direction is to exploit Fourier transform properties and translate a multiplicative channel in one Fourier domain to a convolution channel in the other Fourier domain.

Given the difficulties of Eq. (29) mentioned above, a suitable version of Fourier transform and associated sampling theory results is useful. The following definitions can be used:

Definition 1: Symplectic Discrete Fourier Transform: Given a square summable two dimensional sequence $X[m, n] \in \mathbb{C}(\Lambda)$ we define $$x(\tau, \nu) = \sum_{m,n} X[n,m] e^{-j2\pi(\nu nT - \tau m\Delta f)} \triangleq SDFT(X[n,m]) \quad (33)$$

The above 2D Fourier transform (sometimes known as the Symplectic Discrete Fourier Transform in the math community) differs from the more well known Cartesian Fourier transform in that the exponential functions across each of the two dimensions have opposing signs. This is necessary in this case, as it matches the behavior of the channel equation.

Further notice that the resulting $x(\tau, \nu)$ is periodic with periods $(1/\Delta f, 1/T)$. This transform defines a new two dimensional plane, which we will call the delay-Doppler plane, and which can represent a max delay of $1/\Delta f$ and a max Doppler of 1/T. A one dimensional periodic function is also called a function on a circle, while a 2D periodic function is called a function on a torus (or donut). In this case $x(\tau, \nu)$ is defined on a torus Z with circumferences (dimensions) $(1/\Delta f, 1/T)$.

The periodicity of $x(\tau, \nu)$ (or sampling rate of the time-frequency plane) also defines a lattice on the delay-Doppler plane, which can be called the reciprocal lattice $$\Lambda^\perp = \left\{ \left( m\frac{1}{\Delta f}, n\frac{1}{T} \right), n, m \in \mathbb{Z} \right\} \quad (34)$$

The points on the reciprocal lattice have the property of making the exponent in (33), an integer multiple of $2\pi$.

The inverse transform is given by:

$$X[n,m] = \frac{1}{c} \int_0^{\frac{1}{\Delta f}} \int_0^{\frac{1}{T}} x(\tau, \nu) e^{j2\pi(\nu nT - \tau m\Delta f)} d\nu \, d\tau \triangleq SDFT^{-1}(x(\tau, \nu)) \quad (35)$$

where $c = T\Delta f$.

Next, define a sampled version of $x(\tau, \nu)$. In particular, a version that can take M samples on the delay dimension (spaced at $1/M\Delta f$) and N samples on the Doppler dimension (spaced at 1/NT). More formally we define a denser version of the reciprocal lattice $$\Lambda_0^\perp = \left\{ \left( m\frac{1}{M\Delta f}, n\frac{1}{NT} \right), n, m \in \mathbb{Z} \right\} \quad (36)$$

So that $\Lambda^\perp \subseteq \Lambda_0^\perp$. Define discrete periodic functions on this dense lattice with period $(1/\Delta f, 1/T)$, or equivalently define functions on a discrete torus with these dimensions $$Z_0^\perp = \left\{ \left( m\frac{1}{M\Delta f}, n\frac{1}{NT} \right), m = 0, \ldots, M-1, n = 0, \ldots N-1, \right\} \quad (37)$$

These functions are related via Fourier transform relationships to discrete periodic functions on the lattice Λ, or equivalently, functions on the discrete torus $$Z_0 = \{(nT, m\Delta f), m=0, \ldots, M-1, n=0, \ldots N-1,\} \quad (38)$$

It is useful to develop an expression for sampling Eq. (33) on the lattice of (37). First, start with the following definition.

Definition 2: Symplectic Finite Fourier Transform: If $X_p[k, l]$ is periodic with period (N, M), then we define $$x_p[m, n] = \sum_{k=0}^{N-1} \sum_{l=-\frac{M}{2}}^{\frac{M}{2}-1} X_p[k, l] e^{-j2\pi\left(\frac{nk}{N} - \frac{ml}{M}\right)} \triangleq SFFT(X[k, l]) \quad (39)$$

Notice that $x_p[m, n]$ is also periodic with period [M, N] or equivalently, it is defined on the discrete torus $Z_0^\perp$. Formally, the SFFT (X[n, m]) is a linear transformation from $\mathbb{C}(Z_0) \to \mathbb{C}(Z_0^\perp)$.

Now consider generating $x_p[m, n]$ as a sampled version of (33), i.e., $x_p[m, n] =$ $$x_p[m, n] = x[m, n] = x(\tau, \nu)|_{\tau=\frac{m}{M\Delta f}, \nu=\frac{n}{NT}}.$$

Then it can be shown that (39) still holds where periodization of X[n, m] with period (N, M)

$$X_p[n, m] = \sum_{l,k=-\infty}^{\infty} X[n - kN, m - lM] \quad (40)$$

This is similar to the well-known result that sampling in one Fourier domain creates aliasing in the other domain.

The inverse discrete (symplectic) Fourier transform is given by $$X_p[n, m] = \frac{1}{MN} \sum_{l,k} x[l, k] e^{j2\pi\left(\frac{nk}{N} - \frac{ml}{M}\right)} \triangleq SFFT^{-1}(x[l, k]) \quad (41)$$

where l=0, . . . , M−1, k=0, . . . , N−1. If the support of X[n, m] is time-frequency limited to $Z_0$ (no aliasing in (40)), then $X_p[n, m] = X[n, m]$ for n, m∈$Z_0$, and the inverse transform (41) recovers the original signal.

In the math community, the SDFT is called "discrete" because it represents a signal using a discrete set of exponentials, while the SFFT is called "finite" because it represents a signal using a finite set of exponentials.

Arguably the most important property of the symplectic Fourier transform is that it transforms a multiplicative channel effect in one domain to a circular convolution effect in the transformed domain. This is summarized in the following proposition:

Proposition 2: Let $X_1[n, m] \in \mathbb{C}(Z_0)$, $X_2[n, m] \in \mathbb{C}(Z_0)$ be periodic 2D sequences. Then $$SFFT(X_1[n,m] * X_2[n,m]) = SFFT(X_1[n,m]) \cdot SFFT(X_2[n,m]) \quad (42)$$

where * denotes two dimensional circular convolution.

Proof: is provided elsewhere in this document.

Discrete OTFS modulation: Consider a set of NM QAM information symbols arranged on a 2D grid x[l, k], k=0, . . . , N−1, l=0, . . . , M−1 that a transmitter wants to transmit. Without loss of generality, consider x[l, k] to be two dimensional periodic with period [N, M]. Further, assume a multicarrier modulation system defined by

[A] A lattice on the time frequency plane, that is a sampling of the time axis with sampling period T and the frequency axis with sampling period Δf (c.f. Eq. (8)).

[B] A packet burst with total duration NT secs and total bandwidth MΔf Hz.

[C] Transmit and receive pulses $g_{tr}(t)$, $g_{tr}(t) \in L_2(\mathbb{R})$ satisfying the bi-orthogonality property of (27)

[D] A transmit windowing square summable function $W_{tr}[n, m] \in \mathbb{C}$ (Λ) multiplying the modulation symbols in the time-frequency domain

[E] A set of modulation symbols X[n, m], n=0, . . . , N−1, m=0, . . . , M−1 related to the information symbols x[k, l] by a set of basis functions $b_{k,l}[n, m]$ $$X[n, m] = \quad (43)$$

$$\frac{1}{MN} W_{tr}[n, m] \sum_{k=0}^{N-1} \sum_{l=0}^{M-1} x[l, k] b_{k,l}[n, m] b_{k,l}[n, m] = e^{j2\pi\left(\frac{ml}{M} - \frac{nk}{N}\right)}$$

where the basis functions $b_{k,l}[n, m]$ are related to the inverse symplectic Fourier transform (c.f., Eq. (41))

Given the above components, define the discrete OTFS modulation via the following two steps $$X[n,m] = W_{tr}[n,m] SFFT^{-1}(x[k,l])$$

$$s(t) = \Pi_X(g_{tr}(t)) \quad (44)$$

The first equation in (44) describes the OTFS transform, which combines an inverse symplectic transform with a widowing operation. The second equation describes the transmission of the modulation symbols X[n, m] via a Heisenberg transform of $g_{tr}(t)$ parameterized by X[n, m]. More explicit formulas for the modulation steps are given by Equations (41) and (10).

While the expression of the OTFS modulation via the symplectic Fourier transform reveals important properties, it is easier to understand the modulation via Eq. (43), that is, transmitting each information symbol x[k, l] by modulating a 2D basis function $b_{k,l}[n, m]$ on the time-frequency plane.

Figure 7:
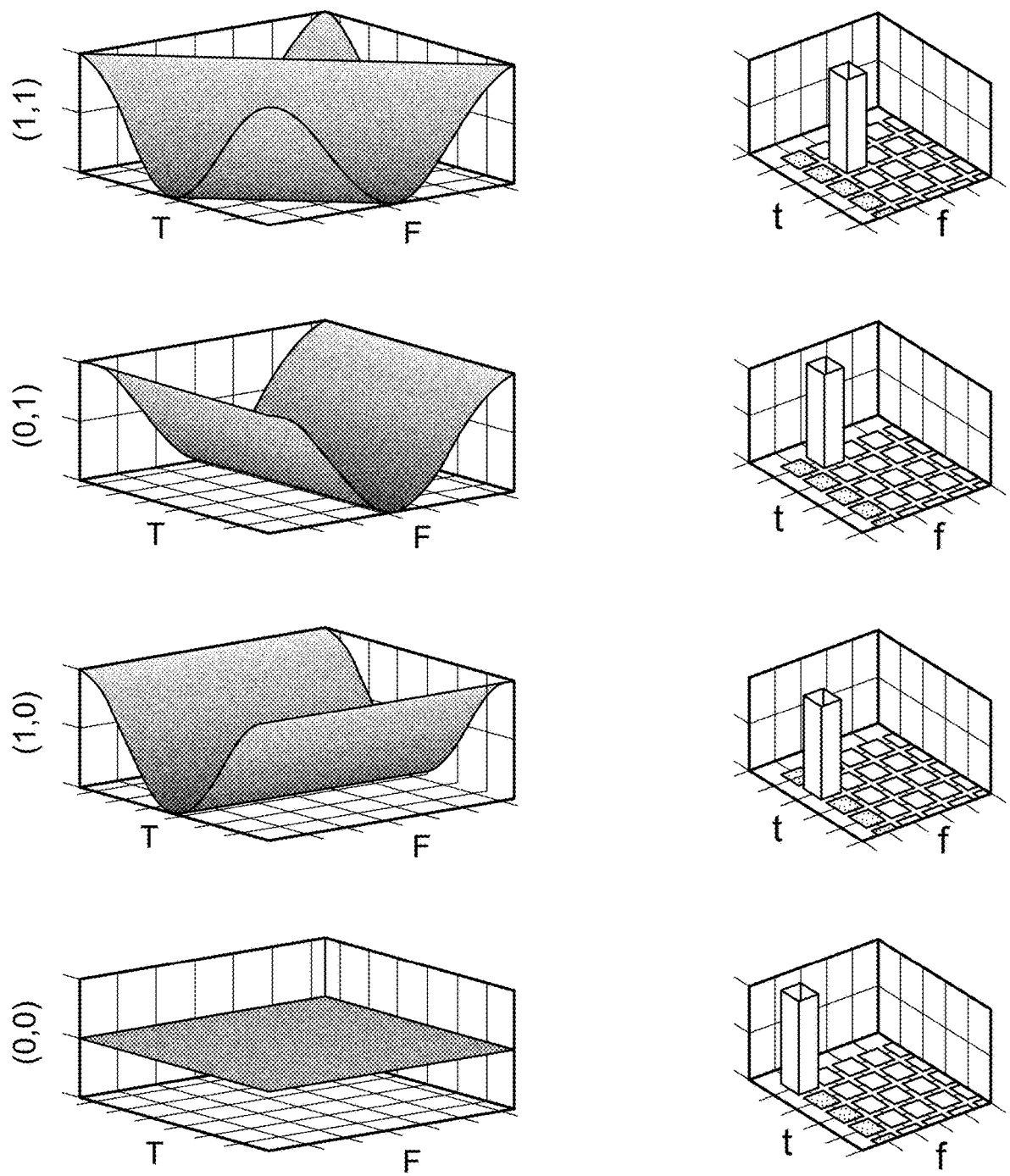
FIG. 7 depicts example of information symbols in the Information (Delay-Doppler) Domain (Right), and Corresponding Basis Functions in the Time-Frequency Domain (Left).

FIG. 7 visualizes this interpretation by isolating each symbol in the information domain and showing its contribution to the time-frequency modulation domain. Of course the transmitted signal is the superposition of all the symbols on the right (in the information domain) or all the basis functions on the left (in the modulation domain).

FIG. 7 uses the trivial window $W_{tr}[n, m] = 1$ for all n=0, . . . , N−1, $$m = -\frac{M}{2}, \ldots \frac{M}{2} - 1$$

and zero else. This may seem superfluous but there is a technical reason for this window: recall that $SFFT^{-1}(x[k, l])$ is a periodic sequence that extends to infinite time and bandwidth. By applying the window transmitters can limit the modulation symbols to the available finite time and bandwidth. The window in general could extend beyond the period of the information symbols [M, N] and could have a shape different from a rectangular pulse. This would be akin to adding cyclic prefix/suffix in the dimensions of both time and frequency with or without shaping. The choice of window has implications on the shape and resolution of the channel response in the information domain as we will discuss later. It also has implications on the receiver processing as the potential cyclic prefix/suffix has to either be removed or otherwise handled.

Discrete OTFS demodulation: Assume that the transmitted signal s(t) undergoes channel distortion according to (7), (2) yielding r(t) at the receiver. Further, let the receiver employ a receive windowing square summable function $W_r[n, m]$. Then, the demodulation operation consists of the following steps:
(i) Matched filtering with the receive pulse, or more formally, evaluating the ambiguity function on Λ (Wigner transform) to obtain estimates of the time-frequency modulation symbols $$Y[n,m]=A_{g_r,y}(\tau,\nu)|_{\tau=nT,\nu=m\Delta f} \qquad (45)$$

(ii) windowing and periodization of Y[n, m]

$$Y_w[n, m] = W_r[n, m]Y[n, m] \qquad (46)$$

$$Y_p[n, m] = \sum_{k,l=-\infty}^{\infty} Y_w[n - kN, m - lM]$$

(iii) and applying the symplectic Fourier transform on the periodic sequence $Y_p[n,m]$ $$\hat{x}[l,k]=y[l,k]=\mathrm{SFFT}(Y_p[n,m]) \qquad (47)$$

The first step of the demodulation operation can be interpreted as a matched filtering operation on the time-frequency domain as discussed earlier. The second step is there to ensure that the input to the SFFT is a periodic sequence. If a trivial window is used, this step can be skipped. The third step can also be interpreted as a projection of the time-frequency modulation symbols on the orthogonal basis functions $$\hat{x}[l, k] = \sum_{m=0}^{M-1}\sum_{n=0}^{N-1} \hat{X}(n, m) b_{k,l}^*(n, m) \qquad (48)$$

$$b_{k,l}^*(n, m) = e^{-j2\pi\left(\frac{lm}{L} - \frac{kn}{K}\right)}$$

The discrete OTFS modulation defined above points to efficient implementation via discrete-and-periodic FFT type processing. However, it may not provide insight into the time and bandwidth resolution of these operations in the context of two dimensional Fourier sampling theory. This document introduces the continuous OTFS modulation and relate the more practical discrete OTFS as a sampled version of the continuous modulation.

Continuous OTFS modulation: Consider a two dimensional periodic function $x(\tau, \nu)$ with period [1/Δf, 1/T] that a transmitter wants to transmit; the choice of the period may seem arbitrary at this point, but it will become clear after the discussion next. Further, assume a multicarrier modulation system defined by
(A) A lattice on the time frequency plane, that is a sampling of the time axis with sampling period T and the frequency axis with sampling period Δf (c.f. Eq. (8)).
(B) Transmit and receive pulses $g_{tr}(t)$, $g_{tr}(t) \in L_2(\mathbb{R})$ satisfying the bi-orthogonality property of (27)
(C) A transmit windowing function $W_{tr}[n, m] \in \mathbb{C}$ (Λ) multiplying the modulation symbols in the time-frequency domain Given the above components, define the continuous OTFS modulation via the following two steps $$X[n,m]=W_{tr}[n,m]\mathrm{SDFT}^{-1}(x(\tau,\nu))$$

$$s(t)=\Pi_X(g_{tr}(t)) \qquad (49)$$

The first equation describes the inverse discrete time-frequency symplectic Fourier transform [c.f. Eq. (35)] and the windowing function, while the second equation describes the transmission of the modulation symbols via a Heisenberg transform [c.f. Eq. (10)].

Continuous OTFS demodulation: Assume that the transmitted signal s(t) undergoes channel distortion according to (7), (2) yielding r(t) at the receiver. Further, let the receiver employ a receive windowing function $W_r[n, m] \in \mathbb{C}$ (Λ). Then, the demodulation operation consists of two steps:
(i) Evaluating the ambiguity function on Λ (Wigner transform) to obtain estimates of the time-frequency modulation symbols $$Y[n,m]=A_{g_r,y}(\tau,\nu)|_{\tau=nT,\nu=m\Delta f} \qquad (50)$$

(ii) Windowing and applying the symplectic Fourier transform on the modulation symbols $$\hat{x}(\tau,\nu)=\mathrm{SDFT}(W_r[n,m]Y[n,m]) \qquad (51)$$

In (50), (51) there is no periodization of Y[n, m], since the SDFT is defined on aperiodic square summable sequences. The periodization step needed in discrete OTFS can be understood as follows. Suppose we wish to recover the transmitted information symbols by performing a continuous OTFS demodulation and then sampling on the delay-Doppler grid $$\hat{x}(l, k) = \hat{x}(\tau, \nu)|_{\tau=\frac{m}{M\Delta f},\nu=\frac{n}{NT}}$$

Since performing a continuous symplectic Fourier transform is not practical, consider whether the same result can be obtained using SFFT. The answer is that SFFT processing will produce exactly the samples as if the input sequence is first periodized (aliased)—see also (39) (40).

The description so covers all the steps of the OTFS modulation as depicted in FIG. 3. The document has also discussed how the Wigner transform at the receiver inverts the Heisenberg transform at the transmitter [c.f. Eqs. (26), (28)], and similarly for the forward and inverse symplectic Fourier transforms. The practical question is what form the end-to-end signal relationship takes when a non-ideal channel is between the transmitter and receiver.

Channel Equation in the OTFS Domain

The main result in this section shows how the time varying channel in (2), (7), is transformed to a time invariant convolution channel in the delay Doppler domain.
Proposition 3: Consider a set of NM QAM information symbols arranged in a 2D periodic sequence x[l, k] with period [M, N]. The sequence x[k, l] undergoes the following transformations:
(a) It is modulated using the discrete OTFS modulation of Eq. (44).
(b) It is distorted by the delay-Doppler channel of Eqs. (2), (7).

(c) It is demodulated by the discrete OTFS demodulation of Eqs. (45), (47).

The estimated sequence $\hat{x}[l, k]$ obtained after demodulation is given by the two dimensional periodic convolution $$\hat{x}[l, k] \simeq \frac{1}{MN} \sum_{m=0}^{M-1} \sum_{n=0}^{N-1} x[m, n] h_w\left(\frac{l-m}{M\Delta f}, \frac{k-n}{NT}\right) \quad (52)$$

of the input QAM sequence x[m, n] and a sampled version of the windowed impulse response $h_w(\cdot)$, $$h_w\left(\frac{l-m}{M\Delta f}, \frac{k-n}{NT}\right) = h_w(\tau', v')|_{\tau'=\frac{l-m}{M\Delta f}, v'=\frac{k-n}{NT}} \quad (53)$$

where $h_w(\tau', v')$ denotes the circular convolution of the channel response with a windowing function. To be precise, in the window $w(\tau, v)$ is circularly convolved with a slightly modified version of the channel impulse response $e^{\hat{}}(-j2\pi v\tau) h(\tau, v)$ (by a complex exponential) as can be seen in the equation.

$$h_w(\tau', v') = \iint e^{-j2\pi v\tau} h(\tau, v) w(\tau'-\tau, v'-v) d\tau dv \quad (54)$$

where the windowing function $w(\tau, v)$ is the symplectic Fourier transform of the time-frequency window W[n, m]

$$W(\tau, v) = \sum_{m=0}^{M-1} \sum_{n=0}^{N-1} W[n, m] e^{-j2\pi(vnT - \tau m\Delta f)} \quad (55)$$

and where W[n, m] is the product of the transmit and receive window.

$$W[n,m] = W_{tr}[n,m] W_r[n,m] \quad (56)$$

Proof: provided elsewhere in the document.

In many cases, the windows in the transmitter and receiver are matched, i.e., $W_{tr}[n, m] = W_0[n, m]$ and $W_r[n, m] = W^*_0[n, m]$, hence $W[n, m] = |W_0[n, m]|^2$.

The window effect is to produce a blurred version of the original channel with a resolution that depends on the span of the frequency and time samples available as will be discussed in the next section. If we consider the rectangular (or trivial) window, i.e., W[n, m]=1, n=0, . . . , N−1, m=−M/2, . . . , M/2−1 and zero else, then its SDFT $w(\tau, v)$ in (55) is the two dimensional Dirichlet kernel with bandwidth inversely proportional to N and M.

There are several other uses of the window function. The system can be designed with a window function aimed at randomizing the phases of the transmitted symbols, akin to how QAM symbol phases are randomized in WiFi and Multimedia-Over-Coax communication systems. This randomization may be more important for pilot symbols than data carrying symbols. For example, if neighboring cells use different window functions, the problem of pilot contamination is avoided.

A different use of the window is the ability to implement random access systems over OTFS using spread spectrum/CDMA type techniques as will be discussed later.

Channel Time/Frequency Coherence and OTFS Resolution

This section discloses, among other things, certain OTFS design issues, including the choice of data frame length, bandwidth, symbol length and number of subcarriers. We study the tradeoffs among these parameters and gain more insight on the capabilities of OTFS technology.

Since OTFS is based on Fourier representation theory similar spectral analysis concepts apply like frequency resolution vs Fourier transform length, sidelobes vs windowing shape etc. One difference that can be a source of confusion comes from the naming of the two Fourier transform domains in the current framework.

OTFS transforms the time-frequency domain to the delay-Doppler domain creating the Fourier pairs: (i) time⇔Doppler and (ii) frequency⇔delay. The "spectral" resolution of interest here therefore is either on the Doppler or on the delay dimensions.

Figure 8:
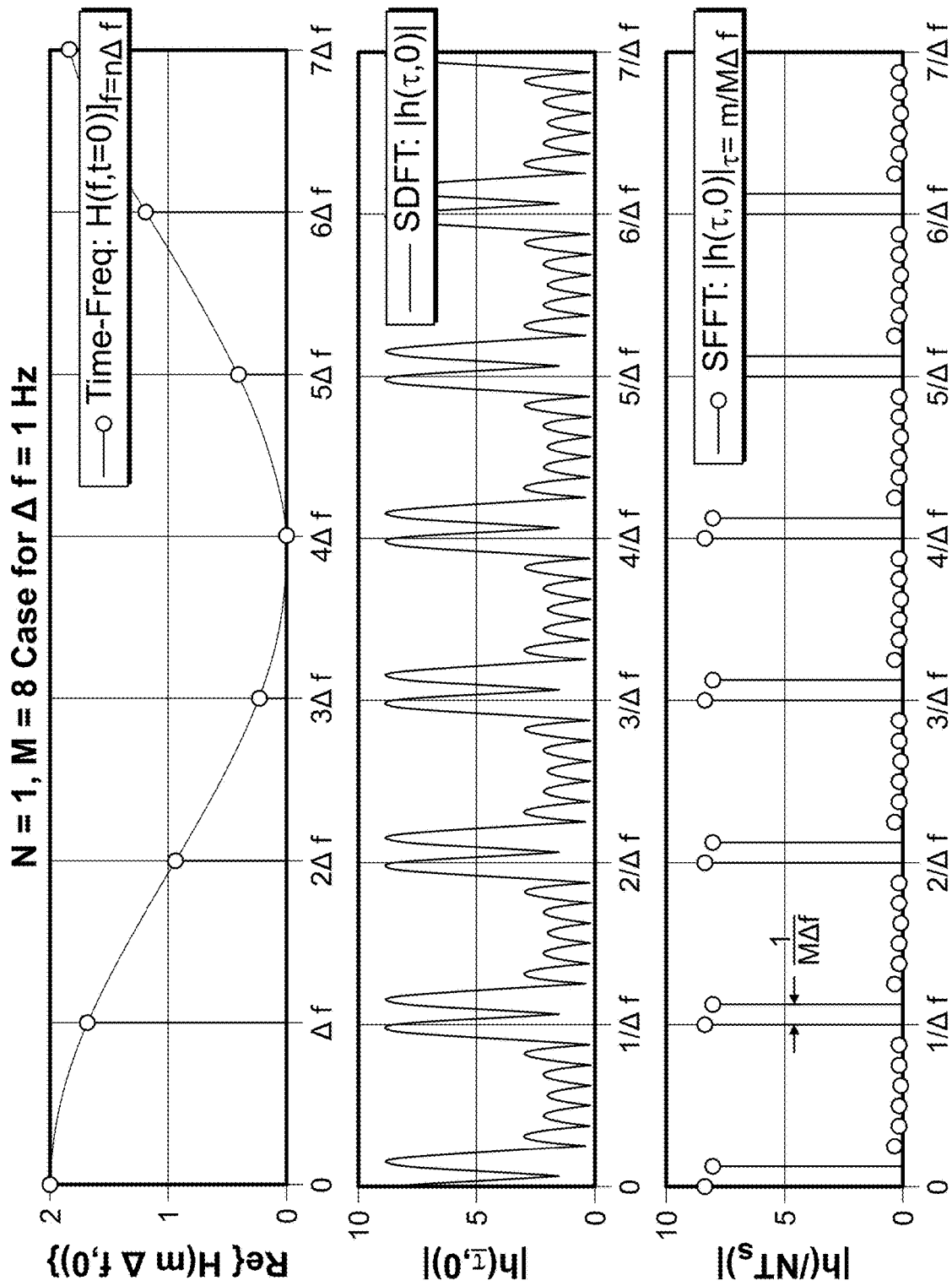
FIG. 8 illustrates an example one Dimensional Multipath Channel Example: (i) Sampled Frequency Response at $\Delta f=1$ Hz (ii) Periodic Fourier Transform with Period $1/\Delta f=1$ sec (iii) Sampled Fourier Transform with Period $1/\Delta f$ and Resolution $1/M\Delta f$.

These issues can be easier clarified with an example. Consider a time-invariant multipath channel (zero Doppler) with frequency response H(f, 0) for all t. In the first plot of FIG. 8 we show the real part of H (f, 0) as well as a sampled version of it on a grid of M=8 subcarriers. The second plot of FIG. 8 shows the SDFT of the sampled H (m$\Delta$f, 0), i.e., h($\tau$, 0) along the delay dimension. Taking this frequency response to the "delay" domain reveals the structure of this multipath channel, that is, the existence of two reflectors with equal power in this example. Further, the delay dimension of the SDFT is periodic with period 1/$\Delta$f as expected due to the nature of the discrete Fourier transform. Finally, in the third plot of FIG. 8 we shows the SFFT of the frequency response, which as expected is a sampled version of the SDFT of the second plot. The SFFT has M=8 points in each period 1/$\Delta$f leading to a resolution in the delay domain of 1/M$\Delta$f=1/BW.

In the current example, the reflectors are separated by more than 1/M$\Delta$f and are resolvable. If they were not, then the system would experience a flat channel within the bandwidth of observation, and in the delay domain the two reflectors would have been blurred into one.

Figure 9:
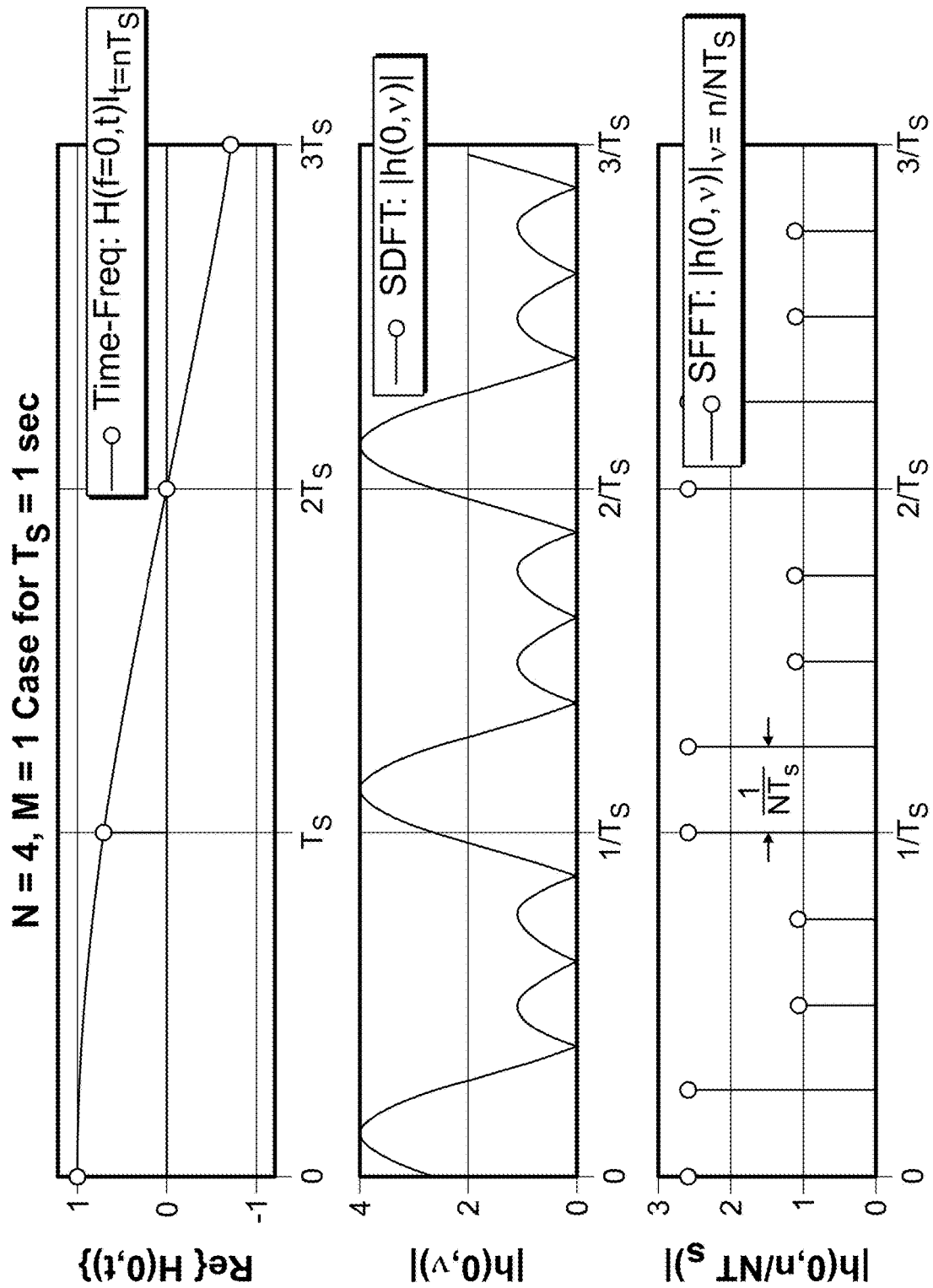
FIG. 9 illustrates a one Dimensional Doppler Channel Example: (i) Sampled Frequency Response at $T_s=1$ sec (ii) Periodic Fourier Transform with Period $1/T_s=1$ Hz (iii) Sampled Fourier Transform with Period $1/T_s$ and Resolution $1/NT_s$.

FIG. 9 shows similar results for a flat Doppler channel with time varying frequency response H(0, t) for all f. The first plot shows the response as a function of time, while the second plot shown the SDFT along the Doppler dimension. Finally, the third plot shows the SFFT, that is the sampled version of the transform. Notice that the SDFT is periodic with period 1/T while the SFFT is periodic with period 1/T and has resolution of 1/NT.

The conclusion one can draw from FIG. 9 is that as long as there is sufficient variability of the channel within the observation time NT, that is, as long as reflectors have Doppler frequency difference larger than 1/NT, the OTFS system will resolve these reflectors and will produce an equivalent channel in the delay-Doppler domain that is not fading. In other words, OTFS can take a channel that inherently has a coherence time of only T and produce an equivalent channel in the delay Doppler domain that has coherence time NT. This is an important property of OTFS as it can increase the coherence time of the channel by orders of magnitude and enable MIMO processing and beamforming under Doppler channel conditions.

Figure 10:
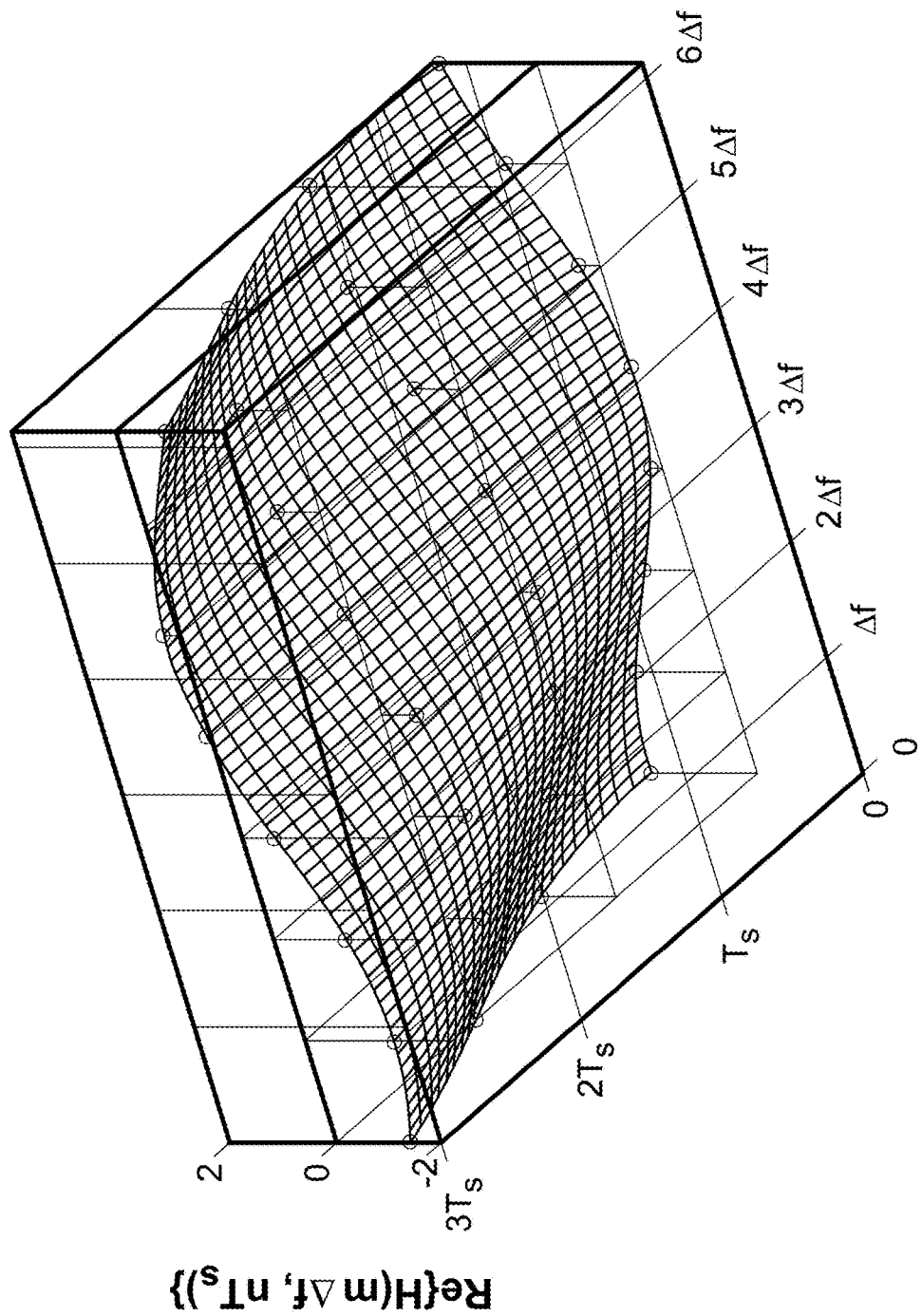
FIG. 10 depicts an example of a time-Varying Channel Response in the Time-Frequency Domain.

The two one-dimensional channel examples previously discussed are special cases of the more general two-dimensional channel of FIG. 10. The time-frequency response and its sampled version are shown in FIG. 10, where the sampling period is ($\tau$, $\Delta$f).

Figure 11:
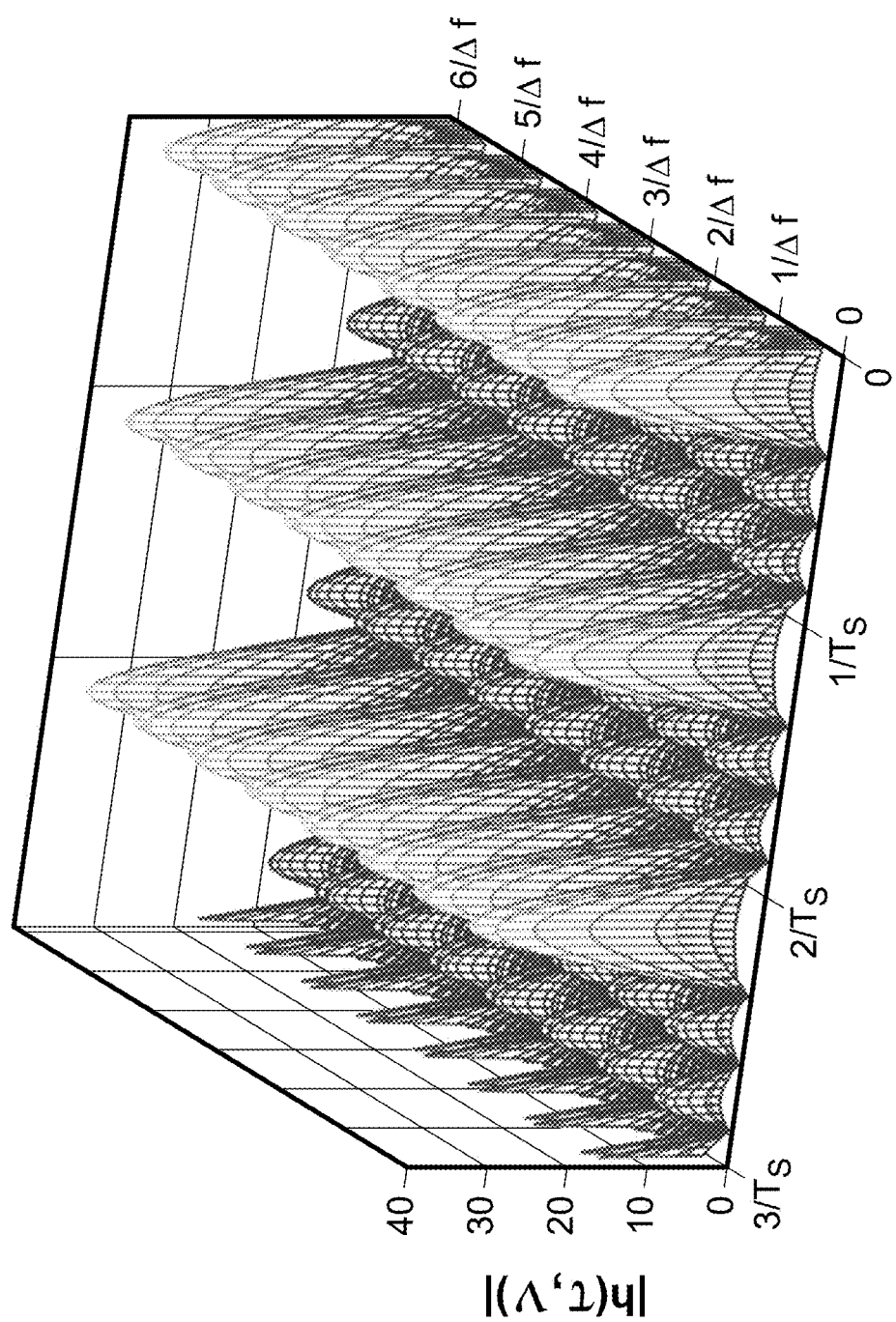
FIG. 11 shows an example of a SDFT of Channel response—($\tau,\nu$) Delay-Doppler Domain.

FIG. 11 shows the SDFT of this sampled response which is periodic with period (1/T, 1/$\Delta$f), across the Doppler and delay dimensions respectively.

The Nyquist sampling requirements for this channel response may be quantified as follows. 1/T is generally on the order of $\Delta$f (for an OFDM system with zero length CP it is exactly 1/T=$\Delta$f) so the period of the channel response in FIG. 11 is approximately ($\Delta$f, T), and aliasing can be avoided as long as the support of the channel response is less than $\pm\Delta f/2$ in the Doppler dimension and $\pm T/2$ in the delay dimension.

Figure 12:
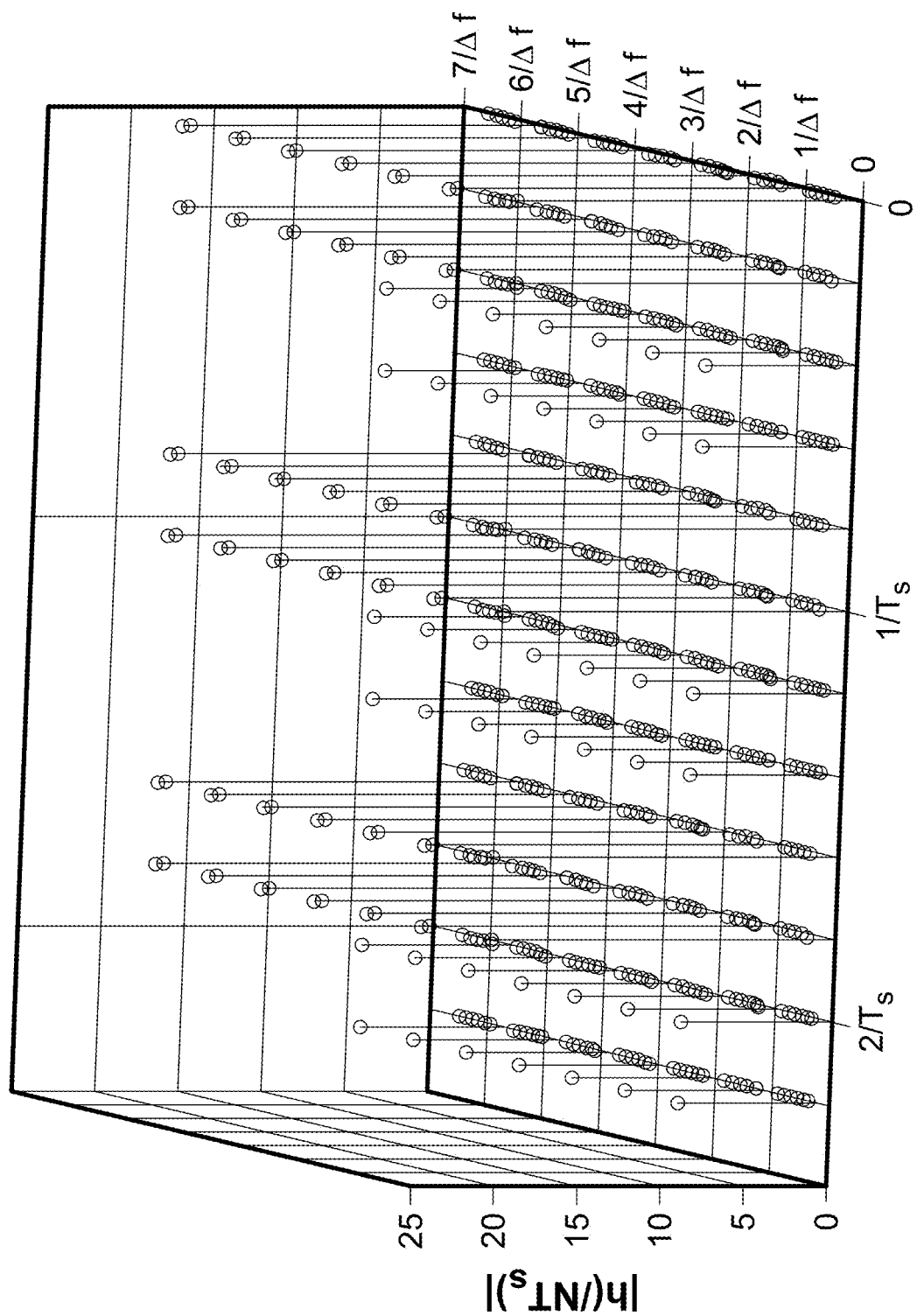
FIG. 12 shows an example SFFT of Channel Response—Sampled ($\tau, \nu$) Delay-Doppler Domain.

FIG. 12 shows the SFFT, that is, the sampled version of FIG. 11. The resolution of FIG. 11 is 1/NT, 1/M$\Delta f$ across the Doppler and delay dimensions respectively.

Figure 13:
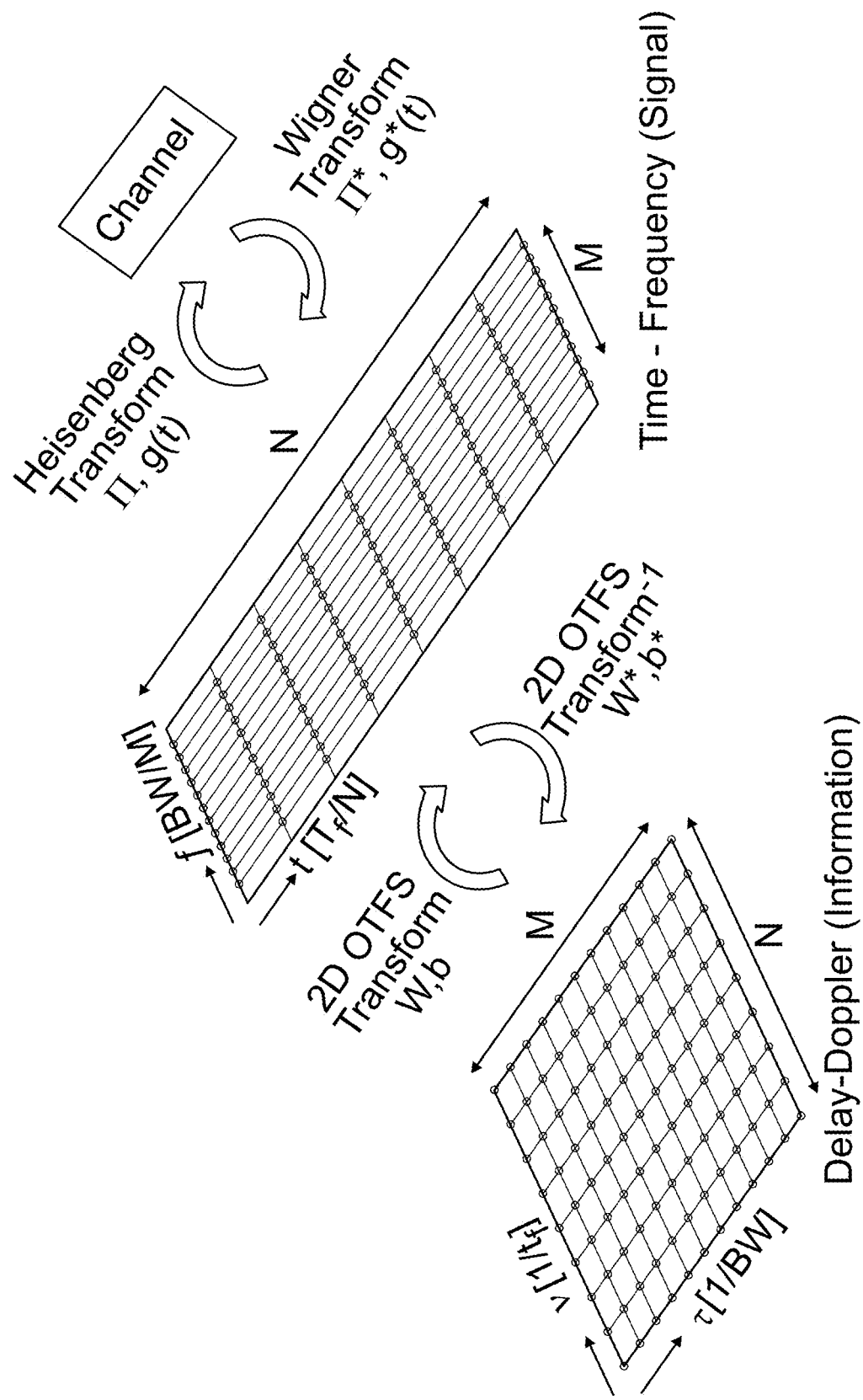
FIG. 13 shows an example transformation of the Time-Frequency Plane to the Doppler-Delay Plane.

FIG. 13 summarizes the sampling aspects of the OTFS modulation. The OTFS modulation consists of two steps shown in this figure:

A Heisenberg transform translates a time-varying convolution channel in the waveform domain to an orthogonal but still time varying channel in the time frequency domain. For a total bandwidth BW and M subcarriers the frequency resolution is $\Delta f=BW/M$. For a total frame duration $T_f$ and N symbols the time resolution is $T=T_f/N$.

A SFFT transform translates the time-varying channel in the time-frequency domain to a time invariant one in the delay-Doppler domain. The Doppler resolution is $1/T_f$ and the delay resolution is 1/BW.

The choice of window can provide a tradeoff between main lobe width (resolution) and side lobe suppression, as in classical spectral analysis.

Channel Estimation in the OTFS Domain

There is a variety of different ways a channel estimation scheme could be designed for an OTFS system, and a variety of different implementation options and details. This section presents, among other things, a high level summary and highlight some of the concepts.

A straightforward way to perform channel estimation entails transmitting a sounding OTFS frame containing a discrete delta function in the OTFS domain or equivalently a set of unmodulated carriers in the time frequency domain. From a practical standpoint, the carriers may be modulated with known, say BPSK, symbols which are removed at the receiver as is common in many OFDM systems. This approach could be considered an extension of the channel estimation symbols used in WiFi and Multimedia-Over-Coax modems.

Figure 14:
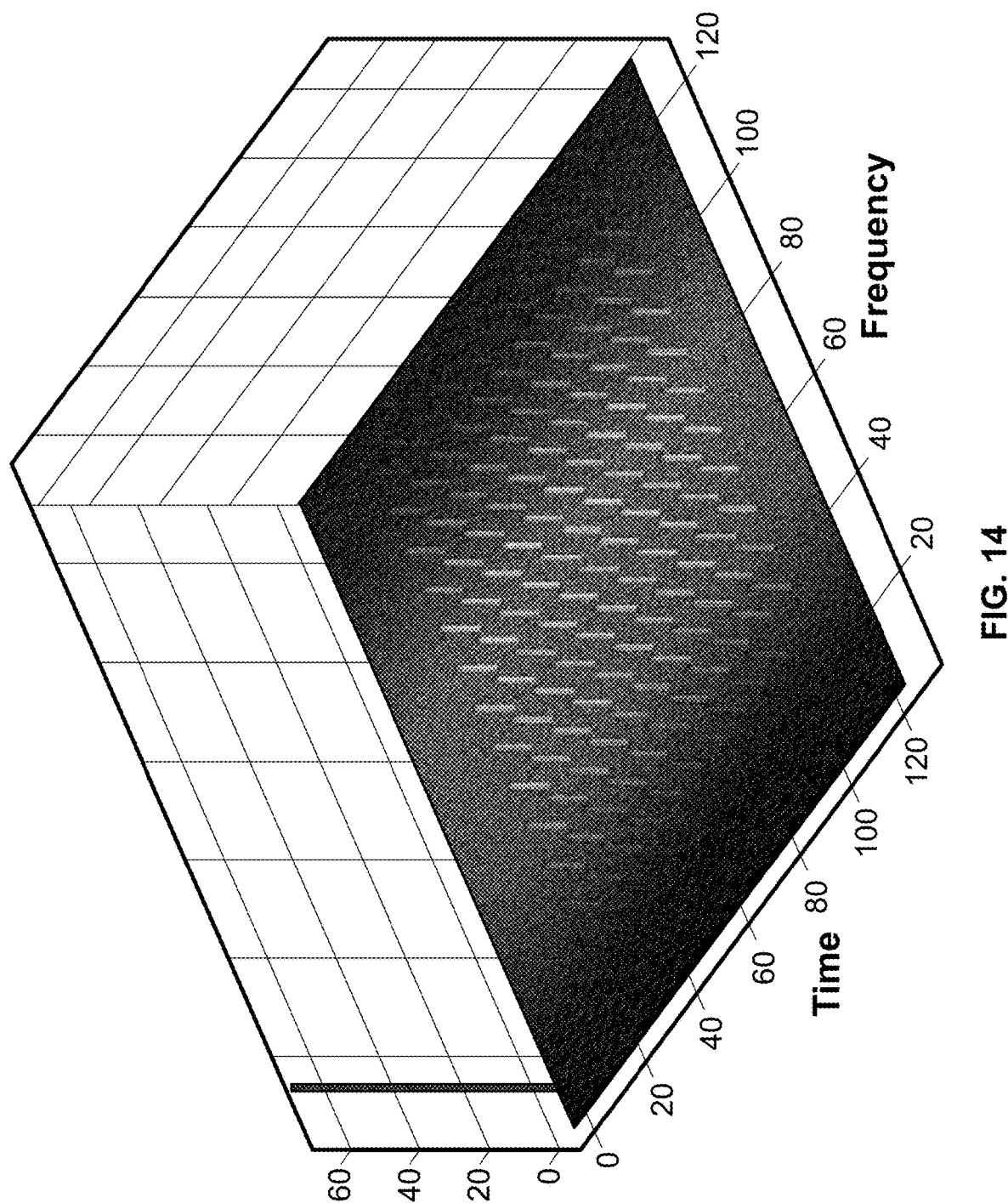
FIG. 14 shows an example of a Discrete Impulse in the orthogonal time frequency space (OTFS) Domain Used for Channel Estimation.

FIG. 14 shows an example of an OTFS symbol containing such an impulse. This approach may however be wasteful as the extend of the channel response is only a fraction of the full extend of the OTFS frame (1/T, 1/$\Delta f$). For example, in LTE systems $1/T \approx 15$ KHz while the maximum Doppler shift $f_{d,max}$ is typically one to two orders of magnitude smaller. Similarly $1/\Delta f \approx 67$ usec, while maximum delay spread $\tau_{max}$ is again one to two orders of magnitude less. Implementations thus can have a much smaller region of the OTFS frame devoted to channel estimation while the rest of the frame carries useful data. More specifically, for a channel with support ($\pm f_{d,max}$, $\pm \tau_{max}$) an OTFS subframe of length ($2f_{d,max}/T$, $2\tau_{max}/\Delta f$) may have to be used.

In the case of multiuser transmission, each UE can have its own channel estimation subframe positioned in different parts of the OTFS frame. This is akin to multiplexing of multiple users when transmitting Uplink Sounding Reference Signals in LTE. The difference is that OTFS benefits from the virtuous effects of its two dimensional nature. For example, if $\tau_{max}$ is 5% of the extend of the delay dimension and $f_{d,max}$ is 5% of the Doppler dimension, the channel estimation subframe need only be 5%×5%=0.25% of the OTFS frame.

Notice that although the channel estimation symbols are limited to a small part of the OTFS frame, they actually sound the whole time-frequency domain via the corresponding basis functions associated with these symbols.

A different approach to channel estimation is to devote pilot symbols on a subgrid in the time-frequency domain. This is akin to CRS pilots in downlink LTE subframes. One question in this approach is the determination of the density of pilots that is sufficient for channel estimation without introducing aliasing. Assume that the pilots occupy the subgrid ($n_0T$, $m_0\Delta f$) for some integers $n_0$, $m_0$. Recall that for this grid the SDFT will be periodic with period ($1/n_0T$, $1/m_0\Delta f$). Then, applying the aliasing results discussed earlier to this grid, we obtain an alias free Nyquist channel support region of ($\pm f_{d,max}$, $\pm \tau_{max}$)=($\pm\frac{1}{2}n_0T, \pm\frac{1}{2}m_0\Delta f$). The density of the pilots can then be determined from this relation given the maximum support of the channel. The pilot subgrid should extend to the whole time-frequency frame, so that the resolution of the channel is not compromised.

OTFS-Access: Multiplexing More than One User

There are many different ways to multiplex several uplink or downlink transmissions in one OTFS frame. Some of the multiplexing methods include:
    (A) Multiplexing in the OTFS delay-Doppler domain
    (B) Multiplexing in the time-frequency domain
    (C) Multiplexing in the code spreading domain
    (D) Multiplexing in the spatial domain Multiplexing in the delay-Doppler domain: This may be the most natural multiplexing scheme for downlink transmissions. Different sets of OTFS basis functions, or sets of information symbols or resource blocks are given to different users. Given the orthogonality of the basis functions, the users can be separated at the UE receiver. The UE need only demodulate the portion of the OTFS frame that is assigned to it.

This approach could be made similar to the allocation of PRBs to different UEs in LTE. One difference is that, in OTFS, even a small subframe or resource block in the OTFS domain will be transmitted over the whole time-frequency frame via the basis functions and will experience the average channel response.

Figure 15:
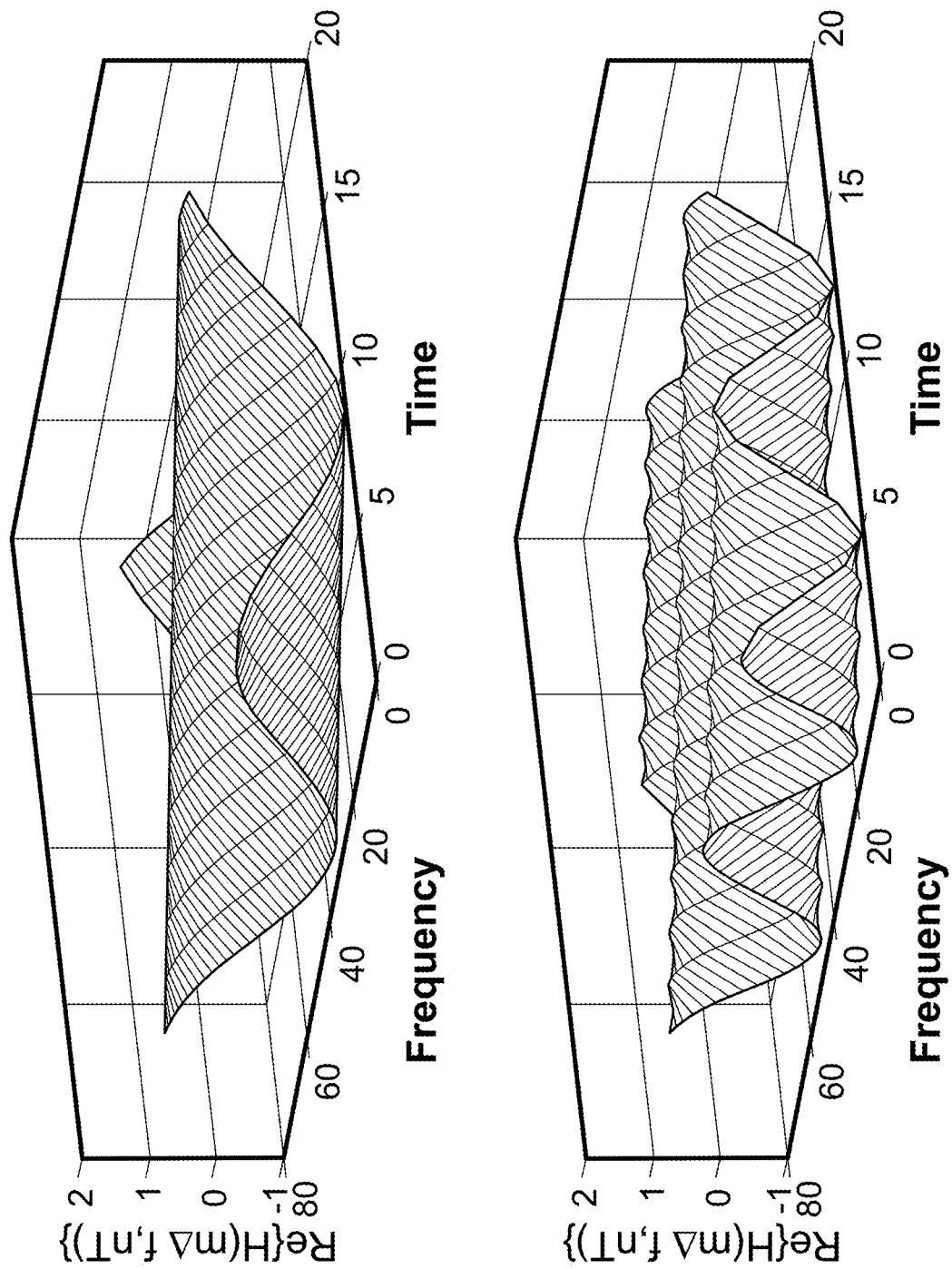
FIG. 15 shows examples of different Basis Functions, assigned to different ssers, span the whole Time-Frequency Frame.

FIG. 15 illustrates this point by showing two different basis functions belonging to different users. Because of this, there is no compromise on channel resolution for each user, regardless of the resource block or subframe size.

In the uplink direction, transmissions from different users experience different channel responses. Hence, the different subframes in the OTFS domain will experience a different convolution channel. This can potentially introduce inter-user interference at the edges where two user subframes are adjacent, and would require guard gaps to eliminate it. In order to avoid this overhead, a different multiplexing scheme can be used in the uplink as explained next.

Multiplexing in the time-frequency domain: In this approach, resource blocks or subframes are allocated to different users in the time-frequency domain.

Figure 16:
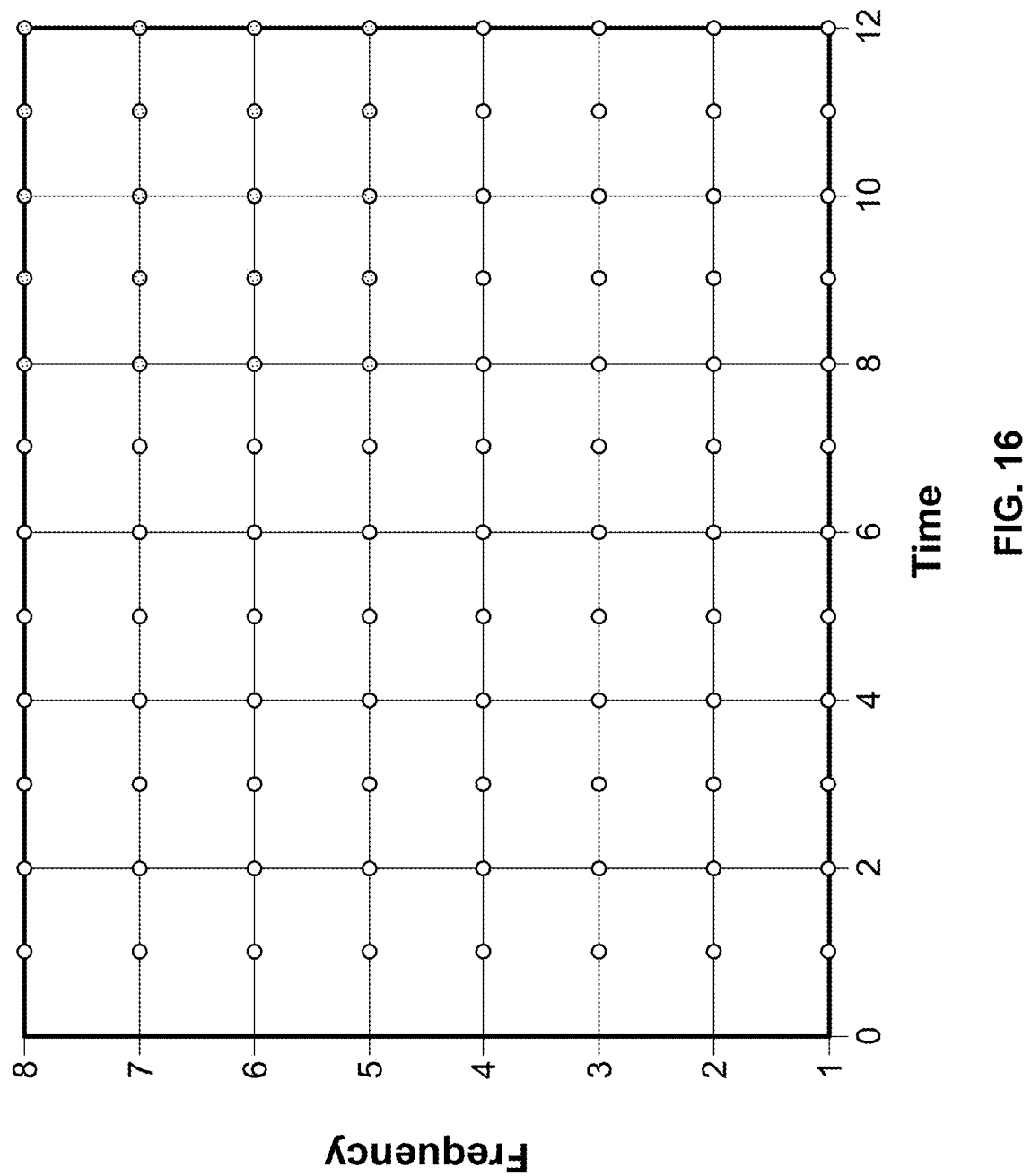
FIG. 16 an example of multiplexing three users in the Time-Frequency Domain

FIG. 16 illustrates this for a three user case. In this figure, User 1 (blue) occupies the whole frame length but only half the available subcarriers. Users 2 and 3 (red and black respectively) occupy the other half subcarriers, and divide the total length of the frame between them.

In this case, each user employs a slightly different version of the OTFS modulation described above. One difference is that each user i performs an SFFT on a subframe ($N_i$, $M_i$), $N_i \leq N$, $M_i \leq M$. This reduces the resolution of the channel, or in other words reduces the extent of the time-frequency plane in which each user will experience its channel variation. On the other side, this also gives the scheduler the opportunity to schedule users in parts of the time-frequency plane where their channel is best.

To be able to extract the maximum diversity of the channel and allocate users across the whole time-frequency frame, implementations can multiplex users via interleaving.

In this case, one user occupies a subsampled grid of the time-frequency frame, while another user occupies another subsampled grid adjacent to it.

Figure 17:
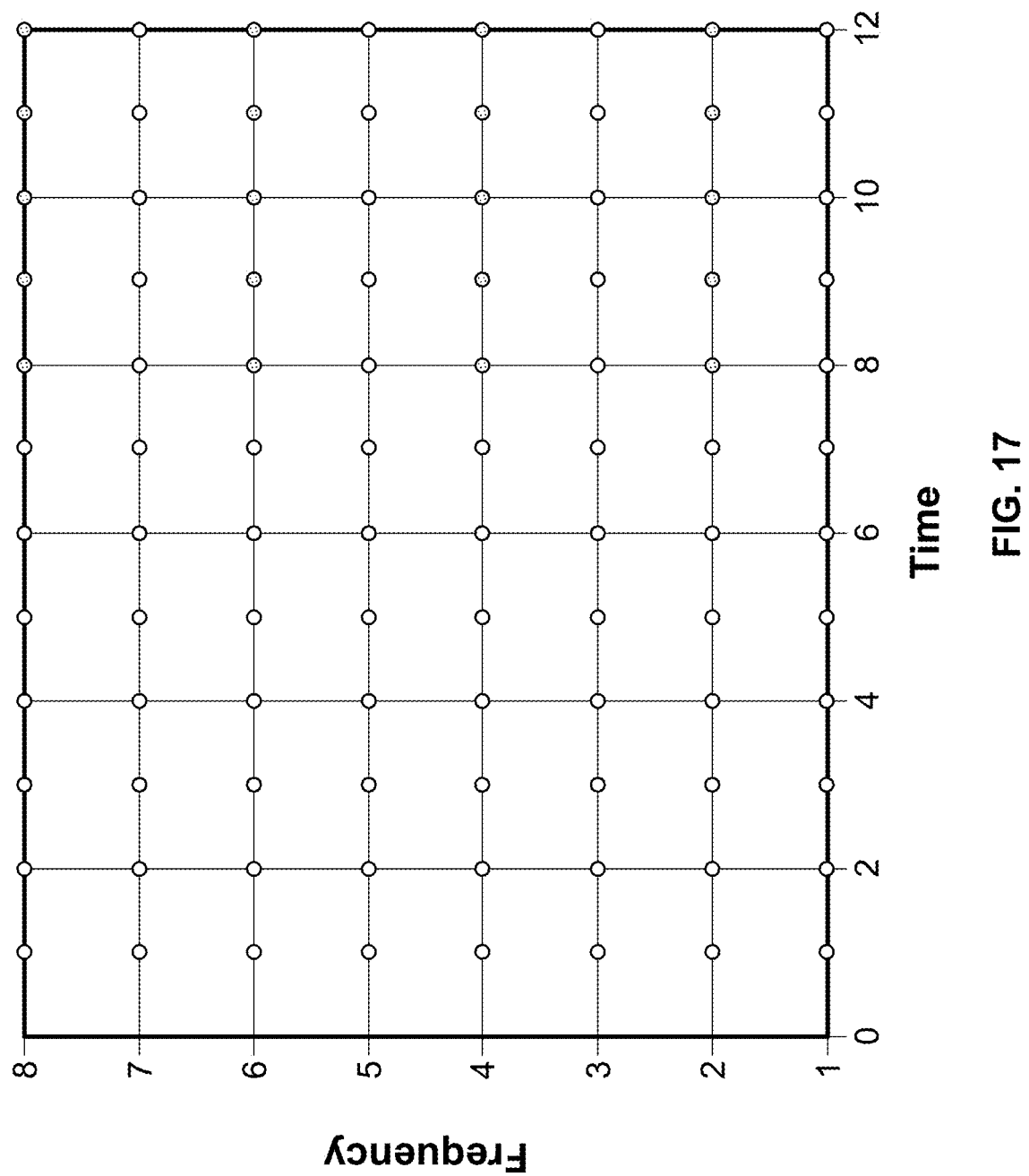
FIG. 17 shows an example of multiplexing three users in the Time-Frequency Domain with Interleaving.

FIG. 17 shows three users as before but interleaved on the subcarrier dimension. Of course, interleaving is possible in the time dimension as well, and/or in both dimensions. The degree of interleaving, or subsampling the grid per user is only limited by the spread of the channel that we need to handle.

Multiplexing in the time-frequency spreading code domain: In embodiments that provide a random access PHY and MAC layer where users can access the network without having to undergo elaborate RACH (random access channel) and other synchronization procedures, e.g., to support Internet of Things (IoT) deployments, OTFS can support such a system by employing a spread-spectrum approach. Each user is assigned a different two-dimensional window function that is designed as a randomizer. The windows of different users are designed to be nearly orthogonal to each other and nearly orthogonal to time and frequency shifts. Each user then only transmits on one or a few basis functions and uses the window as a means to randomize interference and provide processing gain. This can result in a much simplified system that may be attractive for low cost, short burst type of IoT applications.

Multiplexing in the spatial domain: Similar to some other OFDM multicarrier systems, a multi-antenna OTFS system can support multiple users transmitting on the same basis functions across the whole time-frequency frame. The users are separated by appropriate transmitter and receiver beamforming operations.

Additional examples of multi-user multiplexing are described with respect to FIG. 21 to FIG. 27.

In some embodiments, the multiplexed signals include reference signals and information signals targeted at UEs. The information signals may include user data and/or other higher layer system information. Reference signals may include UE-specific reference signals, reference signals intended by a logical group of UEs or reference signals to be used by all UEs being served by the transmitter.

As previously described, in some embodiments, both the reference signals and the information signals, or signals carrying user data, are multiplexed in the delay-Doppler domain and then transformed to the time-frequency domain prior to transmission. In other words, in some embodiments, both reference signals for the system and information signals are carried in the transformed domain. As previously described with respect to FIG. 14, reference signals may be introduced using minimal resources in the delay-Doppler domain, yet after OTFS transformation, may occupy the entire time-frequency range. Thus, high quality channel optimization is possible while using minimal transmission resources.

In various embodiments, reference signals may be added to the transmitted signals in the delay-Doppler domain and/or the time-frequency domain, providing a system with a greater control of the level of optimization and transmission resource usage. In conventional wireless systems, reference signals are often separated from user data signals by leaving unused resources for practical implementations. Using OTFS based transmission/reception techniques, due to the orthogonality of basis functions and the application of a transform prior to transmitting reference function, such communication resources may not have to be left unused—a receiver will be able to recover reference signals that are relatively densely packed, e.g., without any unused of black space resources.

Implementation Issues

OTFS is a novel modulation technique with numerous benefits and a strong mathematical foundation. From an implementation standpoint, one added benefit is the compatibility with OFDM and the need for only incremental change in the transmitter and receiver architecture.

A typical OTFS implementation includes two steps. The Heisenberg transform (which takes the time-frequency domain to the waveform domain) is typically already implemented in today's systems in the form of OFDM/OFDMA. This implementation corresponds to a prototype filter g(t) which is a square pulse. Other filtered OFDM and filter bank variations have been proposed for 5G, which can also be accommodated in this general framework with different choices of g(t).

Figure 18:
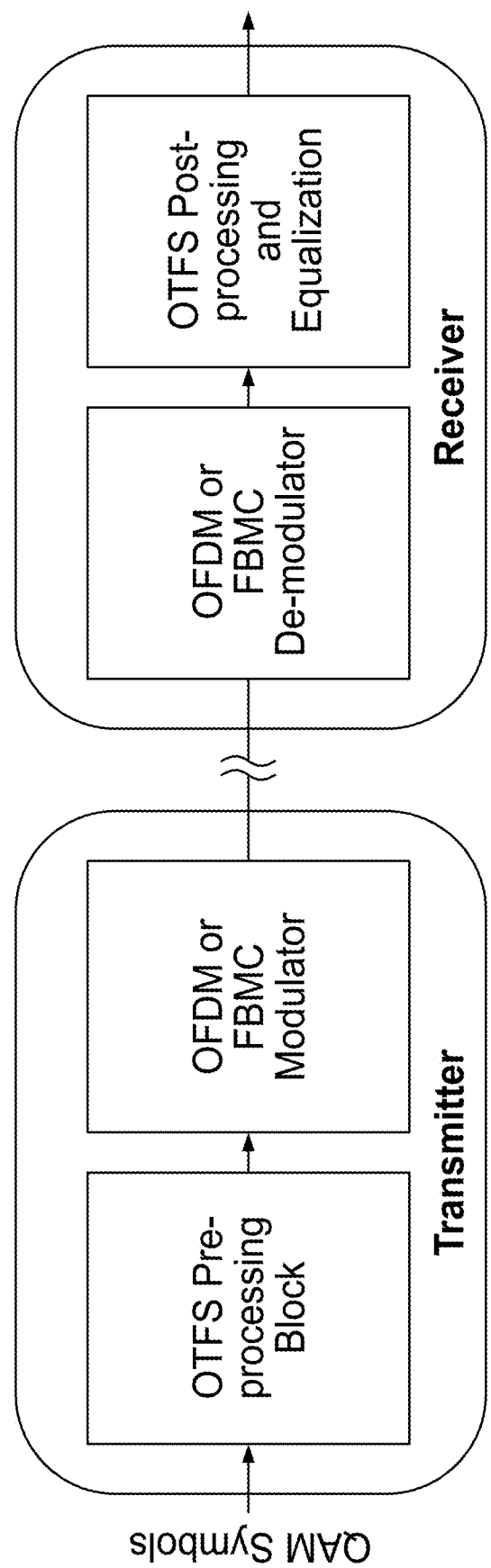
FIG. 18 shows an example of OTFS Architecture.

The second step of OTFS is the two dimensional Fourier transform (SFFT). This can be thought of as a pre- and post-processing step at the transmitter and receiver respectively as illustrated in FIG. 18. In that sense it is similar, from an implementation standpoint, to the SC-FDMA preprocessing step. As depicted in FIG. 18, processing from left to right, at the transmitter, QAM (or QPSK) symbols are input to an OTFS preprocessing block which may then process the symbols as described in this patent document. The output of the pre-processing block may represent time-frequency samples, and then be input to a conventional OFDM or filter bank based multicarrier transmission system. The resulting signal is transmitted over a communication channel.

At the receiver-side, a conventional OFDM or filter bank demodulator may be used to recover time-frequency domain samples. The time-frequency domain samples may be input to the OTFS demodulation stage, shown as the OTFS post-processing and equalization stage in FIG. 18. In this stage, information bits and/or reference signals may be recovered using the various techniques described in the present document.

From a complexity comparison standpoint, for a frame of N OFDM symbols of M subcarriers, SC-FDMA adds N DFTs of M point each (assuming worse case M subcarriers given to a single user). The additional complexity of SC-FDMA is then $NM \log_2(M)$ over the baseline OFDM architecture. For OTFS, the 2D SFFT has complexity $NM \log_2(NM) = NM \log_2(M) + NM \log_2(N)$, so the term $NM \log_2(N)$ is the OTFS additional complexity compared to SC-FDMA. For an LTE subframe with M=1200 subcarriers and N=14 symbols, the additional complexity is 37% more compared to the additional complexity of SC-FDMA.

In one advantageous aspect, from an architectural and implementation standpoint, OTFS augments the PHY capabilities of an existing LTE modem architecture and does not introduce co-existence and compatibility issues.

Examples of Benefits of OTFS Modulation

The OTFS modulation has numerous benefits that tie into the challenges that 5G systems are trying to overcome. Arguably, the biggest benefit and the main reason to study this modulation is its ability to communicate over a channel that randomly fades within the time-frequency frame and still provide a stationary, deterministic and non-fading channel interaction between the transmitter and the receiver. In the OTFS domain, all information symbols experience the same channel and same SNR.

Further, OTFS best utilizes the fades and power fluctuations in the received signal to maximize capacity. To illustrate this point assume that the channel consists of two reflectors which introduce peaks and valleys in the channel response either across time or across frequency or both. An OFDM system can theoretically address this problem by allocating power resources according to the waterfilling principle. However, due to practical difficulties such approaches are not pursued in wireless OFDM systems, leading to wasteful parts of the time-frequency frame having excess received energy, followed by other parts with too low received energy. An OTFS system would resolve the two reflectors and the receiver equalizer would employ coherent combining of the energy of the two reflectors, providing a non-fading channel with the same SNR for each symbol. It therefore provides a channel interaction that is designed to maximize capacity under the transmit assumption of equal power allocation across symbols (which is common in existing wireless systems), using only standard AWGN codes.

In addition, OTFS provides a domain in which the channel can be characterized in a very compact form. This has significant implications for addressing the channel estimation bottlenecks that plague current multi-antenna systems and can be a key enabling technology for addressing similar problems in future massive MIMO systems.

One benefit of OTFS is its ability to easily handle extreme Doppler channels. We have verified in the field 2×2 and 4×4, two and four stream MIMO transmission respectively in 90 Km/h moving vehicle setups. This is not only useful in vehicle-to-vehicle, high speed train and other 5G applications that are Doppler intensive, but can also be an enabling technology for mm wave systems where Doppler effects will be significantly amplified.

Further, OTFS provides a natural way to apply spreading codes and deliver processing gain, and spread-spectrum based CDMA random access to multicarrier systems. It eliminates the time and frequency fades common to multicarrier systems and simplifies the receiver maximal ratio combining subsystem. The processing gain can address the challenge of deep building penetration needed for IoT and PSTN replacement applications, while the CDMA multiple access scheme can address the battery life challenges and short burst efficiency needed for IOT deployments.

Last but not least, the compact channel estimation process that OTFS provides can be essential to the successful deployment of advanced technologies like Cooperative Multipoint (Co-MP) and distributed interference mitigation or network MIMO.

It will be appreciated that the present document discloses OTFS, a novel modulation scheme for wireless communications, with significant advantages in performance, especially under significant Doppler effects in mobility scenarios or mmWave communications. It will be appreciated that the present document discloses various attributes, compatibility and design aspects and demonstrated the superiority of OTFS in a variety of use cases.

Figure 19:
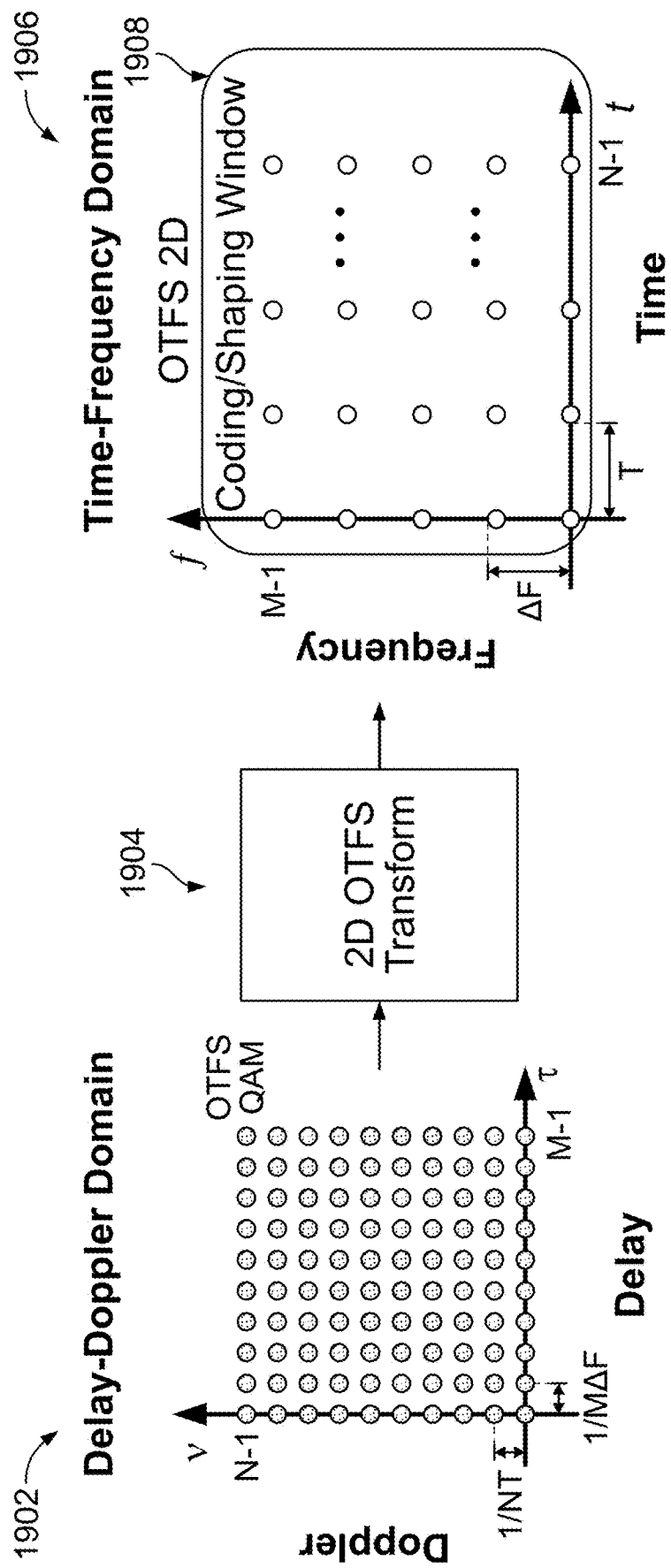
FIG. 19 is a graphical representation of an OTFS delay-Doppler transform.
Figure 20:
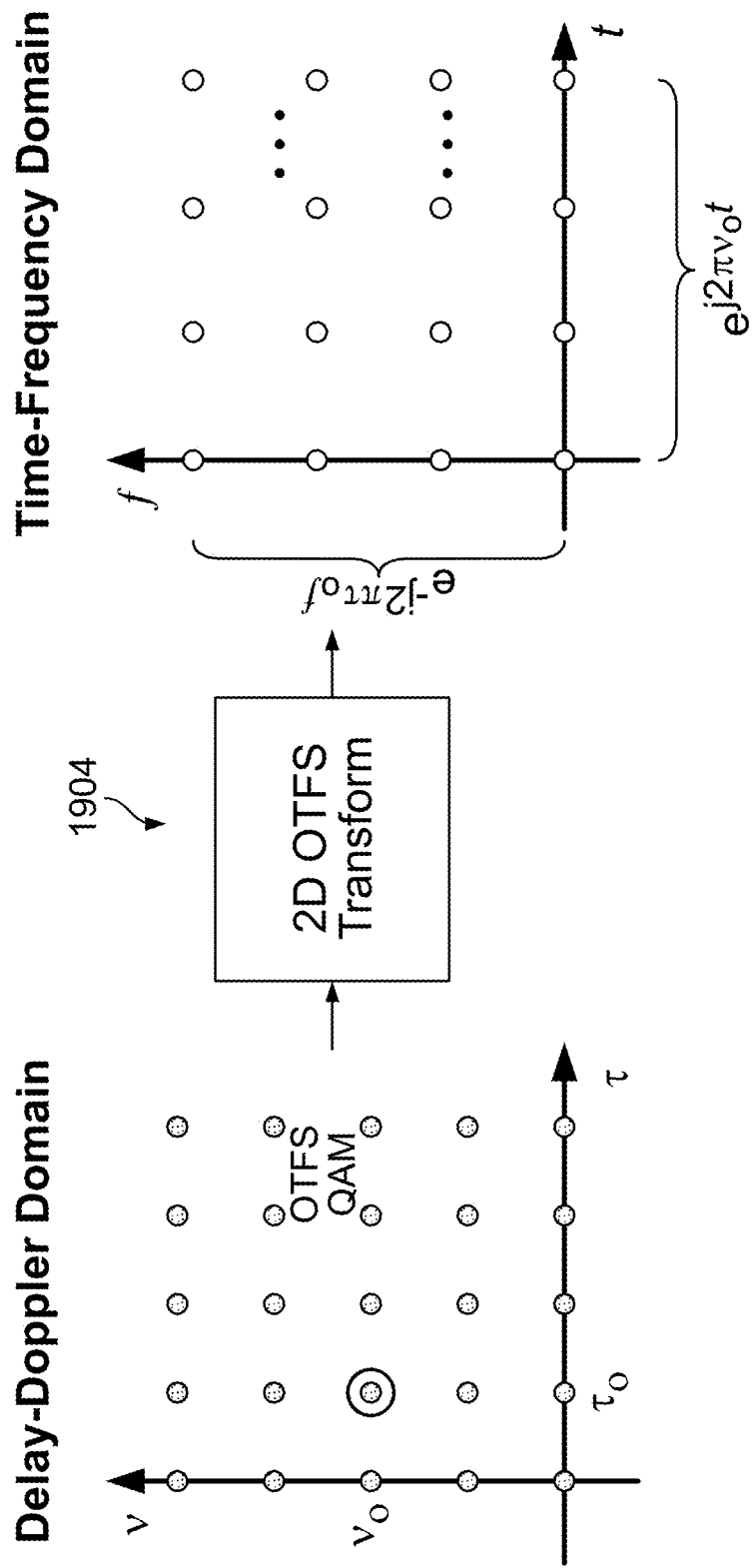
FIG. 20 is a graphical representation of an OTFS delay-Doppler transform.

FIG. 19 is a graphical representation of an OTFS delay-Doppler transform. Graph 1902 depicts a two-dimensional plane with two orthogonal axes—a delay axis and a Doppler axis, along which transmission resources are available as a grid of resources. When transformed through a 2D OTFS transform, as depicted by the stage 1904, the resulting signal may be represented in a second two-dimensional transmission resource plane using another two orthogonal axes, a time axis and a frequency axis. In the second two-dimensional resource plane, the signal may be identifiable similar to conventional LTE or other systems which allocate transmission resources along time (slots) and frequency (subcarrier). In addition, a coding or shaping window 1908 may also be used to multiplex (at a transmitter) and de-multiplex (at a receiver) signals.

FIG. 19 is a graphical representation of an OTFS delay-Doppler transform that shows a single grid point transmission resource $(T_0, v_0)$ spreading across the entire time-frequency plane after the 2D OTFS transform stage.

In FIGS. 21 to 27, several examples of multi-user multiplexing of signals are described.

Figure 21:
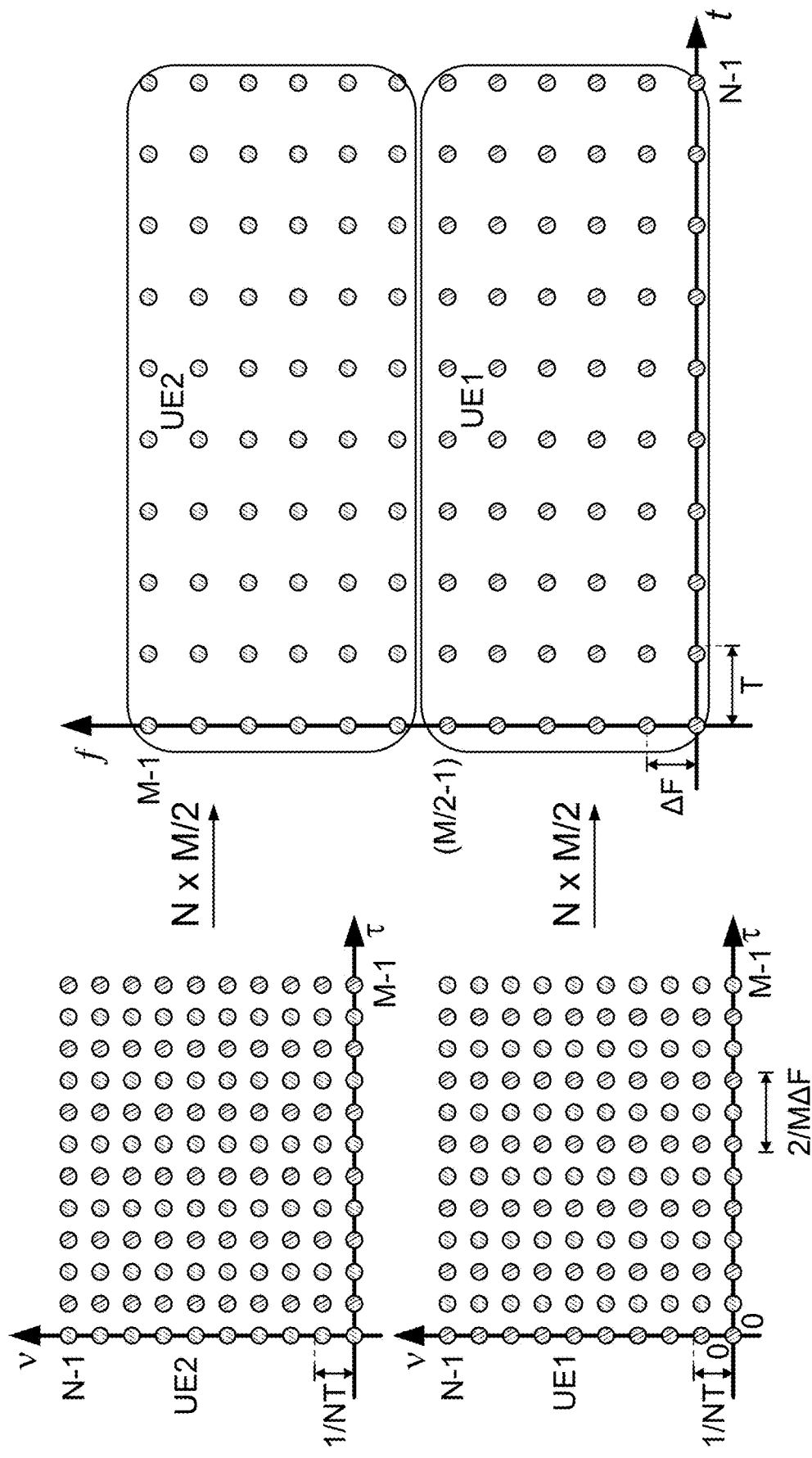
FIG. 21 shows a multiplexing scheme.

FIG. 21 shows an example of a multi-user delay-Doppler transform multiplexing. UE1 and UE2 each use a sparser lattice than the original lattice. Each UE uses every other point t in the delay domain. The window for UE2 is shifted in frequency. It can be seen that both UEs have only half the resolution in the delay dimension. However, both UEs have full resolution in the Doppler dimension and cover the entire span of delay and Doppler domains.

Figure 22:
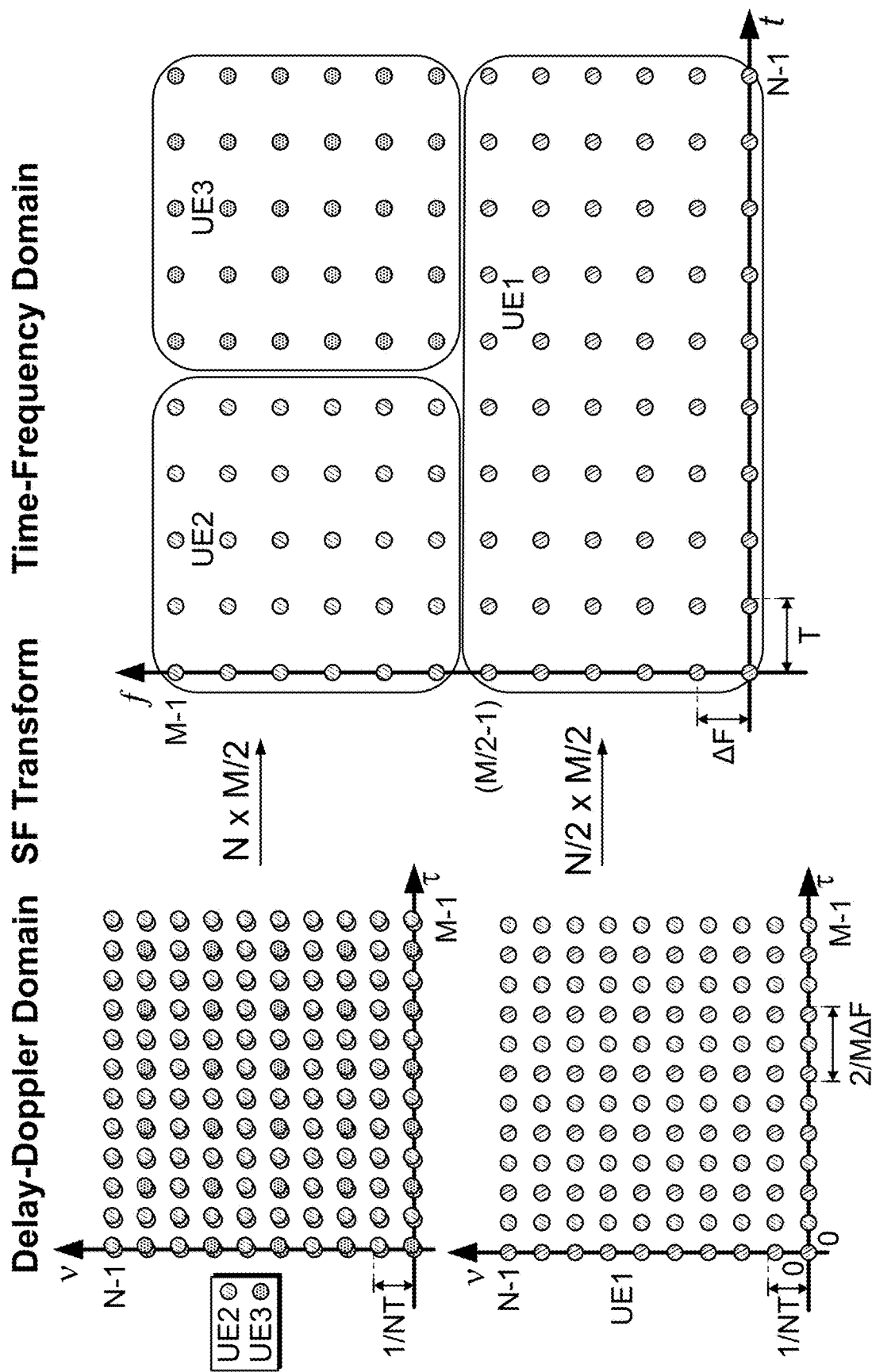
FIG. 22 shows a multiplexing scheme.

FIG. 22 shows an example of a multi-user delay-Doppler transform multiplexing. This example shows multiplexing of three UEs: UE1, UE2 and UE3. Each UE uses a sparser lattice that the original lattice. UE1 uses every other point τ in the delay domain. UE2 and UE3 use every other point both in the delay domain and the Doppler domain (v). UE2's window is shifted in the frequency domain and UE3's window is shifted both in the time and frequency domains. As can be see, UE1 occupies half the dimension in the delay domain and full resolution in the Doppler domain. UE2 and UE3 have half the resolution in both delay and Doppler domains and all three UEs cover the entire span of delay and Doppler domains.

Figure 23:
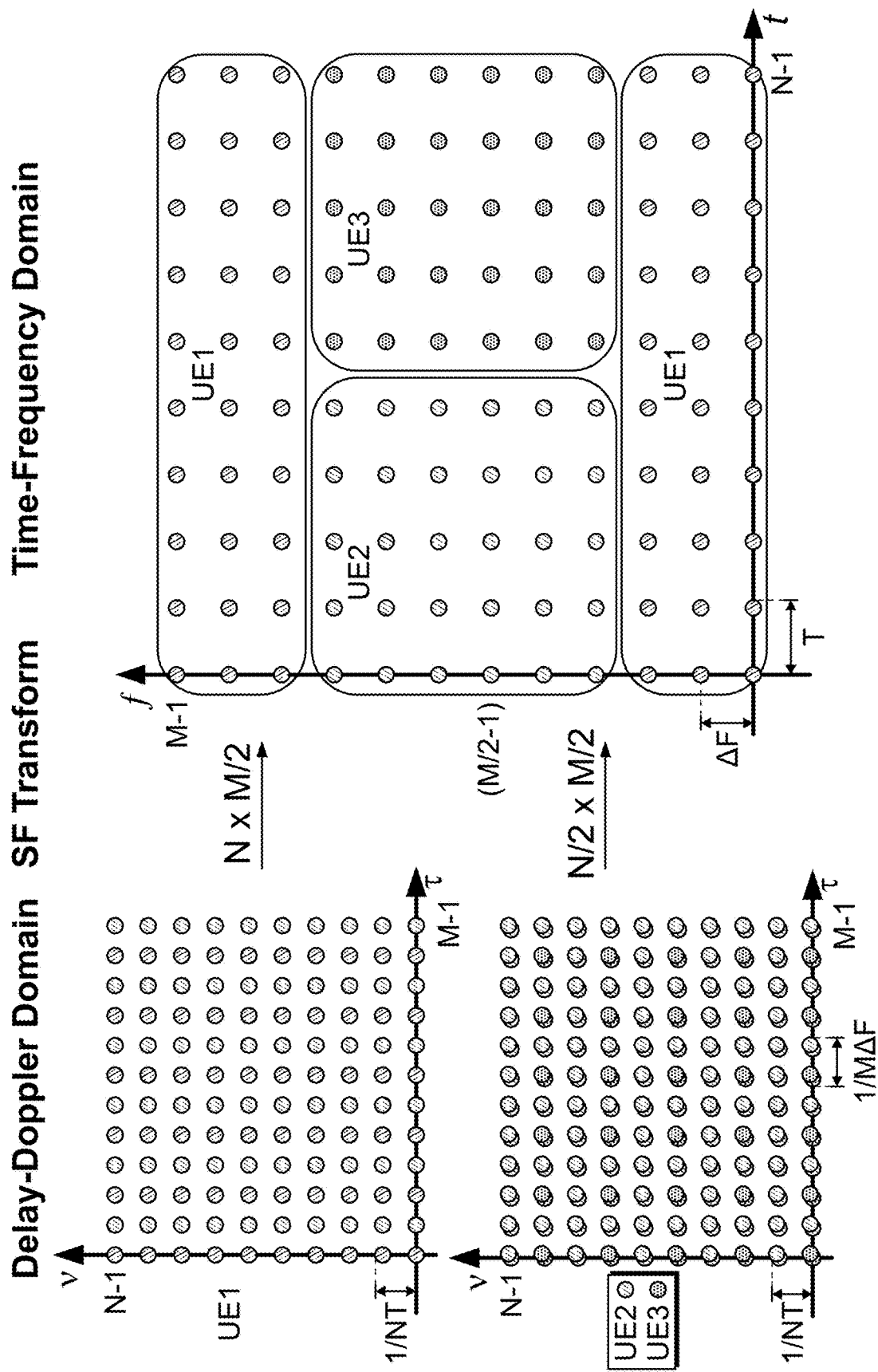
FIG. 23 shows a multiplexing scheme.

FIG. 23 shows an example of a multi-user delay-Doppler transform multiplexing. In this example, assignments to three UEs are shown. Each UE uses a sparser lattice than the original lattice. UE1 uses every other point in the delay domain. UE2 and UE3 both use every other point in both delay and Doppler domains. UE1 uses a split window. UE2 and UE3 windows ae shifted in frequency and UE3 window is also shifted in time. None of the lines above M/2 are copies of lines 0 to (M/4−1). In comparison with the assignments discussed in FIG. 21, each user will experience a different channel because the UEs are all using different frequencies.

Figure 24:
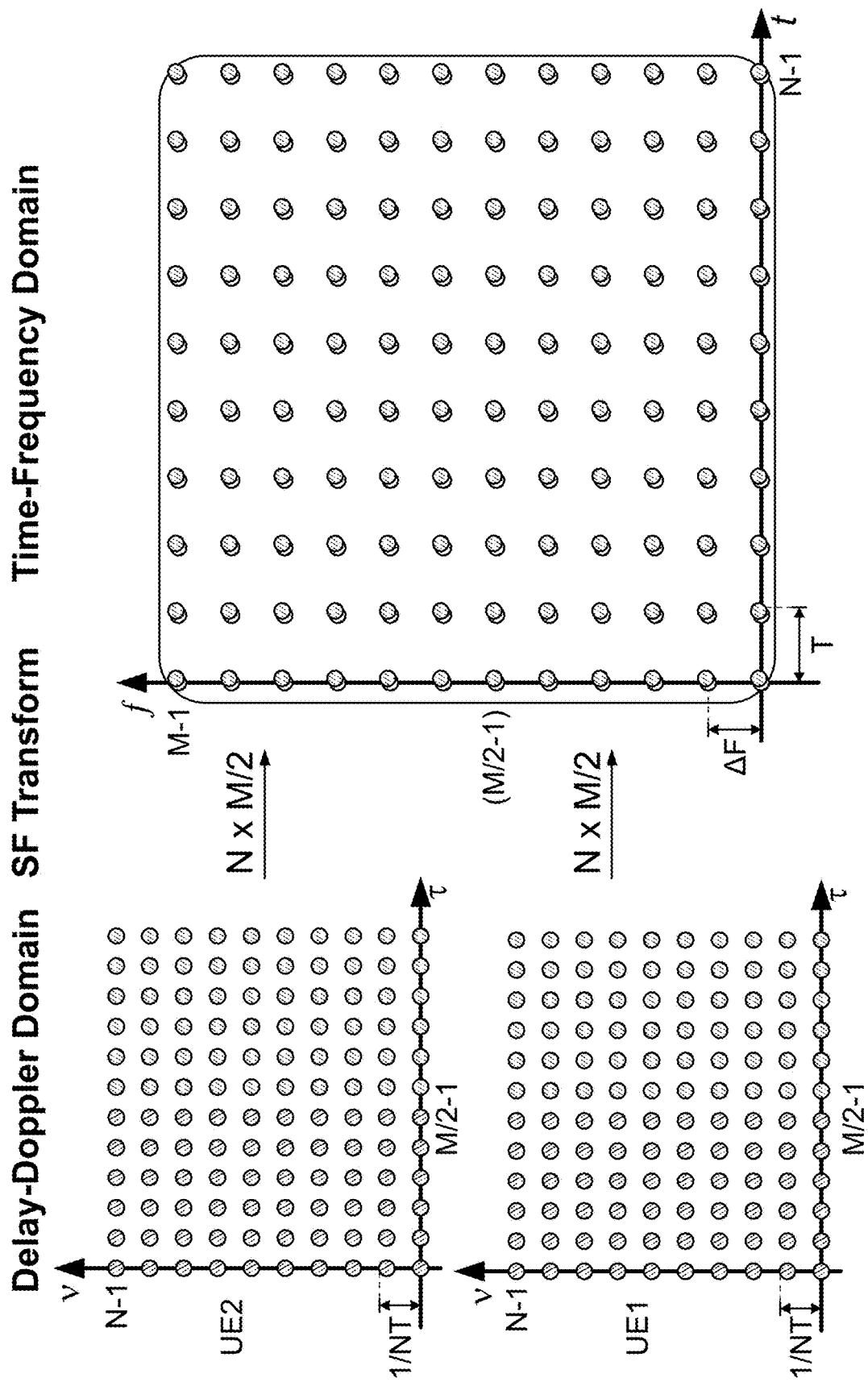
FIG. 24 shows a multiplexing scheme.

FIG. 24 shows an example of a multi-user delay-Doppler transform multiplexing. In this example, UE1 uses the left half of the original lattice and transmits zero power in the right half of the lattice. Conversely, UE2 uses the right half for transmission and sends zero power in the left half (occupied by UE1's transmissions). The window of UE1 and UE2 is contiguous on the full lattice. In this example, both UEs have full resolution in both delay and Doppler dimension, both UEs cover the full Doppler span and each covers only half of the delay span. In the UL direction, a receiver may experience different channel conditions due to different UEs.

Figure 25:
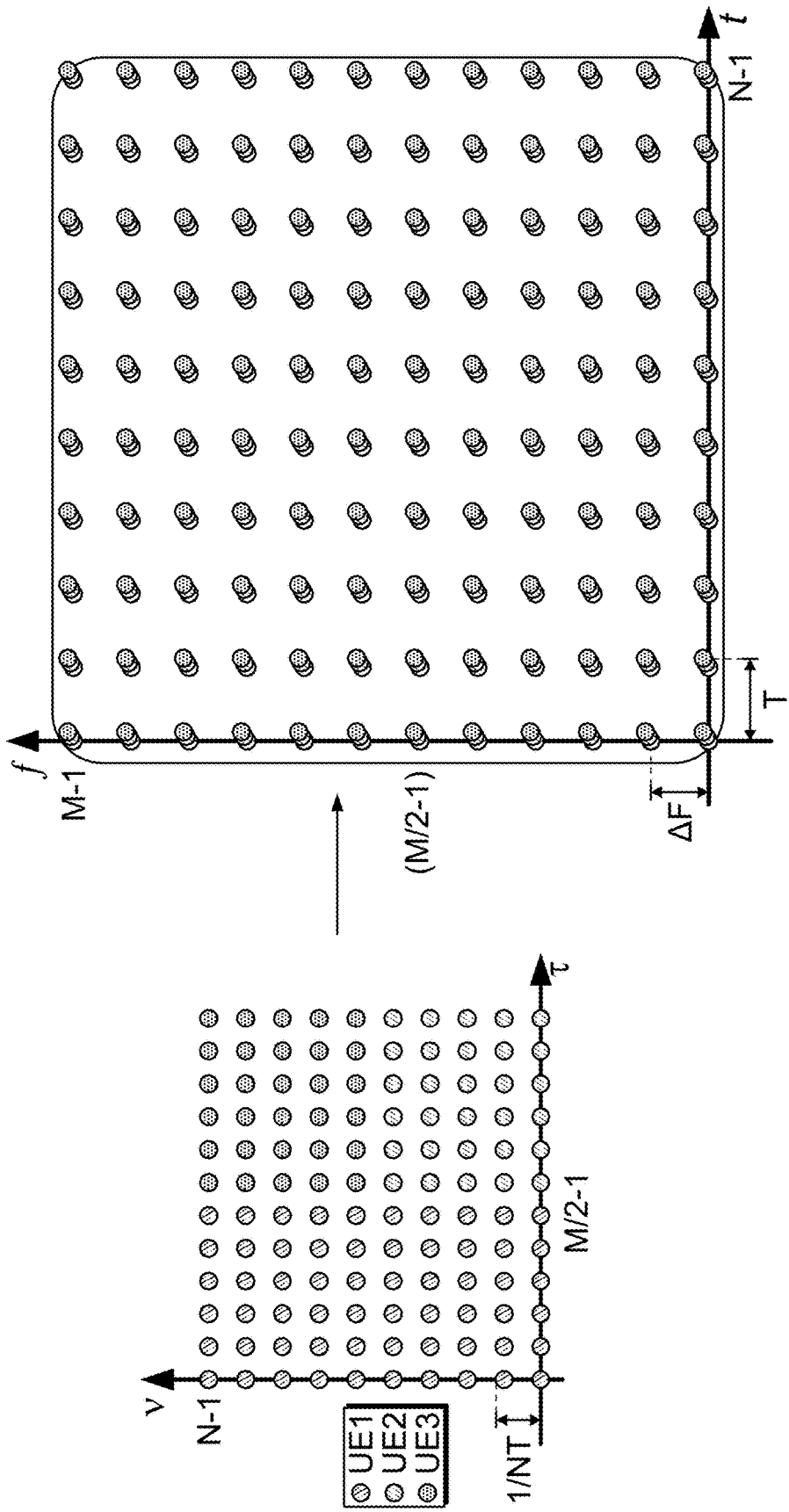
FIG. 25 shows a multiplexing scheme.

FIG. 25 shows an example of a multi-user delay-Doppler transform multiplexing. In this example, UE1 uses the left half and sends zero power in the right half of the original lattice. UE2 uses the right bottom quarter and sends zero power in the remaining three-quarters of the original lattice. UE3 uses the right top quarter and sends zero power in the remaining three-quarters of the original lattice. The window of all three UEs is the same and is contiguous. Furthermore, all three UEs have full resolution in both delay and Doppler domains. UE1 covers the full Doppler span and half the delay span UE2 and UE3 cover half the delay span and half the Doppler span. In the uplink, a receiver will experience different UL channels from different UEs.

Figure 26:
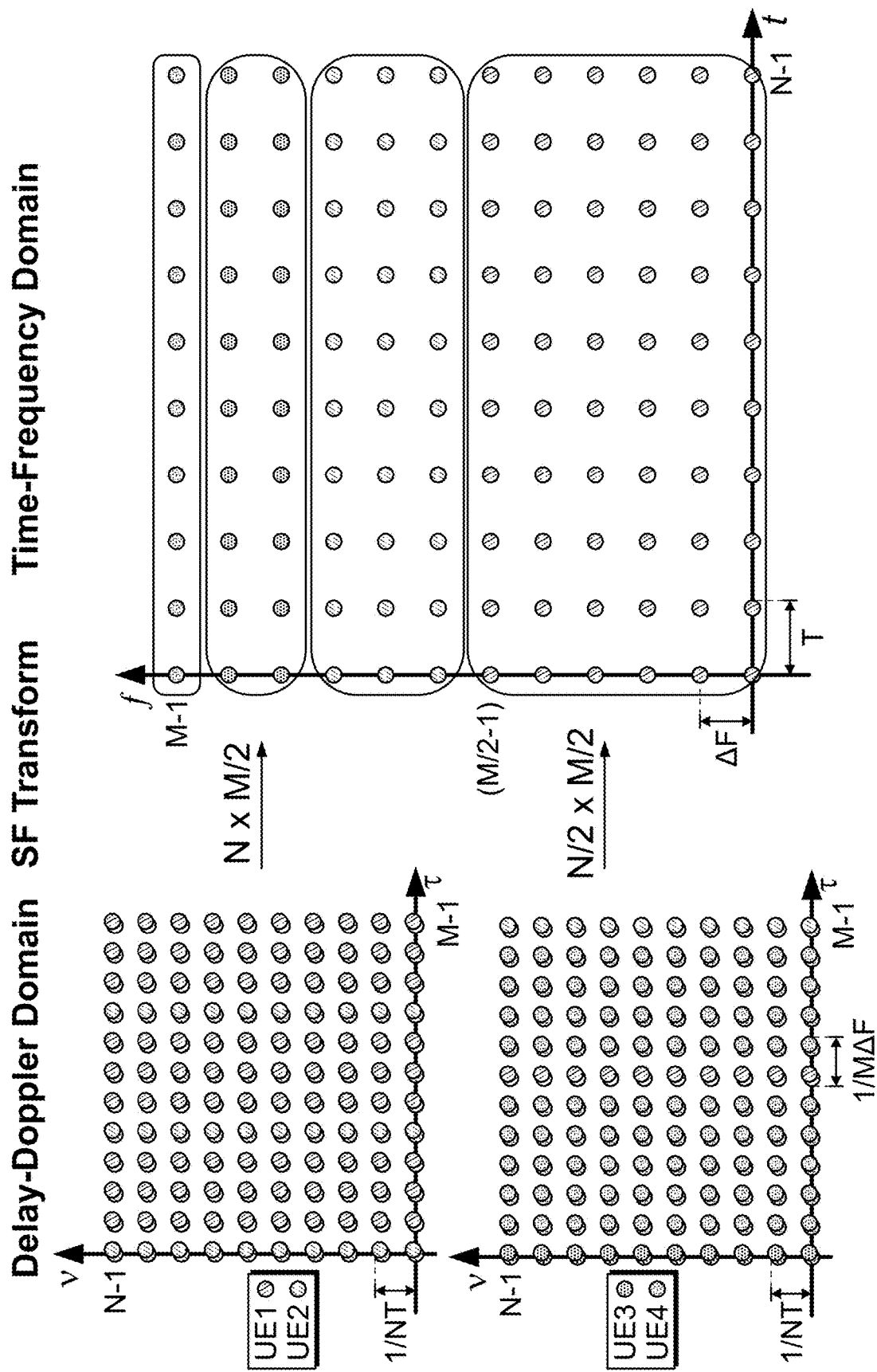
FIG. 26 shows a multiplexing scheme.
Figure 27:
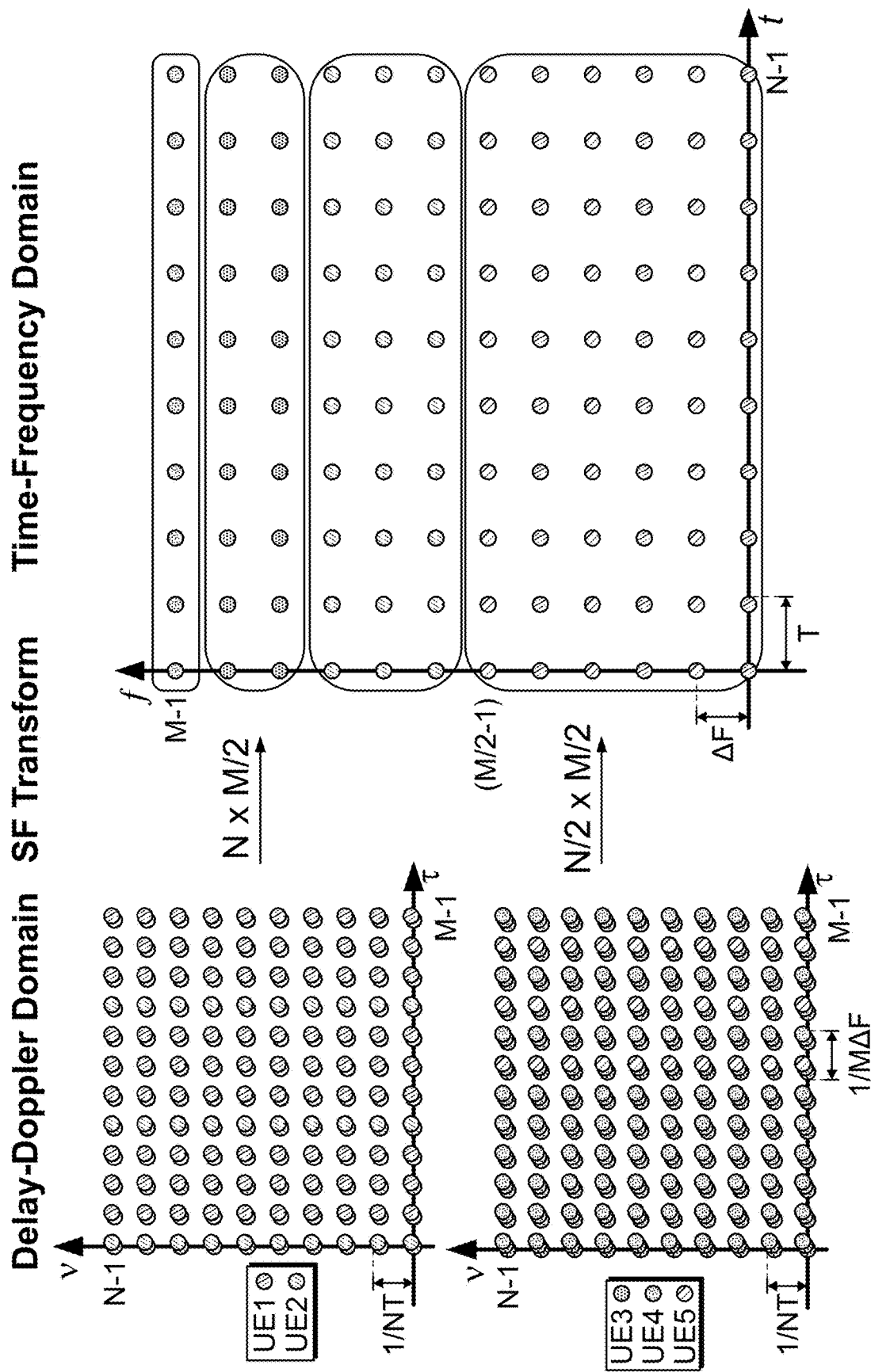
FIG. 27 shows a multiplexing scheme.

FIG. 26 and FIG. 27 shows an example of a multi-user delay-Doppler transform multiplexing in which UE1 and UE2 occupy overlapping resources in the Delay Doppler domain, but non-overlapping resources in the time-frequency domain. Furthermore, each UE is assigned a separate frequency range but occupies the entire time domain of the transmitted symbol. In the delay-Doppler domain, the UEs occupy the same T resources, but different v resources.

Figure 28:
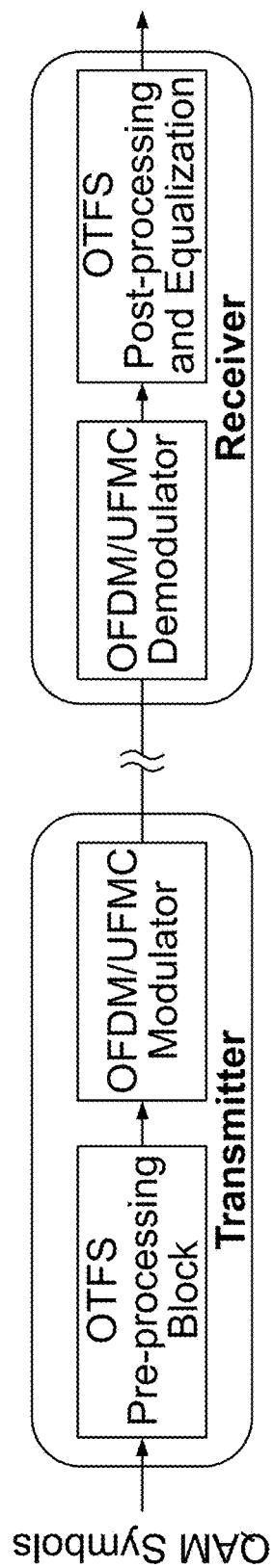
FIG. 28 is another example of an OTFS architecture.

FIG. 28 shows a variation of the compatibility of OTFS scheme with conventional transmission schemes such as previously described with respect to FIG. 18. Processing from left to right, at the transmitter, QAM (or QPSK) symbols are input to an OTFS preprocessing block which may then process the symbols as described in this patent document. The output of the pre-processing block may represent time-frequency samples, and then be input to a conventional OFDM or a universal filtered multicarrier (UFMC) transmission system. The resulting signal is transmitted over a communication channel.

At the receiver-side, a conventional OFDM or UFMC demodulator may be used to recover time-frequency domain samples. The time-frequency domain samples may be input to the OTFS demodulation stage, shown as the OTFS post-processing and equalization stage in FIG. 28. In this stage, information bits and/or reference signals may be recovered using the various techniques described in the present document.

Figure 29:
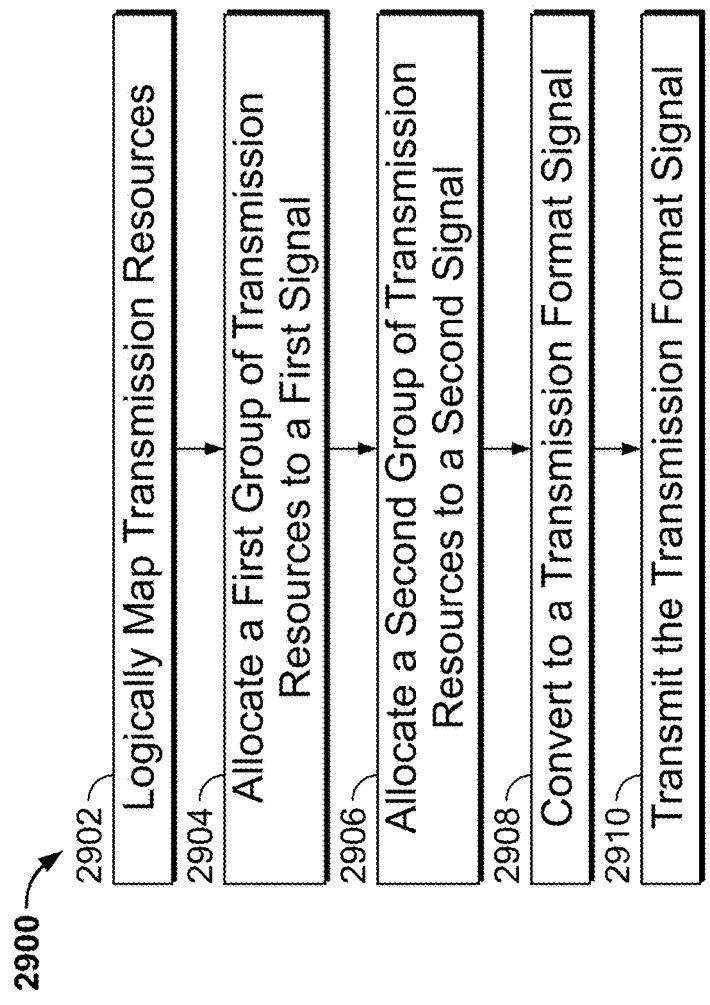
FIG. 29 is a flowchart representation of a method of signal transmission.

FIG. 29 shows a flowchart for an example signal transmission method 2900. The method 2900 may be implemented at the transmitter-side. For example, in some embodiments, the method 2900 may be implemented at a base station in a cellular network such as a 5G network.

The method 2900 includes, at 2902, performing a logical mapping of transmission resources of the digital communication channel along a first two-dimensional resource plane represented by a first and a second orthogonal axes corresponding to a first transmission dimension and a second transmission dimension respectively. For example, the first two-dimensional resource plan may be a delay-Doppler plane and the first and the second orthogonal axes may correspond to the delay dimension and the Doppler dimension.

The method 2900 includes, at 2904, allocating, to a first signal, a first group of transmission resources from the logical mapping for transmission.

The method 2900 includes, at 2906, transforming, using a first two-dimensional transform, a combination of the first signal having the first group of transmission resources and the second signal having the second group of transmission resources to a corresponding transformed signal in a second two-dimensional resource plane represented by a third and a fourth orthogonal axes corresponding to a third transmission dimension and a fourth transmission dimension respectively. For example, the second two-dimensional resource plan may include a time-frequency plane and the third orthogonal axis may correspond to the time dimension and the fourth axis may correspond to the frequency dimension. In such as case, transmission resources may correspond to time slots and subcarriers.

The method 2900 includes, at 2908, converting the transformed signal to a formatted signal according to a transmission format of the communications channel.

The method 2900 includes, at 2910, transmitting the formatted signal over the communications channel. The formatted signal may be formatted according to a well-known format such as the LTE format or may comprise a 5G or another transmission protocol.

The method 2900 may operate such that transmission resources used by the first signal and the second signal are non-overlapping in at least one of the first two-dimensional resource plane and the second two-dimensional resource plane. FIG. 16, FIG. 17, FIGS. 21-27 and associated description in this patent document describe some example embodiments of assignment of transmission resources to multiple signals.

As described with reference to FIG. 3, FIG. 4 and elsewhere, in some embodiments, the first two-dimensional resource plane comprises a delay-Doppler plane and the second two-dimensional resource plane comprises a time-frequency plane. This patent document also describes various multiplexing techniques in which the first signal and the second signal may each correspond to information signals intended for different receiving UEs, or may be pilot signals or reference signals, or a combination thereof.

In some embodiments, the transformed signal output from the first transform operation may be formatted by applying a multicarrier modulation scheme to the transformed signal. This patent document describes several embodiments, including using OFDM modulation, FBMC modulation, UFMC modulation, and so on. Furthermore, in some embodiments, the resulting signal may be produced to be compatible with a well-known or a legacy standard such as the LTE transmission format. In this way, in one advantageous aspect, the method 2900 may produce a signal that appears to be pre-processed and compatible with legacy systems for transmission.

In some embodiments, the resources allocated to the first and the second signal in the first two-dimensional resource plane may each use a set of basis function that are orthogonal to each other. Each set may include one or more basis functions. FIG. 7 and FIG. 15 shows examples of orthogonal basis functions in the delay-Doppler domain that may be used in the sets.

In various embodiments, to facilitate separation of the multiplexed versions of the first signal and the second signal, the non-overlapping resource utilization by the first signal and the second signal may be a property that is enforced both in the first two dimensional resource plane and the second two-dimensional resource plane. Alternatively, the non-overlapping nature of resource allocation may be only in the time-frequency plane or in the delay-Doppler plane. It will be appreciated by one of skill in the art that, as long as the resources used are non-overlapping, and preferably orthogonal, receivers can use this knowledge to recover the first signal and the second signal individually.

In some embodiments, a first resource window and a second resource window may be assigned to the first and second signals. Some examples are described in the figures in the present document. These windows may be assigned such that the windows may have the same shape (e.g., rectangular) and may be obtained from each other along time and/or frequency axis shifts.

In some embodiments, different antenna resources may be assigned to the first and the second signals, thereby achieving spatial diversity of transmission resources.

It will be understood by one of skill in the art that additional signals could be multiplexed along with the first signal and the second signal to provide multiple access to greater than two logical signals by multiplexing in a manner in which non-overlapping resources are allocated at least in the delay-Doppler domain or in the time-frequency domain or both. In some embodiments, the resource utilization in one of the two-dimensional resource plane may be partially or completely overlapping. FIG. 21 shows an example in which two UEs are allocated overlapping resources in the delay-Doppler domain but are non-overlapping in the time-frequency domain.

In some embodiments, signal separation at the receiver-side is facilitated by converting the transform signal to the formatted signal by code division multiplexing the transformed signal using a two-dimensional code to generate a code-division multiplexed signal, and performing a multi-carrier modulation operation on the code-division multiplexed signal. In some embodiments, randomization of phases may be performed prior to the multicarrier modulation to achieve interference minimization and avoidance from neighboring cells. For example, the randomization may be a function of identify of the cell.

Figure 30:
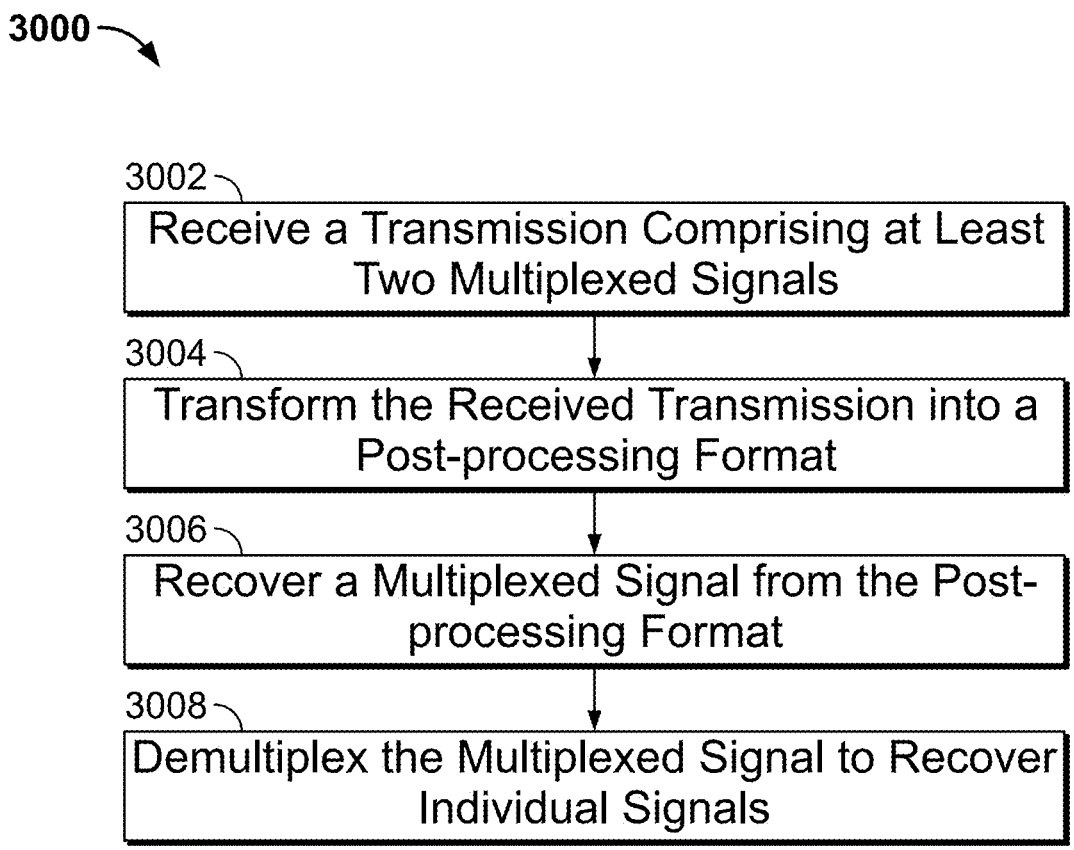
FIG. 30 is a flowchart representation of a method of signal reception.

FIG. 30 is a flowchart depiction of a method 3000 of single reception. The method 3000 may be implemented by a receiver apparatus such as a base station or UE.

The method 3000 includes receiving (3002) a signal transmission comprising at least two component signals multiplexed together.

The method 3000 includes transforming (3004), using an orthogonal transform, the signal transmission into a post-processing format, wherein the post-processing format represents the at least two component signals in a two-dimensional time-frequency plane.

The method 3000 includes recovering (3006), by performing an orthogonal time frequency space transformation, a multiplexed signal in a two-dimensional delay-Doppler plane, from the post-processing format.

The method 3000 includes demultiplexing (3008) the multiplexed signal to recover one of the at least two component signals.

In various embodiments, the method 3000 may operate such that a receiver may be able to successfully receive and recover the first signal and the second signal transmitted according to the method 2900.

In some embodiments, a signal transmission method may include performing a logical mapping of transmission resources of the digital communication channel along a first two-dimensional resource plane represented by a first and a second orthogonal axes corresponding to a first transmission dimension and a second transmission dimension respectively, allocating, to a first signal, a first group of transmission resources from the logical mapping for transmission, transforming, using a first two-dimensional transform, the first signal having the first group of transmission resources to a corresponding transformed signal in a second two-dimensional resource plane represented by a third and a fourth orthogonal axes corresponding to a third transmission dimension and a fourth transmission dimension respectively, converting the transformed signal to a formatted signal according to a transmission format of the communications channel, and transmitting the formatted signal over the communications channel.

In some embodiments, a receiver apparatus may receive the single signal transmitted according to the above-described method and successfully receive the signal by processing through two transforms—a first transform that enables processing in the time-frequency resource plane, followed by a second transform that enables processing and symbol recovery in the delay-Doppler plane.

Proof of Proposition 1: Let $$g_1(t) = \iint h_1(\tau,\nu)e^{j2\pi\nu(t-\tau)}g(t-\tau)d\nu d\tau \quad (57)$$

$$g_2(t) = \iint h_1(\tau,\nu)e^{j2\pi\nu(t-\tau)}g_1(t-\tau)d\nu d\tau \quad (58)$$

Substituting (58) into (57) we obtain after some manipulation $$g_2(t) = \iint f(\tau,\nu)e^{j2\pi\nu(t-\tau)}g(t-\tau)d\nu d\tau \quad (59)$$

with $f(\tau, \nu)$ given by (16).

Proof of Theorem 1: The theorem can be proven by straightforward but tedious substitution of the left hand side of (23); by definition $$A_{g_r,\Pi_f(g_{tr})}(\tau, \nu) = \,<g_r(t-\tau)e^{j2\pi\nu t}, \quad (60)$$

$$\Pi_f(g_{tr})> = \int g_r^*(t-\tau)e^{-j2\pi\nu t}\Pi_f(g_{tr})(t)dt =$$

$$\int g_r^*(t-\tau)e^{-j2\pi\nu t}\iint f(\tau',\nu')e^{j2\pi\nu'(t-\tau')}g_{tr}(t-\tau')d\nu'd\tau'dt$$

By changing the order of integration and the variable of integration $(t-\tau') \to t$ we obtain $$A_{g_r,\Pi_f(g_{tr})}(\tau, \nu) = \quad (61)$$

$$\iint f(\tau',\nu')e^{j2\pi\nu'(t-\tau')}\int g_r^*(t-\tau)g_{tr}(t-\tau')e^{-j2\pi\nu t}dt d\nu' d\tau' =$$

$$\iint f(\tau',\nu')e^{j2\pi\nu'(\tau-\tau')}A_{g_r,g_{tr}}(\tau-\tau',\nu-\nu')e^{j2\pi\nu'(\tau-\tau')}d\nu' d\tau'$$

where $$A_{g_r,g_{tr}}(\tau-\tau',\nu-\nu') = \int g^*_r(t-(\tau-\tau'))g_{tr}(t)e^{-j2\pi(\nu-\nu')t-(\tau-\tau')}dt \quad (62)$$

Notice that the right second line of (61) is exactly the right hand side of (23), which is what we wanted to prove.

Proof of Theorem 2: Substituting into (23) and evaluating on the lattice $\Lambda$ we obtain:

$$\hat{X}[m, n] = \quad (63)$$

$$\sum_{m'=-\frac{M}{2}}^{\frac{M}{2}-1}\sum_{n'=0}^{N-1} X[m', n'] \times \iint h(\tau - nT, \nu - m\Delta f)A_{g_r,g_{tr}}(nT - \tau,$$

$$m\Delta f - \nu)e^{j1\pi\nu(nT-\tau)t} + V[m, n]$$

Using the bi-orthogonality condition in (63) only one term survives in the right hand side and we obtain the desired result of (29).

Proof of Proposition 2: Based on the definition of SFFT, it is not hard to verify that a delay translates into a linear phase $$SFFT(X_2[n-k, m-l]) = SFFT(X_2[n, m])e^{-j2\pi\left(\frac{nk}{N}-\frac{ml}{M}\right)} \quad (64)$$

Based on this result we can evaluate the SFFT of a circular convolution $$SFFT\left(\sum_{k=0}^{N-1}\sum_{l=-\frac{M}{2}}^{\frac{M}{2}-1} X_1[k, l]X_2[(n-k) \bmod N, (-l) \bmod M]\right) = \quad (65)$$

$$\sum_{k=0}^{N-1}\sum_{l=-\frac{M}{2}}^{\frac{M}{2}-1} X_1[k, l]SFFT(X_2[n, m])e^{-j2\pi\left(\frac{nk}{N}-\frac{ml}{M}\right)} =$$

$$SFFT(X_1[n, m])SFFT(X_2[n, m])$$

yielding the desired result.

Proof of Proposition 3: We have already proven that on the time-frequency domain we have a multiplicative frequency selective channel given by (29). This result, combined with the interchange of convolution and multiplication property of the symplectic Fourier transform [c.f. Proposition 1 and Eq. (42)] leads to the desired result.

In particular, if we substitute Y(n, m) in the demodulation equation (48) from the time-frequency channel equation (29) and X[n, m] in (29) from the modulation equation (43) we get a (complicated) end-to-end expression $$\hat{x}[k, l] = \frac{1}{MN} \sum_{k'=0}^{N-1} \sum_{l'=0}^{M-1} x[k', l'] \int \int h(\tau, v) e^{-j2\pi v \tau} \times \times \left[ \sum_{m=0}^{L-1} \sum_{n=0}^{K-1} W(n, m) e^{-j2\pi nT\left(\frac{k-k'}{NT} - v\right)} e^{j2\pi m\Delta f\left(\frac{l-l'}{M\Delta f} - \tau\right)} \right] dv d\tau \quad (66)$$

Recognizing the factor in brackets as the discrete symplectic Fourier transform of W (n, m) we have $$\hat{x}[k, l] = \frac{1}{MN} \sum_{k'=0}^{N-1} \sum_{l'=0}^{M-1} x[k', l'] \int \int h(\tau, v) e^{-j2\pi v \tau} w\left(\frac{l-l'}{M\Delta f} - \tau, \frac{k-k'}{NT} - v\right) dv d\tau \quad (67)$$

Further recognizing the double integral as a convolution of the channel impulse response (multiplied by an exponential) with the transformed window we obtain $$\hat{x}[k, l] = \frac{1}{MN} \sum_{k'=0}^{N-1} \sum_{l'=0}^{M-1} x[k', l'] h_w\left(\frac{l-l'}{M\Delta f} - \tau, \frac{k-k'}{NT} - v\right) \quad (68)$$

which is the desired result.

It will be appreciated that various techniques are disclosed for transmitting and receiving data using OTFS modulation techniques.

Figure 31:
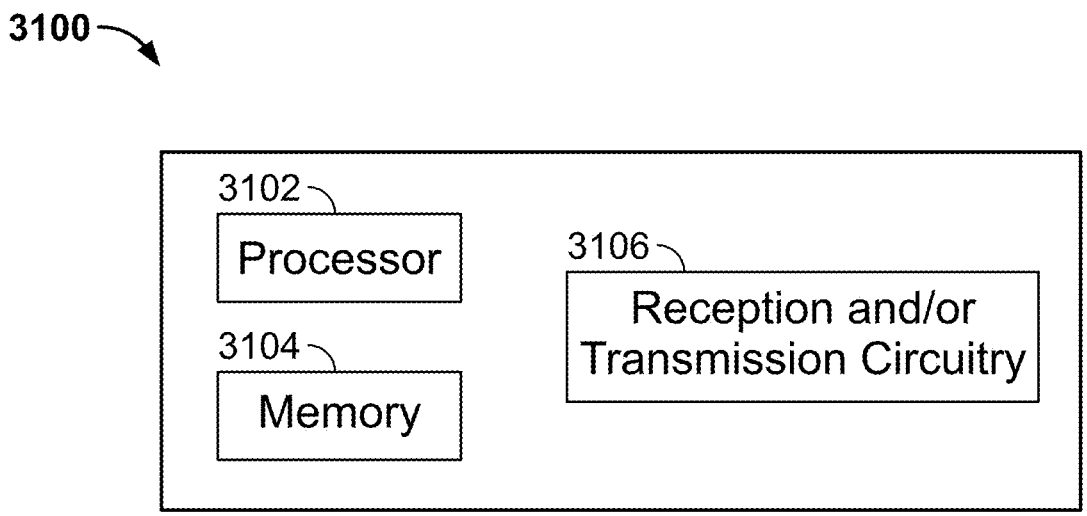
FIG. 31 is a block diagram of an example communication apparatus.

FIG. 31 shows an example of a wireless transceiver apparatus 3100. The apparatus 3100 may be used to implement method 2900 or 3000. The apparatus 3100 includes a processor 3102, a memory 3104 that stores processor-executable instructions and data during computations performed by the processor. The apparatus 3100 includes reception and/or transmission circuitry 3106, e.g., including radio frequency operations for receiving or transmitting signals.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A signal reception method, implemented at a receiver apparatus, comprising:
receiving a signal transmission comprising at least two component signals multiplexed together;
wherein the at least two component signals include a first component signal carrying user data for the receiver apparatus and a second component signal carrying user data for another receiver apparatus or a reference signal transmission;
transforming, using an orthogonal transform, the signal transmission into a post-processing format, wherein the post-processing format represents the at least two component signals in a two-dimensional time-frequency plane;
recovering, by performing an orthogonal time frequency space transformation, a multiplexed signal in a two-dimensional delay-Doppler plane, from the post-processing format, wherein the two-dimensional delay-Doppler plane comprises a lattice with lattice points defined as (m/$\Delta$f, n/T), wherein 1/$\Delta$f is a maximum delay representable on the two-dimensional delay-Doppler plane, 1/T is a maximum Doppler representable on the two-dimensional delay-Doppler plane, and m and n are integers; and
demultiplexing the multiplexed signal to recover one of the at least two component signals.

2. The method of claim 1, wherein the at least two component signals are multiplexed together to occupy non-overlapping transmission resources in the two-dimensional time-frequency plane.

3. The method of claim 1, wherein the at least two component signals are multiplexed together to occupy non-overlapping transmission resources in the two-dimensional delay-Doppler plane.

4. The method of claim 1, wherein the at least two component signals are composed of mutually orthogonal basis functions in the two-dimensional delay-Doppler plane.

5. The method of claim 1, wherein the orthogonal transform comprises a Wigner transform.

6. A receiver apparatus, comprising:
a transceiver configured to receive a signal transmission comprising at least two component signals multiplexed together;
wherein the at least two component signals include a first component signal carrying user data for the receiver apparatus and a second component signal carrying user data for another receiver apparatus or a reference signal transmission; and
a processor, coupled to the transceiver, configured to:
transform, using an orthogonal transform, the signal transmission into a post-processing format, wherein the post-processing format represents the at least two component signals in a two-dimensional time-frequency plane,
recover, by performing an orthogonal time frequency space transformation, a multiplexed signal in a two-dimensional delay-Doppler plane, from the post-processing format, wherein the two-dimensional delay-Doppler plane comprises a lattice with lattice points defined as (m/$\Delta$f, n/T), wherein 1/$\Delta$f is a maximum delay representable on the two-dimensional delay-Doppler plane, 1/T is a maximum Doppler representable on the two-dimensional delay-Doppler plane, and m and n are integers, and
demultiplex the multiplexed signal to recover one of the at least two component signals.

7. The receiver apparatus of claim 6, wherein the at least two component signals are multiplexed together to occupy non-overlapping transmission resources in the two-dimensional time-frequency plane.

8. The receiver apparatus of claim 6, wherein the at least two component signals are multiplexed together to occupy non-overlapping transmission resources in the two-dimensional delay-Doppler plane.

9. The receiver apparatus of claim 6, wherein the at least two component signals are composed of mutually orthogonal basis functions in the two-dimensional delay-Doppler plane.

10. The receiver apparatus of claim 6, wherein the orthogonal transform comprises a Wigner transform.

11. A non-transitory computer-readable storage medium having instructions stored thereupon for signal reception, comprising:
instructions for receiving a signal transmission comprising at least two component signals multiplexed together, wherein the at least two component signals include a first component signal carrying user data for a receiver apparatus and a second component signal carrying user data for another receiver apparatus or a reference signal transmission;
instructions for transforming, using an orthogonal transform, the signal transmission into a post-processing format, wherein the post-processing format represents the at least two component signals in a two-dimensional time-frequency plane;
instructions for recovering, by performing an orthogonal time frequency space transformation, a multiplexed signal in a two-dimensional delay-Doppler plane, from the post-processing format, wherein the two-dimensional delay-Doppler plane comprises a lattice with lattice points defined as (m/$\Delta$f, n/T), wherein 1/$\Delta$f is a maximum delay representable on the two-dimensional delay-Doppler plane, 1/T is a maximum Doppler representable on the two-dimensional delay-Doppler plane, and m and n are integers; and
instructions for demultiplexing the multiplexed signal to recover one of the at least two component signals.

12. The non-transitory computer-readable storage medium of claim 11, wherein the at least two component signals are multiplexed together to occupy non-overlapping transmission resources in the two-dimensional time-frequency plane or in the two-dimensional delay-Doppler plane.

13. The non-transitory computer-readable storage medium of claim 11, wherein the at least two component signals are composed of mutually orthogonal basis functions in the two-dimensional delay-Doppler plane.

14. The non-transitory computer-readable storage medium of claim 11, wherein the orthogonal transform comprises a Wigner transform.

15. The signal reception method of claim 1, wherein the transforming comprises processing the signal transmission through a filter bank demodulator or an orthogonal frequency division multiplexing (OFDM) demodulator.

16. The signal reception method of claim 1, wherein the performing the orthogonal time frequency space transformation comprises applying a symplectic Fourier transform to the signal transmission in the post-processing format.

17. The receiver apparatus of claim 6, wherein the processor is configured to transform the signal transmission by processing through a filter bank demodulator or an orthogonal frequency division multiplexing (OFDM) demodulator.

18. The receiver apparatus of claim 6, wherein the processor is configured to perform the orthogonal time frequency space transformation by applying a symplectic Fourier transform to the signal transmission in the post-processing format.

19. The non-transitory computer-readable storage medium of claim 11, wherein the transforming comprises processing the signal transmission through a filter bank demodulator or an orthogonal frequency division multiplexing (OFDM) demodulator.

20. The non-transitory computer-readable storage medium of claim 11, wherein the performing the orthogonal time frequency space transformation comprises applying a symplectic Fourier transform to the signal transmission in the post-processing format.

* * * * *